US011341508B2

(12) United States Patent
Mercury et al.

(10) Patent No.: US 11,341,508 B2
(45) Date of Patent: May 24, 2022

(54) AUTOMATICALLY CERTIFYING WORKER SKILL CREDENTIALS BASED ON MONITORING WORKER ACTIONS IN A VIRTUAL REALITY SIMULATION ENVIRONMENT

(71) Applicant: Pearson Education, Inc., New York, NY (US)

(72) Inventors: Mark Mercury, Minneapolis, MN (US); Jarin Schmidt, Eden Prairie, MN (US); E. Clarke Porter, Minneapolis, MN (US); Peter Pascale, Edina, MN (US); Andrew Stockinger, Bloomington, MN (US); Ronald D. Lancaster, Jr., Saint Paul, MN (US)

(73) Assignee: PEARSON EDUCATION, INC., New York, NY (US)

( * ) Notice: Subject to any disclaimer, the term of this patent is extended or adjusted under 35 U.S.C. 154(b) by 806 days.

(21) Appl. No.: 15/993,394

(22) Filed: May 30, 2018

(65) Prior Publication Data

US 2019/0087519 A1 Mar. 21, 2019

Related U.S. Application Data

(60) Provisional application No. 62/559,433, filed on Sep. 15, 2017.

(51) Int. Cl.
*G06Q 30/00* (2012.01)
*G06F 16/23* (2019.01)
(Continued)

(52) U.S. Cl.
CPC .......... *G06Q 30/018* (2013.01); *G06F 3/011* (2013.01); *G06F 16/2365* (2019.01);
(Continued)

(58) Field of Classification Search
CPC ......... G06Q 10/06398; G06Q 10/1053; G06Q 10/1097; G06Q 30/018; G06Q 50/2057;
(Continued)

(56) References Cited

U.S. PATENT DOCUMENTS

| 4,413,277 A * | 11/1983 | Murray ............ G06Q 10/06398 348/86 |
| 4,425,097 A * | 1/1984 | Owens ..................... G09B 9/04 434/219 |

(Continued)

FOREIGN PATENT DOCUMENTS

| WO | 2008030759 | 3/2008 |
| WO | 2008030759 A1 | 3/2008 |

OTHER PUBLICATIONS

Ross, Martin, Drive Operator Excellence through Simulator Training Honeywell, 2013 Honeywell Users Group Europe, Middle East and Africa (Year: 2013).*

(Continued)

*Primary Examiner* — Scott L Jarrett
(74) *Attorney, Agent, or Firm* — Quarles & Brady LLP

(57) ABSTRACT

Techniques described herein relate to executing and monitoring physical simulations within a digital credential platform. Physical simulation evaluation systems may be implemented including sensor-based monitoring systems, simulation output systems, and/or simulation environment control systems. Particular types of digital credential simulations may be determined and executed within a physical environment, during which a plurality of sensors may be used to monitor the physical actions of a credential receiver during physical simulation. The physical action data may be analyzed and compared to digital credential requirements to determine one or more digital credentials to be generated and issued to the credential receiver.

18 Claims, 19 Drawing Sheets

(51) Int. Cl.

| | | |
|---|---|---|
| *H04W 4/38* | (2018.01) | |
| *G06F 16/28* | (2019.01) | |
| *G06F 30/20* | (2020.01) | |
| *G06F 40/186* | (2020.01) | |
| *G06V 40/16* | (2022.01) | |
| *G06F 21/32* | (2013.01) | |
| *G06Q 10/06* | (2012.01) | |
| *G09B 7/00* | (2006.01) | |
| *G06F 3/01* | (2006.01) | |
| *G06F 21/31* | (2013.01) | |
| *H04L 9/40* | (2022.01) | |
| *H04L 67/50* | (2022.01) | |
| *H04L 67/306* | (2022.01) | |
| *H04L 67/131* | (2022.01) | |
| *G06Q 10/10* | (2012.01) | |
| *G06Q 50/20* | (2012.01) | |
| *G06N 20/00* | (2019.01) | |
| *G06T 7/73* | (2017.01) | |
| *H04L 29/06* | (2006.01) | |
| *G06V 40/20* | (2022.01) | |
| *H04N 7/18* | (2006.01) | |

(52) U.S. Cl.
CPC ........ *G06F 16/2379* (2019.01); *G06F 16/285* (2019.01); *G06F 21/316* (2013.01); *G06F 21/32* (2013.01); *G06F 30/20* (2020.01); *G06F 40/186* (2020.01); *G06N 20/00* (2019.01); *G06Q 10/067* (2013.01); *G06Q 10/06393* (2013.01); *G06Q 10/06398* (2013.01); *G06Q 10/063112* (2013.01); *G06Q 10/105* (2013.01); *G06Q 50/2057* (2013.01); *G06T 7/74* (2017.01); *G06V 40/172* (2022.01); *G06V 40/174* (2022.01); *G09B 7/00* (2013.01); *H04L 63/083* (2013.01); *H04L 63/0861* (2013.01); *H04L 63/0876* (2013.01); *H04L 63/107* (2013.01); *H04L 67/22* (2013.01); *H04L 67/306* (2013.01); *H04L 67/38* (2013.01); *H04W 4/38* (2018.02); *G06Q 10/0639* (2013.01); *G06Q 10/06395* (2013.01); *G06T 2207/10016* (2013.01); *G06T 2207/30201* (2013.01); *G06V 40/20* (2022.01); *H04N 7/18* (2013.01)

(58) Field of Classification Search
CPC ........... G06Q 10/105; G06Q 10/06393; G06Q 10/0639; G06Q 10/063112; G09B 9/052; G09B 7/02; G09B 5/065; G09B 5/00; G09B 9/00; G09B 7/00
See application file for complete search history.

(56) References Cited

U.S. PATENT DOCUMENTS

| | | | |
|---|---|---|---|
| 4,671,772 A * | 6/1987 | Slade | G09B 7/04 434/219 |
| 5,103,408 A | 4/1992 | Greenberg et al. | |
| 5,212,635 A * | 5/1993 | Ferriter | G06Q 10/06398 705/7.42 |
| 5,239,460 A * | 8/1993 | LaRoche | G06Q 10/06398 705/7.42 |
| 5,444,226 A * | 8/1995 | Collins, Jr. | G06K 7/10851 235/383 |
| 5,535,256 A * | 7/1996 | Maloney | G07C 1/10 379/111 |
| 5,748,738 A | 5/1998 | Bisbee et al. | |
| 5,781,732 A | 7/1998 | Adams | |
| 5,892,900 A | 4/1999 | Ginter et al. | |
| 5,909,669 A * | 6/1999 | Havens | G06Q 30/02 705/7.42 |
| 5,963,649 A | 10/1999 | Sako | |
| 5,980,429 A * | 11/1999 | Nashner | A61B 5/1036 434/247 |
| 6,033,226 A * | 3/2000 | Bullen | G09B 9/00 434/219 |
| 6,056,556 A | 5/2000 | Braun et al. | |
| 6,119,097 A * | 9/2000 | Ibarra | G06Q 10/06398 705/7.42 |
| 6,146,148 A | 11/2000 | Stuppy | |
| 6,157,808 A | 12/2000 | Hollingsworth | |
| 6,183,259 B1 * | 2/2001 | Macri | G09B 19/22 434/247 |
| 6,389,402 B1 | 5/2002 | Ginter et al. | |
| 6,431,875 B1 | 8/2002 | Elliott et al. | |
| 6,513,014 B1 | 1/2003 | Walker et al. | |
| 6,516,411 B2 | 2/2003 | Smith | |
| 6,659,038 B2 | 12/2003 | Salva Calcagno | |
| 6,735,574 B2 * | 5/2004 | Bull | G06Q 10/06398 705/32 |
| 6,792,394 B1 * | 9/2004 | Matsko | G07F 9/026 700/174 |
| 6,850,252 B1 | 2/2005 | Hoffberg | |
| 6,871,195 B2 * | 3/2005 | Ryan | G09B 7/02 434/118 |
| 6,948,657 B2 | 9/2005 | Sugino et al. | |
| 6,973,196 B2 | 12/2005 | Patton et al. | |
| 6,988,199 B2 | 1/2006 | Toh et al. | |
| 7,043,453 B2 | 5/2006 | Stefik et al. | |
| 7,089,583 B2 | 8/2006 | Mehra et al. | |
| 7,097,617 B1 | 8/2006 | Smith | |
| 7,099,849 B1 | 8/2006 | Reeder et al. | |
| 7,110,525 B1 | 9/2006 | Heller et al. | |
| 7,133,845 B1 | 11/2006 | Ginter et al. | |
| 7,188,138 B1 | 3/2007 | Schneider | |
| 7,197,161 B2 | 3/2007 | Fan | |
| 7,206,765 B2 | 4/2007 | Gilliam et al. | |
| 7,206,941 B2 | 4/2007 | Raley et al. | |
| 7,222,086 B2 * | 5/2007 | Huffman | G06Q 10/06311 705/7.13 |
| 7,237,114 B1 | 6/2007 | Rosenberg | |
| 7,237,144 B2 | 6/2007 | Safford et al. | |
| 7,277,925 B2 | 10/2007 | Warnock | |
| 7,278,168 B1 | 10/2007 | Chaudhury et al. | |
| 7,302,634 B2 | 11/2007 | Lucovsky et al. | |
| 7,328,245 B1 | 2/2008 | Hull et al. | |
| 7,340,058 B2 | 3/2008 | Jakobsson et al. | |
| 7,353,541 B1 | 4/2008 | Ishibashi et al. | |
| 7,392,395 B2 | 6/2008 | Ginter et al. | |
| 7,441,263 B1 | 10/2008 | Bakshi et al. | |
| 7,483,670 B2 | 1/2009 | Walker et al. | |
| 7,587,369 B2 | 9/2009 | Ginter et al. | |
| 7,596,689 B2 | 9/2009 | Toh et al. | |
| 7,606,401 B2 | 10/2009 | Hoffman et al. | |
| 7,630,986 B1 | 12/2009 | Herz et al. | |
| 7,653,556 B2 | 1/2010 | Rovinelli et al. | |
| 7,660,902 B2 | 2/2010 | Graham et al. | |
| 7,660,981 B1 | 2/2010 | Hunt | |
| 7,665,141 B2 | 2/2010 | Young | |
| 7,676,568 B2 | 3/2010 | Day | |
| 7,702,531 B2 | 4/2010 | Draper et al. | |
| 7,725,723 B2 | 5/2010 | Landrock et al. | |
| 7,743,259 B2 | 6/2010 | Raley et al. | |
| 7,764,772 B2 | 7/2010 | Weksel | |
| 7,769,712 B2 | 8/2010 | Waldo et al. | |
| 7,793,106 B2 | 9/2010 | Bugbee | |
| 7,805,382 B2 | 9/2010 | Rosen et al. | |
| 7,817,162 B2 | 10/2010 | Bolick et al. | |
| 7,860,736 B2 | 12/2010 | Draper et al. | |
| 7,865,937 B1 | 1/2011 | White et al. | |
| 7,881,898 B2 | 2/2011 | Gedlinske et al. | |
| 7,970,722 B1 | 6/2011 | Owen et al. | |
| 8,014,992 B2 * | 9/2011 | Smith | G09B 9/00 703/18 |
| 8,051,289 B2 | 11/2011 | Johnson et al. | |
| 8,103,634 B2 | 1/2012 | Saito | |
| 8,112,391 B2 | 2/2012 | Allen et al. | |

(56) References Cited

U.S. PATENT DOCUMENTS

| | | | |
|---|---|---|---|
| 8,182,271 B2 | 5/2012 | Socher | |
| 8,190,468 B1* | 5/2012 | Drew | G06Q 10/06398 |
| | | | 705/7.42 |
| 8,195,657 B1 | 6/2012 | Dellovo | |
| RE43,601 E | 8/2012 | Arseneau et al. | |
| 8,414,387 B1 | 4/2013 | Paradise et al. | |
| 8,428,926 B2 | 4/2013 | Choquet | |
| 8,443,202 B2 | 5/2013 | White et al. | |
| 8,447,272 B2 | 5/2013 | Faith et al. | |
| 8,457,353 B2 | 6/2013 | Reville et al. | |
| 8,512,043 B2 | 8/2013 | Choquet | |
| 8,535,059 B1 | 9/2013 | Noble, Jr | |
| 8,554,685 B2 | 10/2013 | Patterson et al. | |
| 8,628,331 B1 | 1/2014 | Wright | |
| 8,693,737 B1 | 4/2014 | Newman et al. | |
| 8,694,793 B2 | 4/2014 | Evans | |
| 8,714,981 B2 | 5/2014 | Herman et al. | |
| 8,727,782 B2* | 5/2014 | Brunacini | G09B 7/06 |
| | | | 434/219 |
| 8,764,454 B1 | 7/2014 | Turner | |
| 8,819,793 B2 | 8/2014 | Gottschalk, Jr. | |
| 8,826,030 B2 | 9/2014 | White et al. | |
| 8,949,608 B2 | 2/2015 | Hoornaert et al. | |
| 8,958,606 B2 | 2/2015 | Hanna et al. | |
| 9,036,871 B2 | 5/2015 | Hanna et al. | |
| 9,112,730 B2 | 8/2015 | Dewaele et al. | |
| 9,141,827 B2 | 9/2015 | Ho et al. | |
| 9,280,706 B2 | 3/2016 | Hanna | |
| 9,300,646 B1 | 3/2016 | Saylor et al. | |
| 9,373,002 B2 | 6/2016 | Johnson et al. | |
| 9,449,300 B2 | 9/2016 | Kalscheuer | |
| 9,495,526 B2 | 11/2016 | Hanna | |
| 9,509,690 B2 | 11/2016 | Carter et al. | |
| 9,526,443 B1* | 12/2016 | Berme | G06F 3/147 |
| 9,589,183 B2 | 3/2017 | Brown | |
| 9,646,217 B2 | 5/2017 | Hanna | |
| 9,667,427 B2 | 5/2017 | Oberhauser et al. | |
| 9,729,411 B2 | 8/2017 | Purusothaman | |
| 9,729,556 B2 | 8/2017 | Brock | |
| 9,786,193 B2 | 10/2017 | Falash et al. | |
| 9,792,659 B2 | 10/2017 | Ho et al. | |
| 9,858,828 B1 | 1/2018 | Fuka | |
| 9,875,665 B2* | 1/2018 | Beeson | B23K 9/0956 |
| 9,931,539 B1 | 4/2018 | De Pablos et al. | |
| 9,990,856 B2* | 6/2018 | Kuchenbecker | G09B 5/00 |
| 10,025,987 B2 | 7/2018 | Ackland et al. | |
| 10,032,075 B2 | 7/2018 | Hanna | |
| 10,033,536 B2 | 7/2018 | Mercury et al. | |
| 10,043,229 B2 | 8/2018 | Hanna | |
| 10,051,001 B1 | 8/2018 | Ashley et al. | |
| 10,052,026 B1 | 8/2018 | Tran | |
| 10,055,733 B2 | 8/2018 | Hanna | |
| 10,068,074 B2 | 9/2018 | Mercury et al. | |
| 10,086,262 B1 | 10/2018 | Capper et al. | |
| 10,101,804 B1 | 10/2018 | Tennakoon et al. | |
| 10,114,609 B2 | 10/2018 | Annett et al. | |
| 10,133,856 B2 | 11/2018 | Nama | |
| 10,142,347 B2 | 11/2018 | Kurian et al. | |
| 10,152,141 B1 | 12/2018 | Lohse et al. | |
| 10,187,394 B2 | 1/2019 | Bar et al. | |
| 10,198,962 B2* | 2/2019 | Postlethwaite | G06Q 40/12 |
| 10,225,522 B1 | 3/2019 | Kusens | |
| 10,231,662 B1* | 3/2019 | Berme | G01L 5/1627 |
| 10,242,501 B1* | 3/2019 | Pusch | G06F 3/016 |
| 10,311,299 B2 | 6/2019 | Gerber et al. | |
| 10,311,300 B2 | 6/2019 | Teverovskiy | |
| 10,373,523 B1* | 8/2019 | Fields | G06Q 50/20 |
| 10,388,176 B2* | 8/2019 | Wallace | G09B 5/06 |
| 10,402,771 B1* | 9/2019 | De | G08G 1/0967 |
| 10,460,083 B2 | 10/2019 | Baldwin et al. | |
| 10,460,621 B2* | 10/2019 | Chica Barrera | G09B 9/00 |
| 10,475,351 B2* | 11/2019 | Horseman | G09B 9/00 |
| 10,489,526 B1 | 11/2019 | Sattigeri et al. | |
| 10,510,267 B2* | 12/2019 | Jarc | G09B 23/285 |
| 10,581,828 B2 | 3/2020 | Kessler et al. | |
| 10,720,074 B2* | 7/2020 | Postlethwaite | G09B 19/24 |
| 10,783,801 B1* | 9/2020 | Beaubien | A61B 5/165 |
| 10,856,796 B1* | 12/2020 | Berme | G06F 3/0346 |
| 10,878,714 B2* | 12/2020 | Liberatore | G09B 9/08 |
| 10,885,530 B2* | 1/2021 | Mercury | G06F 16/2379 |
| 11,004,019 B2 | 5/2021 | Smith et al. | |
| 11,042,885 B2* | 6/2021 | Mercury | H04L 63/0861 |
| 2001/0032094 A1 | 10/2001 | Ghosh et al. | |
| 2001/0047326 A1 | 11/2001 | Broadbent et al. | |
| 2002/0023140 A1 | 2/2002 | Hile et al. | |
| 2002/0026574 A1 | 2/2002 | Watanabe et al. | |
| 2002/0026581 A1 | 2/2002 | Matsuyama et al. | |
| 2002/0037094 A1 | 3/2002 | Salva Calcagno | |
| 2002/0052896 A1 | 5/2002 | Streit et al. | |
| 2002/0072946 A1 | 6/2002 | Richardson | |
| 2002/0087861 A1 | 7/2002 | Segev et al. | |
| 2002/0095389 A1 | 7/2002 | Gaines | |
| 2002/0106622 A1* | 8/2002 | Osborne | G09B 7/04 |
| | | | 434/350 |
| 2002/0128844 A1 | 9/2002 | Wilson et al. | |
| 2002/0143818 A1 | 10/2002 | Roberts et al. | |
| 2002/0157015 A1 | 10/2002 | Gilbert et al. | |
| 2003/0028494 A1 | 2/2003 | King et al. | |
| 2003/0070072 A1 | 4/2003 | Nassiri | |
| 2003/0120589 A1 | 6/2003 | Williams et al. | |
| 2003/0182234 A1 | 9/2003 | Degroot | |
| 2003/0187798 A1 | 10/2003 | McKinley et al. | |
| 2003/0191653 A1 | 10/2003 | Birnbaum et al. | |
| 2003/0233563 A1 | 12/2003 | Kruse | |
| 2004/0039704 A1 | 2/2004 | Gilliam et al. | |
| 2004/0054893 A1 | 3/2004 | Ellis | |
| 2004/0123111 A1 | 6/2004 | Makita et al. | |
| 2004/0131999 A1 | 7/2004 | Dresnick | |
| 2004/0133793 A1 | 7/2004 | Ginter et al. | |
| 2004/0158476 A1* | 8/2004 | Blessinger | G06Q 50/205 |
| | | | 434/65 |
| 2004/0185931 A1 | 9/2004 | Lowell et al. | |
| 2004/0220815 A1 | 11/2004 | Belanger et al. | |
| 2004/0237035 A1 | 11/2004 | Cummins | |
| 2004/0248071 A1* | 12/2004 | Bedziouk | A63B 24/00 |
| | | | 434/247 |
| 2005/0027558 A1 | 2/2005 | Yamamoto | |
| 2005/0027568 A1 | 2/2005 | Dorris | |
| 2005/0048453 A1* | 3/2005 | Macri | A63F 13/807 |
| | | | 434/247 |
| 2005/0080682 A1 | 4/2005 | Wilson | |
| 2005/0177412 A1 | 8/2005 | Kemp | |
| 2005/0182821 A1 | 8/2005 | Chan et al. | |
| 2005/0222899 A1* | 10/2005 | Varadarajan | G06Q 10/06398 |
| | | | 705/7.14 |
| 2005/0229258 A1 | 10/2005 | Pigin | |
| 2005/0257253 A1 | 11/2005 | Ekers et al. | |
| 2005/0262339 A1 | 11/2005 | Fischer | |
| 2005/0273621 A1 | 12/2005 | Davis | |
| 2005/0288939 A1 | 12/2005 | Peled et al. | |
| 2005/0289058 A1 | 12/2005 | Hoffman et al. | |
| 2006/0039304 A1 | 2/2006 | Singer et al. | |
| 2006/0095317 A1* | 5/2006 | Brown | G06Q 30/0205 |
| | | | 705/7.13 |
| 2006/0095831 A1 | 5/2006 | Kawada et al. | |
| 2006/0155636 A1 | 7/2006 | Hermann et al. | |
| 2006/0180658 A1 | 8/2006 | Anderson | |
| 2006/0282661 A1 | 12/2006 | True et al. | |
| 2007/0006322 A1 | 1/2007 | Karimzadeh et al. | |
| 2007/0038859 A1 | 2/2007 | Tadayon et al. | |
| 2007/0074270 A1 | 3/2007 | Meehan et al. | |
| 2007/0118735 A1 | 5/2007 | Cherrington et al. | |
| 2007/0124584 A1 | 5/2007 | Gupta | |
| 2007/0192140 A1 | 8/2007 | Gropper | |
| 2007/0192173 A1* | 8/2007 | Moughler | G06Q 10/06398 |
| | | | 705/7.21 |
| 2007/0192609 A1 | 8/2007 | Yoshioka et al. | |
| 2007/0220614 A1 | 9/2007 | Ellis et al. | |
| 2007/0226488 A1 | 9/2007 | Lin et al. | |
| 2007/0289022 A1 | 12/2007 | Wittkotter | |
| 2007/0294092 A1 | 12/2007 | Calannio | |
| 2008/0005024 A1 | 1/2008 | Kirkwood | |
| 2008/0014917 A1 | 1/2008 | Rhoads et al. | |
| 2008/0027747 A1 | 1/2008 | McGovern et al. | |

(56) References Cited

U.S. PATENT DOCUMENTS

| | | | |
|---|---|---|---|
| 2008/0044801 A1* | 2/2008 | Modica | G01V 5/0016 434/307 R |
| 2008/0066181 A1 | 3/2008 | Haveson et al. | |
| 2008/0071746 A1 | 3/2008 | Concordia et al. | |
| 2008/0083025 A1 | 4/2008 | Meijer et al. | |
| 2008/0091954 A1 | 4/2008 | Morris et al. | |
| 2008/0106756 A1 | 5/2008 | Okamoto | |
| 2008/0208646 A1* | 8/2008 | Thompson | G06Q 10/06398 705/7.37 |
| 2008/0208873 A1 | 8/2008 | Boehmer | |
| 2008/0235175 A1 | 9/2008 | Olive | |
| 2008/0235236 A1 | 9/2008 | Olive | |
| 2009/0012433 A1 | 1/2009 | Fernstrom et al. | |
| 2009/0049070 A1 | 2/2009 | Steinberg | |
| 2009/0172777 A1 | 7/2009 | Hansen et al. | |
| 2009/0299827 A1* | 12/2009 | Puri | G06Q 10/10 705/7.42 |
| 2009/0299993 A1 | 12/2009 | Novack | |
| 2010/0033739 A1 | 2/2010 | Phelan et al. | |
| 2010/0057487 A1 | 3/2010 | Heh et al. | |
| 2010/0099060 A1 | 4/2010 | Bijou | |
| 2010/0106645 A1 | 4/2010 | Peckover | |
| 2010/0122093 A1 | 5/2010 | Tuyls et al. | |
| 2010/0150448 A1 | 6/2010 | Lecerf et al. | |
| 2010/0159434 A1* | 6/2010 | Lampotang | G09B 23/30 434/365 |
| 2010/0167248 A1* | 7/2010 | Ryan | H04N 7/181 434/262 |
| 2010/0205649 A1 | 8/2010 | Becker et al. | |
| 2010/0217988 A1 | 8/2010 | Johnson | |
| 2010/0332008 A1* | 12/2010 | Knipfer | G05B 19/042 700/103 |
| 2011/0022496 A1 | 1/2011 | Johnson et al. | |
| 2011/0066490 A1 | 3/2011 | Bassin et al. | |
| 2011/0165542 A1 | 7/2011 | Campbell et al. | |
| 2011/0244440 A1 | 10/2011 | Saxon et al. | |
| 2011/0279228 A1* | 11/2011 | Kumar | G09B 7/00 340/5.83 |
| 2011/0281246 A1 | 11/2011 | Brunacini et al. | |
| 2011/0320423 A1 | 12/2011 | Gemmell et al. | |
| 2012/0034584 A1 | 2/2012 | Logan et al. | |
| 2012/0059917 A1 | 3/2012 | Dawson et al. | |
| 2012/0069131 A1 | 3/2012 | Abelow | |
| 2012/0122062 A1* | 5/2012 | Yang | G09B 23/28 434/219 |
| 2012/0237913 A1* | 9/2012 | Savitsky | G09B 23/286 434/262 |
| 2013/0011819 A1* | 1/2013 | Horseman | A61B 5/0537 434/257 |
| 2013/0012786 A1 | 1/2013 | Horseman | |
| 2013/0012788 A1 | 1/2013 | Horseman | |
| 2013/0012790 A1 | 1/2013 | Horseman | |
| 2013/0012802 A1 | 1/2013 | Horseman | |
| 2013/0013327 A1 | 1/2013 | Horseman | |
| 2013/0063432 A1 | 3/2013 | Kaps et al. | |
| 2013/0086484 A1 | 4/2013 | Antin et al. | |
| 2013/0097093 A1 | 4/2013 | Kolber et al. | |
| 2013/0117400 A1 | 5/2013 | An et al. | |
| 2013/0128022 A1 | 5/2013 | Bose et al. | |
| 2013/0137066 A1* | 5/2013 | Pollak | G09B 9/08 434/14 |
| 2013/0189656 A1* | 7/2013 | Zboray | G06F 3/012 434/219 |
| 2013/0203509 A1 | 8/2013 | Reed et al. | |
| 2013/0210406 A1 | 8/2013 | Vidal et al. | |
| 2013/0251214 A1 | 9/2013 | Chung | |
| 2013/0281079 A1 | 10/2013 | Vidal et al. | |
| 2013/0311244 A1* | 11/2013 | Abotchie | G06Q 10/1053 705/7.39 |
| 2013/0317791 A1 | 11/2013 | Danielson | |
| 2013/0340058 A1 | 12/2013 | Barnes et al. | |
| 2014/0006615 A1 | 1/2014 | Karnik et al. | |
| 2014/0039956 A1 | 2/2014 | Cicio, Jr. | |
| 2014/0045589 A1 | 2/2014 | Paradise et al. | |
| 2014/0101264 A1 | 4/2014 | Dewaele et al. | |
| 2014/0122355 A1 | 5/2014 | Hardtke et al. | |
| 2014/0129467 A1 | 5/2014 | Vianello | |
| 2014/0162224 A1 | 6/2014 | Wallace et al. | |
| 2014/0163333 A1 | 6/2014 | Horseman | |
| 2014/0173748 A1 | 6/2014 | Esmailzdeh | |
| 2014/0195312 A1 | 7/2014 | Ansel et al. | |
| 2014/0201345 A1 | 7/2014 | Abuelsaad et al. | |
| 2014/0205990 A1 | 7/2014 | Wellman et al. | |
| 2014/0240507 A1 | 8/2014 | Hsu et al. | |
| 2014/0278821 A1 | 9/2014 | McConnell | |
| 2014/0279587 A1 | 9/2014 | Gafford | |
| 2014/0304181 A1 | 10/2014 | Kurien et al. | |
| 2014/0304787 A1 | 10/2014 | Kurien et al. | |
| 2014/0309849 A1 | 10/2014 | Ricci | |
| 2014/0315164 A1* | 10/2014 | Jones | G09B 19/16 434/219 |
| 2014/0330412 A1* | 11/2014 | Bjarnason | G09B 19/0038 700/92 |
| 2014/0348396 A1 | 11/2014 | Laaser et al. | |
| 2014/0349255 A1* | 11/2014 | Watt | G09B 19/18 434/107 |
| 2014/0353369 A1 | 12/2014 | Malin et al. | |
| 2014/0369602 A1 | 12/2014 | Meier et al. | |
| 2014/0376876 A1 | 12/2014 | Bentley et al. | |
| 2015/0037781 A1 | 2/2015 | Breed et al. | |
| 2015/0050623 A1* | 2/2015 | Falash | G07F 9/10 434/38 |
| 2015/0052075 A1 | 2/2015 | Jayadevan et al. | |
| 2015/0056582 A1* | 2/2015 | Selvaraj | G09B 5/02 434/219 |
| 2015/0059003 A1 | 2/2015 | Bouse | |
| 2015/0066612 A1 | 3/2015 | Karpoff et al. | |
| 2015/0066792 A1 | 3/2015 | Sprague | |
| 2015/0067811 A1 | 3/2015 | Agnew et al. | |
| 2015/0079545 A1 | 3/2015 | Kurtz | |
| 2015/0095999 A1 | 4/2015 | Toth | |
| 2015/0104757 A1* | 4/2015 | Moncrief | G09B 9/05 434/38 |
| 2015/0127565 A1 | 5/2015 | Chevalier et al. | |
| 2015/0164409 A1 | 6/2015 | Benson et al. | |
| 2015/0187224 A1* | 7/2015 | Moncrief | G09B 9/24 434/30 |
| 2015/0196804 A1* | 7/2015 | Koduri | G06T 7/20 482/8 |
| 2015/0196805 A1* | 7/2015 | Koduri | A63B 24/0062 482/6 |
| 2015/0200935 A1 | 7/2015 | Ikeda et al. | |
| 2015/0229623 A1 | 8/2015 | Grigg et al. | |
| 2015/0242797 A1* | 8/2015 | Hoanca | G06Q 10/06398 705/7.42 |
| 2015/0242979 A1 | 8/2015 | Abts | |
| 2015/0249661 A1 | 9/2015 | Cauthen | |
| 2015/0302769 A1 | 10/2015 | Johnson | |
| 2015/0318993 A1 | 11/2015 | Hamlin et al. | |
| 2015/0364017 A1 | 12/2015 | Hall et al. | |
| 2015/0375104 A1 | 12/2015 | Nishar et al. | |
| 2016/0004862 A1 | 1/2016 | Almehmadi et al. | |
| 2016/0059136 A1 | 3/2016 | Ferris | |
| 2016/0063314 A1 | 3/2016 | Samet | |
| 2016/0161468 A1 | 6/2016 | Keays et al. | |
| 2016/0163217 A1 | 6/2016 | Harkness | |
| 2016/0180248 A1* | 6/2016 | Regan | G09B 5/00 706/12 |
| 2016/0188765 A1 | 6/2016 | Vossler et al. | |
| 2016/0203732 A1* | 7/2016 | Wallace | G09B 9/00 434/234 |
| 2016/0248598 A1 | 8/2016 | Lin et al. | |
| 2016/0248759 A1 | 8/2016 | Tsurumi et al. | |
| 2016/0253486 A1 | 9/2016 | Sarkar | |
| 2016/0253710 A1 | 9/2016 | Publicover et al. | |
| 2016/0267292 A1 | 9/2016 | Johnson et al. | |
| 2016/0322078 A1 | 11/2016 | Bose et al. | |
| 2016/0323173 A1 | 11/2016 | Bivens et al. | |
| 2016/0356751 A1 | 12/2016 | Blackley | |
| 2016/0360791 A1 | 12/2016 | Blackley | |
| 2016/0361452 A1 | 12/2016 | Blackley | |
| 2016/0361677 A1 | 12/2016 | Blackley | |

(56) References Cited

U.S. PATENT DOCUMENTS

| | | |
|---|---|---|
| 2016/0361678 A1 | 12/2016 | Blackley |
| 2016/0361972 A1 | 12/2016 | Blackley |
| 2016/0363332 A1 | 12/2016 | Blackley |
| 2016/0363339 A1 | 12/2016 | Blackley |
| 2016/0363567 A1 | 12/2016 | Blackley |
| 2016/0363570 A1 | 12/2016 | Blackley |
| 2016/0363572 A1 | 12/2016 | Blackley |
| 2016/0363582 A1 | 12/2016 | Blackley |
| 2016/0363917 A1 | 12/2016 | Blackley |
| 2016/0367925 A1 | 12/2016 | Blackley |
| 2016/0367926 A1 | 12/2016 | Blackley |
| 2016/0367927 A1 | 12/2016 | Blackley |
| 2016/0370335 A1 | 12/2016 | Blackley |
| 2016/0370337 A1 | 12/2016 | Blackley |
| 2017/0005868 A1 | 1/2017 | Scheines et al. |
| 2017/0020195 A1 | 1/2017 | Cameron |
| 2017/0031449 A1 | 2/2017 | Karsten et al. |
| 2017/0032248 A1 | 2/2017 | Dotan-Cohan et al. |
| 2017/0054702 A1 | 2/2017 | Turgeman |
| 2017/0132464 A1 | 5/2017 | Brown |
| 2017/0139762 A1 | 5/2017 | Sherlock et al. |
| 2017/0147801 A1 | 5/2017 | Hamlin et al. |
| 2017/0148340 A1* | 5/2017 | Popa-Simil ............ G09B 9/085 |
| 2017/0154307 A1 | 6/2017 | Maurya et al. |
| 2017/0154310 A1 | 6/2017 | Duerr et al. |
| 2017/0154539 A1 | 6/2017 | King et al. |
| 2017/0176127 A1 | 6/2017 | Ferris |
| 2017/0193839 A1 | 7/2017 | Breed |
| 2017/0193845 A1 | 7/2017 | Cardonha et al. |
| 2017/0206064 A1 | 7/2017 | Breazeal et al. |
| 2017/0206567 A1 | 7/2017 | Sutton-Shearer |
| 2017/0263142 A1 | 9/2017 | Zereshkian et al. |
| 2017/0272427 A1 | 9/2017 | Robison et al. |
| 2017/0278417 A1 | 9/2017 | Ur et al. |
| 2017/0279614 A1 | 9/2017 | Mercury et al. |
| 2017/0289168 A1 | 10/2017 | Bar |
| 2017/0323244 A1* | 11/2017 | Rani ................ G06Q 10/06393 |
| 2017/0344927 A1 | 11/2017 | Coletta et al. |
| 2017/0357928 A1* | 12/2017 | Ross ..................... G09B 19/00 |
| 2017/0361213 A1 | 12/2017 | Goslin et al. |
| 2017/0372249 A1 | 12/2017 | Abraham et al. |
| 2018/0040256 A1 | 2/2018 | Alvarez et al. |
| 2018/0075229 A1 | 3/2018 | Jan |
| 2018/0083986 A1 | 3/2018 | Hurley et al. |
| 2018/0095613 A1 | 4/2018 | Ready et al. |
| 2018/0096306 A1 | 4/2018 | Wang et al. |
| 2018/0101806 A1* | 4/2018 | Adepoju .......... G06Q 10/06393 |
| 2018/0129790 A1 | 5/2018 | Nama et al. |
| 2018/0143757 A1 | 5/2018 | Champion et al. |
| 2018/0144108 A1 | 5/2018 | Sawai et al. |
| 2018/0144541 A1 | 5/2018 | Champion et al. |
| 2018/0173871 A1 | 6/2018 | Toth |
| 2018/0203238 A1* | 7/2018 | Smith, Jr. ................. G09B 9/00 |
| 2018/0225982 A1 | 8/2018 | Jaeh et al. |
| 2018/0268341 A1 | 9/2018 | Rini et al. |
| 2018/0284453 A1 | 10/2018 | Irvin et al. |
| 2018/0341901 A1* | 11/2018 | Shike ..................... G06Q 50/08 |
| 2019/0025905 A1* | 1/2019 | Godina .................. G05B 17/00 |
| 2019/0028492 A1 | 1/2019 | Coleman et al. |
| 2019/0051046 A1 | 2/2019 | Jin et al. |
| 2019/0051199 A1* | 2/2019 | Corbett ..................... G09B 7/00 |
| 2019/0087558 A1 | 3/2019 | Mercury et al. |
| 2019/0089701 A1* | 3/2019 | Mercury ................ G06F 30/20 |
| 2019/0090816 A1 | 3/2019 | Horseman |
| 2019/0114940 A1 | 4/2019 | Gobert et al. |
| 2019/0124471 A1 | 4/2019 | Chelnik |
| 2019/0207932 A1 | 7/2019 | Bud et al. |
| 2019/0276037 A1* | 9/2019 | Ito ..................... B60W 50/0097 |
| 2019/0295101 A1 | 9/2019 | Porter et al. |
| 2020/0118456 A1 | 4/2020 | Breed et al. |
| 2020/0126444 A1* | 4/2020 | Fu .......................... G06V 40/20 |
| 2020/0160180 A1 | 5/2020 | Lehr et al. |
| 2020/0279464 A1 | 9/2020 | Llewelyn |

OTHER PUBLICATIONS

Mayberry, Charles Randall, Toward the Implementation of Augmented Reality Training NOVA Southeastern University, 2013 (Year: 2013).*
Teaching and Testing in Flight simulation training Devices (FSTD) European Union Aviation Safety Agency (EASA), Dec. 18, 2015 (Year: 2015).*
Alicoding et al., "BadgeKit API" Aug. 25, 2015, 3 pages Retrieved from URL: https://github.com/mozilla/badgekit-api.
Badge Alliance Standard Working Group, "Open Badges Specification v1.1" Badge Alliance, published May 1, 2015, 10 pages. Retrieved on Apr. 27, 2018, from URL: https://openbadgespec.org/history/1.1-specification.html.
Badge Alliance Standard Working Group, "Open Badges Technical Specification" Badge Alliance, published May 1, 2015, 9 pages. Retrieved on Nov. 28, 2017 (archive date: Apr. 26, 2016), from URL: http://web.archive.org/web/20160426204303 /https://openbadgespec.org/.
Brianloveswords, "Authorization" Mar. 3, 2014,2 pages. Retrieved from URL: https://github.com/mozilla/badgekit-api/blob/master/docs/authorization.md.
Chamilo / chamilo-lms, "Get badges when the user has achieved skills—ref BT#9082" Feb. 12, 2015, 2 pages. Retrieved on Feb. 16, 2018 from URL: https://github.com/chamilo/chamilo-lms/commit/15d7e22521aa752f9a96840ae57d493250533671.
Davelester, "Assertion Specification Changes" mozilla/openbadges-backpack Wiki, GitHub, last edited Apr. 16, 2013, 1 revision, 3 pages. Retreived on Nov. 28, 2017, from URL: https://github.com/mozilla/opengadges-backpack/wiki/Assertion-Specification-Changes.
Grant, Sheryl "What Counts as Learning: Open Digital Badges for New Opportunities" Aug. 2014, 57 pages. Retrieved on Apr. 13, 2017 from URL: https://dmlhub.net/wp-content/uploads/files/WhatCountsAsLearning_Grant.pdf.
Mozilla, "Open Badges Backpack-ng (Next Generation)" GitHub, 5 pages. Retreived on Nov. 28, 2017, from URL: https://github.com/mozilla/openbadges-backpack.
Mozilla, LRNG, IMS Global Learning Consortium, "Developers Guide" copyright 2016,12 pages. Retrieved on Nov. 28, 2017, from URL: http://opengadges.org/developers/.
Mozilla, LRNG, IMS Global Learning Consortium, "What's an Open Badge?" 3 pages. Retreived on Nov. 28, 2017, from URL: https://opengadebs.ort/get-started/.
Otto, Nate et al. "Open Badges v2.0 IMS Candidate Final / Public Draft" IMS Global Learning Consortium, issued Mar. 8, 2017, 17 pages. Retreived on Nov. 28, 2017, from URL: htpp://www.imsglobal.org/Badges/OBv2p0/index.html.
Pearson, "Open badges are unlocking the emerging jobs economy", Pearson Education, Inc., copyright 2013, 7 pages.
SueSmith, "Assessment" Jun. 18, 2014, 19 pages. Retrieved from URL: https://github.com/mozilla/badgekit-api/blob/master/docs/assessment.md.
SueSmith, "Badgekit API Documentation" Jun. 13, 2014, 2 pages. Retrieved from URL: https://github.com/mozilla/badgekitapi/blob/master/docs/README.md.
SueSmith, "Issuing" Jun. 24, 2014, 7 pages. Retrieved from URL: https://github.com/mozilla/badgekit-api/blob/master/docs/issuing.md.
SueSmith et al., "API Endpoints" Jul. 31, 2014, 4 pages. Retrieved from URL: https://github.com/mozilla/badgekit-api/blob/master/docs/api-endpoints.md.
SueSmith et al., "Badges" Jul. 31, 2014, 20 pages. Retrieved from URL: https://github.com/mozilla/badgekit-api/blob/master/docs/badges.md.
SueSmith et al., "Claim Codes" Jun. 18, 2014, 11 pages. Retrieved from URL: https://github.com/mozilla/badgekit-api/blob/master/docs/claim-codes.md.
SueSmith et al., "Issuers" Jun. 16, 2014, 9 pages. Retrieved from URL: https://github.com/mozilla/badgekit-api/blob/master/docs/issuers.md.

(56) References Cited

OTHER PUBLICATIONS

SueSmith et al., "Milestones" Jun. 16, 2014, 15 pages. Retrieved from URL: https://github.com/mozilla/badgekit-api/blob/master/docs/milestones.md.
SueSmith et al., "Programs" Jun. 16, 2014, 8 pages. Retrieved from URL: https://github.com/mozilla/badgekit-api/blob/master/docs/programs.md.
SueSmith et al., "Systems" Jun. 16, 2014, 9 pages. Retrieved from URL: https://github.com/mozilla/badgekit-api/blob/master/docs/systems.md.
SueSmith et al., "SystemCallbacks (Webhooks)" Jun. 13, 2014, 4 pages. Retrieved from URL: https://github.com/mozilla/badgekit-api/blob/master/docs/webhooks.md.
The Mozilla Foundation and Peer 2 Peer University, in collaboration with the MacArthur Foundation, "Open Badges foi Life Long Learning", updated Jan. 23, 2012, pp. 1-14.
The Mozilla Foundation and Peer 2 Peer University, in collaboration with the MacArthur Foundation, "Open Badges foi Lifelong Learning", updated Aug. 27, 2012, pp. 1-14. Retrieved on Dec. 20, 2018, from URL: https://wiki mozilla.org/images/5/59/OpenBadges-Working-Paper_012312.pdf.
Thompson, Matt, "Introducing Open Badges 1.0" The Mozilla Blog, Mar. 14, 2013, 11 pages. Retrieved on Nov. 29, 2017, from URL: https://blog.mozilla.org/blog/2013/03/14/open_badges/.
PCT/US2017/018817 received an International Search Report and Written Opinion dated May 3, 2017, 12 pages.
PCT/US2017/018821 received an International Search Report and Written Opinion dated May 5, 2017, 7 pages.
PCT/US2018/049767 received an International Search Report and Written Opinion dated Nov. 28, 2018, 15 pages.
U.S. Appl. No. 15/081,173 received a Notice of Allowance dated Mar. 14, 2018, 5 pages.
U.S. Appl. No. 15/081,215 received a First Action Interview Office Action dated Jan. 26, 2018, 5 pages.
Wuster, Mario et al., How to integrate and automatically issue Open Badges in MOOC Platforms, University of Technology, 2016.

\* cited by examiner

AUTOMATICALLY CERTIFYING WORKER SKILL CREDENTIALS BASED ON MONITORING WORKER ACTIONS IN A VIRTUAL REALITY SIMULATION ENVIRONMENT

CROSS-REFERENCE TO RELATED APPLICATIONS

This application is a non-provisional of and claims priority to U.S. Provisional Patent Application No. 62/559,433, entitled "DIGITAL CREDENTIAL PLATFORM," filed Sep. 15, 2017, the entire contents of which are incorporated by reference herein for all purposes.

BACKGROUND

Changes in computing technologies have provided individuals with additional options for obtaining and validating technical skills and proficiencies. Rather than attending traditional educational institutions and professional training courses, many individuals may now obtain their technical skills and proficiencies from alternative sources, such as structured or unstructured and asynchronous eLearning programs using distance learning technology, self-study research without any direct supervision, or various alternative technical learning, training, and testing entities. Although such advances in technologies and increasing globalization trends provide many more options for individuals to obtain technical skills and proficiencies, they also present challenges in publishing, verifying, and tracking the sets of technical skills and proficiencies that these individuals have obtained. Many individuals and institutions no longer rely on physical certificates such as diplomas, transcripts, certification statements, and physical licenses, to verify the authenticity of an individual's proficiencies or qualifications. Instead, certain institutions may issue digital credentials (or digital badges) to qualifying individuals, and these digital credential earners may use the digital credentials to certify the skills or qualifications that the earner obtained vis-à-vis the institution.

BRIEF SUMMARY

Various techniques are described herein for executing and monitoring physical simulations within a digital credential platform. In various embodiments, techniques for generating digital credentials may include using physical simulation evaluation systems include sensor-based monitoring systems, simulation output systems, and/or simulation environment control systems. Within such systems, particular types of digital credential simulations may be determined and executed within a physical environment, during which a plurality of sensors may be used to monitor the physical actions of a user (or credential receiver) during the physical simulations. The physical action data may be analyzed to determine particular physical activities performed by the user, and the characteristics of the those physical activities, such as speed, efficiency, error rate, etc. The physical activities performed may be analyzed and compared to digital credential requirements to determine one or more digital credentials to be generated and issued to the credential receiver, based on the monitored activities. In certain embodiments, the physical simulation may be generated by controlling one or more output systems and/or environmental control systems. Additionally, the usage and configuration of sensors during monitoring may be based the physical simulation being executed. Such simulations may include, for example, computer terminal-based physical simulations, and/or simulations requiring physical activities within the simulation environment.

Additional techniques are described herein for generating and issuing digital credentials to digital credential receivers, based on actions detected within sensor-monitored environments. In certain embodiments, a digital credential generator may include an operation evaluation system having a plurality of configurable sensors directed to detect user activity within a physical environment. The evaluation system may monitor a physical environment associated with a user, in order to detect various user actions performed by the user within the environment during a predetermined time period. Sets of user operations may be determined based on the physical actions, and the user operations may be compared to digital credential criteria associated with a plurality of different digital credential types. When determining that user (or credential receiver) is eligible to receive one or more digital credentials based on the comparisons, the system may generate digital credentials based on the corresponding digital credential templates, and issue the digital credentials to the associated credential receivers. In some examples, digital credentials based on the analyses from operation evaluation systems may include embedded credentialing time data, credentialing location data, credentialing sensor system data, and the like. Sensors used by an operation evaluation systems may include, for example, software-based sensors and/or video or motion detection and analysis sensors. Additional sensors and monitoring techniques used during credentialing determinations may include biometric analysis and/or facial recognition for authentication, and/or credentialing.

Further techniques are described herein for tracking and analyzing digital credential usage in sensor-monitored environments. In certain embodiments, a digital credential platform server may be configured to receive data identifying credential receivers, and then to retrieve the digital credentials generated and issued to those credential receivers. The digital credential platform server may then determine sets of physical activities associated with the digital credentials issued to a credential receiver, and may use sensor-based monitoring systems to detect the user actions of the credential receiver and compare those actions to the physical activities associated with the credentials issued to that receiver. Such sensor-based monitoring systems may include computer-terminal based systems and/or larger scale physical monitoring environments. The comparisons between the user actions detected for the credential receiver, and the physical activities associated with the receiver's credentials, may be used to determine re-credentialing time periods, credential expiration times, etc. Additionally, in some cases, comparisons may include detecting a number of particular action types performed by the credential receiver, error rates, compliance with protocols, etc.

Additional techniques described herein may include generating and issuing digital credentials within a credentialing environment, including storing digital credentials with associated sensor data collected via a sensor-monitored environment. For example, a digital credential generation system may include a sensor-based monitoring or detection system, along with digital credential generation and issuing components. During an evaluation of a credential receiver, and generation/issuance of digital credentials to the receiver, the receiver may be monitored using various sensors. The digital credential generation system may determine the relevant sensor data, discarding unnecessary sensor data in some cases, and may store the relevant sensor data in a digital credential storage repository associated with the particular credential receiver. The associated sensor data may serve as authentication data and/or evidence of the completion of the credential criteria by the receiver. Additionally, in some cases, the stored sensor data may be automatically applied to additional digital credential criteria, such as updated criteria from the same digital credential, or criteria for different types of digital credentials, and the system may determine the receiver's eligibility based on the additional criteria. Thus, such techniques may allow the digital credential generation system to automatically generate and issue updated and/or additional digital credentials to receivers based on analyses of previously collected sensor data records, rather than requiring retesting or reevaluation by the receiver.

The techniques described herein may further include analysis, generation, and issuance of digital credentials based on feedback associated with credential receivers. For example, digital credential generation systems may use sensor detection systems to monitor the user actions of the credential receiver and capture sensor data of the user during the interactive assessments and other credentialing processes. Such captured sensor data may be, in some examples, non-verbal, non-written user response data detected during interactive computer-based assessment sessions, and may be collected using various devices such as biometric sensors, video or audio recording devices, facial expression or gesture capturing and analysis software, etc. The captured sensor data then may be stored as feedback data, along with the responses from the receiver collected during the interactive assessments. Such feedback data may be evaluated and used to authenticate the user, determine user emotion/response data during certain simulations and assessments. Additionally, the sensor feedback data collected for the user may be used in eligibility determinations for digital credentials in certain embodiments.

Figure 1:
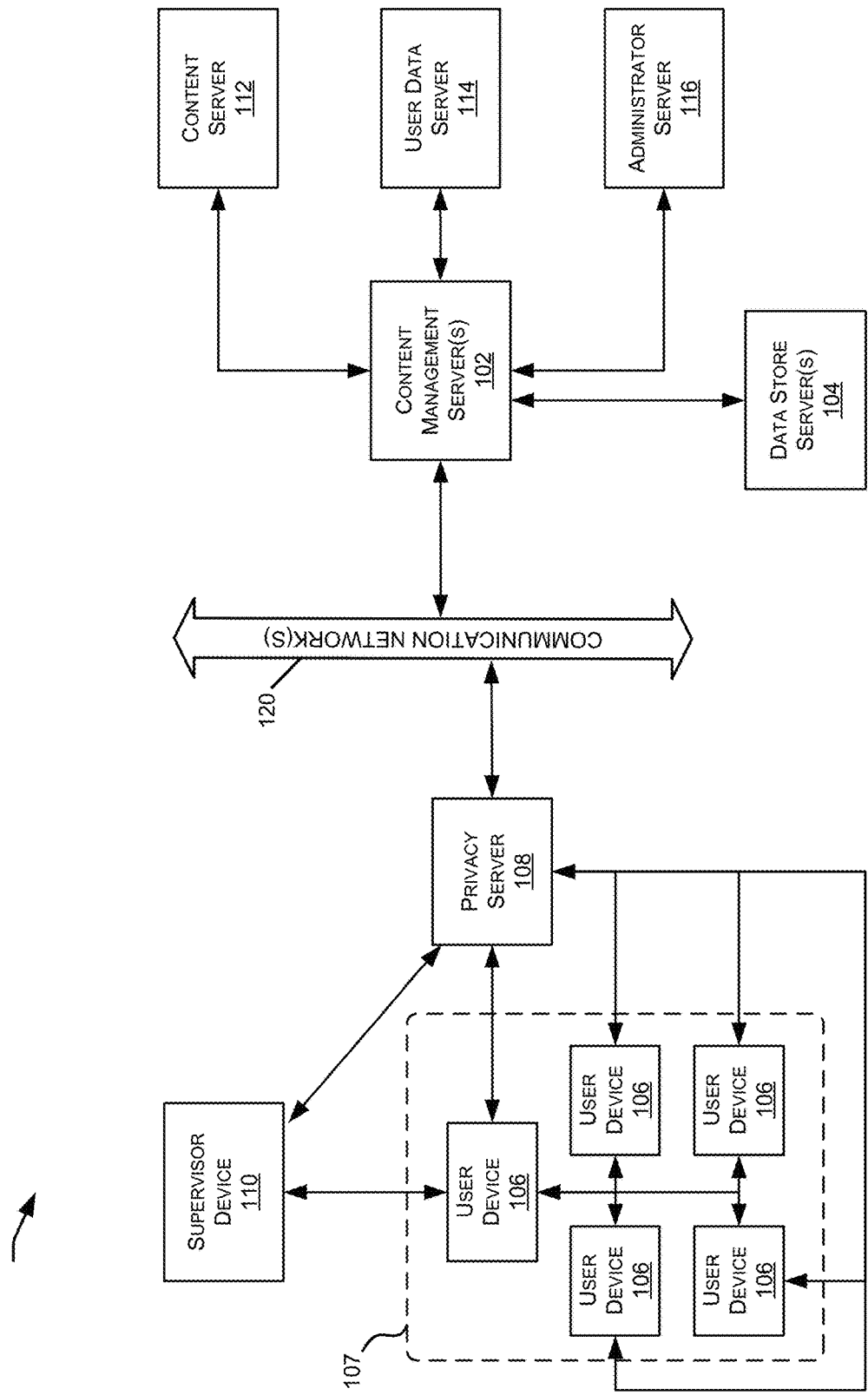
FIG. 1 is a block diagram showing illustrating an example of a content distribution network.

In the appended figures, similar components and/or features may have the same reference label. Further, various compo of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The ensuing description provides illustrative embodiment(s) only and is not intended to limit the scope, applicability or configuration of the disclosure. Rather, the ensuing description of the illustrative embodiment(s) will provide those skilled in the art with an enabling description for implementing a preferred exemplary embodiment. It is understood that various changes can be made in the function and arrangement of elements without departing from the spirit and scope as set forth in the appended claims.

Various techniques (e.g., systems, methods, computer-program products tangibly embodied in a non-transitory machine-readable storage medium, etc.) are described herein for executing and monitoring physical simulations within a digital credential platform. In various embodiments, techniques for generating digital credentials may include using physical simulation evaluation systems include sensor-based monitoring systems, simulation output systems, and/or simulation environment control systems. Within such systems, particular types of digital credential simulations may be determined and executed within a physical environment, during which a plurality of sensors may be used to monitor the physical actions of a user (or credential receiver) during the physical simulations. The physical action data may be analyzed to determine particular physical activities performed by the user, and the characteristics of the those physical activities, such as speed, efficiency, error rate, etc. The physical activities performed may be analyzed and compared to digital credential requirements to determine one or more digital credentials to be generated and issued to the credential receiver, based on the monitored activities. In certain embodiments, the physical simulation may be generated by controlling one or more output systems and/or environmental control systems. Additionally, the usage and configuration of sensors during monitoring may be based the physical simulation being executed. Such simulations may include, for example, computer terminal-based physical simulations, and/or simulations requiring physical activities within the simulation environment.

Additional techniques are described herein for generating and issuing digital credentials to digital credential receivers, based on actions detected within sensor-monitored environments. In certain embodiments, a digital credential generator may include an operation evaluation system having a plurality of configurable sensors directed to detect user activity within a physical environment. The evaluation system may monitor a physical environment associated with a user, in order to detect various user actions performed by the user within the environment during a predetermined time period. Sets of user operations may be determined based on the physical actions, and the user operations may be compared to digital credential criteria associated with a plurality of different digital credential types. When determining that user (or credential receiver) is eligible to receive one or more digital credentials based on the comparisons, the system may generate digital credentials based on the corresponding digital credential templates, and issue the digital credentials to the associated credential receivers. In some examples, digital credentials based on the analyses from operation evaluation systems may include embedded credentialing time data, credentialing location data, credentialing sensor system data, and the like. Sensors used by an operation evaluation systems may include, for example, software-based sensors and/or video or motion detection and analysis sensors. Additional sensors and monitoring techniques used during credentialing determinations may include biometric analysis and/or facial recognition for authentication, and/or credentialing.

Further techniques are described herein for tracking and analyzing digital credential usage in sensor-monitored environments. In certain embodiments, a digital credential platform server may be configured to receive data identifying credential receivers, and then to retrieve the digital credentials generated and issued to those credential receivers. The digital credential platform server may then determine sets of physical activities associated with the digital credentials issued to a credential receiver, and may use sensor-based monitoring systems to detect the user actions of the credential receiver and compare those actions to the physical activities associated with the credentials issued to that receiver. Such sensor-based monitoring systems may include computer-terminal based systems and/or larger scale physical monitoring environments. The comparisons between the user actions detected for the credential receiver, and the physical activities associated with the receiver's credentials, may be used to determine re-credentialing time periods, credential expiration times, etc. Additionally, in some cases, comparisons may include detecting a number of particular action types performed by the credential receiver, error rates, compliance with protocols, etc.

Additional techniques described herein may include generating and issuing digital credentials within a credentialing environment, including storing digital credentials with associated sensor data collected via a sensor-monitored environment. For example, a digital credential generation system may include a sensor-based monitoring or detection system, along with digital credential generation and issuing components. During an evaluation of a credential receiver, and generation/issuance of digital credentials to the receiver, the receiver may be monitored using various sensors. The digital credential generation system may determine the relevant sensor data, discarding unnecessary sensor data in some cases, and may store the relevant sensor data in a digital credential storage repository associated with the particular credential receiver. The associated sensor data may serve as authentication data and/or evidence of the completion of the credential criteria by the receiver. Additionally, in some cases, the stored sensor data may be automatically applied to additional digital credential criteria, such as updated criteria from the same digital credential, or criteria for different types of digital credentials, and the system may determine the receiver's eligibility based on the additional criteria. Thus, such techniques may allow the digital credential generation system to automatically generate and issue updated and/or additional digital credentials to receivers based on analyses of previously collected sensor data records, rather than requiring retesting or reevaluation by the receiver.

The techniques described herein may further include analysis, generation, and issuance of digital credentials based on feedback associated with credential receivers. For example, digital credential generation systems may use sensor detection systems to monitor the user actions of the credential receiver and capture sensor data of the user during the interactive assessments and other credentialing processes. Such captured sensor data may be, in some examples, non-verbal, non-written user response data detected during interactive computer-based assessment sessions, and may be collected using various devices such as biometric sensors, video or audio recording devices, facial expression or gesture capturing and analysis software, etc. The captured sensor data then may be stored as feedback data, along with the responses from the receiver collected during the interactive assessments. Such feedback data may be evaluated and used to authenticate the user, determine user emotion/response data during certain simulations and assessments. Additionally, the sensor feedback data collected for the user may be used in eligibility determinations for digital credentials in certain embodiments.

With reference now to FIG. 1, a block diagram is shown illustrating various components of a content distribution network (CDN) 100 which implements and supports certain embodiments and features described herein. Content distribution network 100 may include one or more content management servers 102. As discussed below in more detail, content management servers 102 may be any desired type of server including, for example, a rack server, a tower server, a miniature server, a blade server, a mini rack server, a mobile server, an ultra-dense server, a super server, or the like, and may include various hardware components, for example, a motherboard, a processing units, memory systems, hard drives, network interfaces, power supplies, etc. Content management server 102 may include one or more server farms, clusters, or any other appropriate arrangement and/or combination or computer servers. Content management server 102 may act according to stored instructions located in a memory subsystem of the server 102, and may run an operating system, including any commercially available server operating system and/or any other operating systems discussed herein.

The content distribution network 100 may include one or more data store servers 104, such as database servers and file-based storage systems. Data stores 104 may comprise stored data relevant to the functions of the content distribution network 100. Illustrative examples of data stores 104 that may be maintained in certain embodiments of the content distribution network 100 are described below in reference to FIG. 3. In some embodiments, multiple data stores may reside on a single server 104, either using the same storage components of server 104 or using different physical storage components to assure data security and integrity between data stores. In other embodiments, each data store may have a separate dedicated data store server 104.

Content distribution network 100 also may include one or more user devices 106 and/or supervisor devices 110. User devices 106 and supervisor devices 110 may display content received via the content distribution network 100, and may support various types of user interactions with the content. User devices 106 and supervisor devices 110 may include mobile devices such as smartphones, tablet computers, personal digital assistants, and wearable computing devices. Such mobile devices may run a variety of mobile operating systems, and may be enabled for Internet, e-mail, short message service (SMS), Bluetooth®, mobile radio-frequency identification (M-RFID), and/or other communication protocols. Other user devices 106 and supervisor devices 110 may be general purpose personal computers or special-purpose computing devices including by way of example, personal computers, laptop computers, workstation computers, projection devices, and interactive room display systems. Additionally, user devices 106 and supervisor devices 110 may be any other electronic devices, such as thin-client computers, Internet-enabled gaming systems, business or home appliances, and/or personal messaging devices, capable of communicating over network(s) 120.

In different contexts of content distribution networks 100, user devices 106 and supervisor devices 110 may correspond to different types of specialized devices, for example, student devices and teacher devices in an educational network, employee devices and presentation devices in a company network, different gaming devices in a gaming network, etc. In some embodiments, user devices 106 and supervisor devices 110 may operate in the same physical location 107, such as a classroom or conference room. In such cases, the devices may contain components that support direct communications with other nearby devices, such as a wireless transceivers and wireless communications interfaces, Ethernet sockets or other Local Area Network (LAN) interfaces, etc. In other implementations, the user devices 106 and supervisor devices 110 need not be used at the same location 107, but may be used in remote geographic locations in which each user device 106 and supervisor device 110 may use security features and/or specialized hardware (e.g., hardware-accelerated SSL and HTTPS, WS-Security, firewalls, etc.) to communicate with the content management server 102 and/or other remotely located user devices 106. Additionally, different user devices 106 and supervisor devices 110 may be assigned different designated roles, such as presenter devices, teacher devices, administrator devices, or the like, and in such cases the different devices may be provided with additional hardware and/or software components to provide content and support user capabilities not available to the other devices.

The content distribution network 100 also may include a privacy server 108 that maintains private user information at the privacy server 108 while using applications or services hosted on other servers. For example, the privacy server 108 may be used to maintain private data of a user within one jurisdiction even though the user is accessing an application hosted on a server (e.g., the content management server 102) located outside the jurisdiction. In such cases, the privacy server 108 may intercept communications between a user device 106 or supervisor device 110 and other devices that include private user information. The privacy server 108 may create a token or identifier that does not disclose the private information and may use the token or identifier when communicating with the other servers and systems, instead of using the user's private information.

As illustrated in FIG. 1, the content management server 102 may be in communication with one or more additional servers, such as a content server 112, a user data server 112, and/or an administrator server 116. Each of these servers may include some or all of the same physical and logical components as the content management server(s) 102, and in some cases, the hardware and software components of these servers 112-116 may be incorporated into the content management server(s) 102, rather than being implemented as separate computer servers.

Content server 112 may include hardware and software components to generate, store, and maintain the content resources for distribution to user devices 106 and other devices in the network 100. For example, in content distribution networks 100 used for professional training and educational purposes, content server 112 may include data stores of training materials, presentations, interactive programs and simulations, course models, course outlines, and various training interfaces that correspond to different materials and/or different types of user devices 106. In content distribution networks 100 used for media distribution, interactive gaming, and the like, a content server 112 may include media content files such as music, movies, television programming, games, and advertisements.

User data server 114 may include hardware and software components that store and process data for multiple users relating to each user's activities and usage of the content distribution network 100. For example, the content management server 102 may record and track each user's system usage, including their user device 106, content resources accessed, and interactions with other user devices 106. This data may be stored and processed by the user data server 114, to support user tracking and analysis features. For instance, in the professional training and educational contexts, the user data server 114 may store and analyze each user's training materials viewed, presentations attended, courses completed, interactions, evaluation results, and the like. The user data server 114 may also include a repository for user-generated material, such as evaluations and tests completed by users, and documents and assignments prepared by users. In the context of media distribution and interactive gaming, the user data server 114 may store and process resource access data for multiple users (e.g., content titles accessed, access times, data usage amounts, gaming histories, user devices and device types, etc.).

Administrator server 116 may include hardware and software components to initiate various administrative functions at the content management server 102 and other components within the content distribution network 100. For example, the administrator server 116 may monitor device status and performance for the various servers, data stores, and/or user devices 106 in the content distribution network 100. When necessary, the administrator server 116 may add or remove devices from the network 100, and perform device maintenance such as providing software updates to the devices in the network 100. Various administrative tools on the administrator server 116 may allow authorized users to set user access permissions to various content resources, monitor resource usage by users and devices 106, and perform analyses and generate reports on specific network users and/or devices (e.g., resource usage tracking reports, training evaluations, etc.).

The content distribution network 100 may include one or more communication networks 120. Although only a single network 120 is identified in FIG. 1, the content distribution network 100 may include any number of different communication networks between any of the computer servers and devices shown in FIG. 1 and/or other devices described herein. Communication networks 120 may enable communication between the various computing devices, servers, and other components of the content distribution network 100. As discussed below, various implementations of content distribution networks 100 may employ different types of networks 120, for example, computer networks, telecommunications networks, wireless networks, and/or any combination of these and/or other networks.

Figure 2:
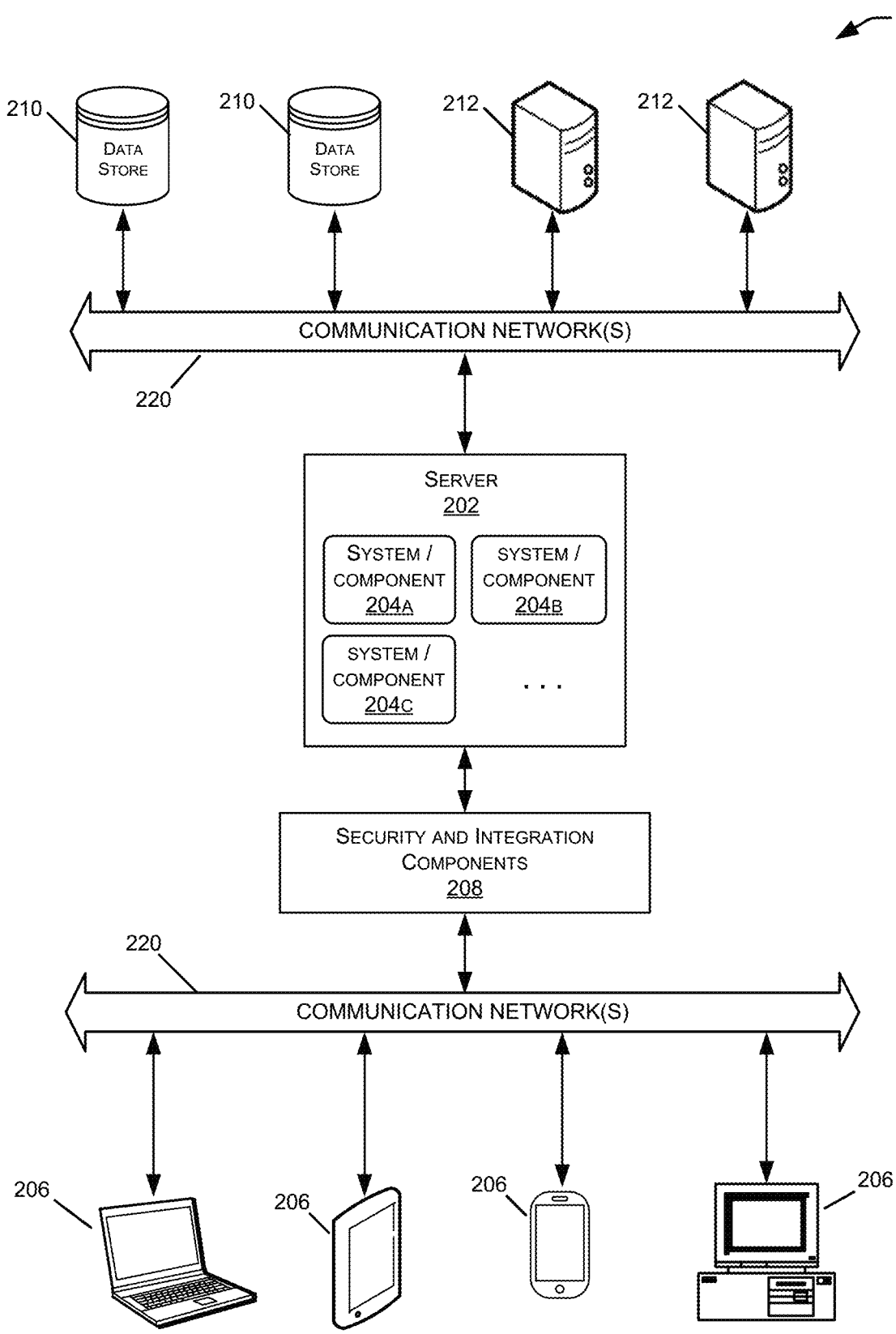
FIG. 2 is a block diagram illustrating a computer server and computing environment within a content distribution network.

With reference to FIG. 2, an illustrative distributed computing environment 200 is shown including a computer server 202, four client computing devices 206, and other components that may implement certain embodiments and features described herein. In some embodiments, the server 202 may correspond to the content management server 102 discussed above in FIG. 1, and the client computing devices 206 may correspond to the user devices 106. However, the computing environment 200 illustrated in FIG. 2 may correspond to any other combination of devices and servers configured to implement a client-server model or other distributed computing architecture.

Client devices 206 may be configured to receive and execute client applications over one or more networks 220. Such client applications may be web browser based applications and/or standalone software applications, such as mobile device applications. Server 202 may be communicatively coupled with the client devices 206 via one or more communication networks 220. Client devices 206 may receive client applications from server 202 or from other application providers (e.g., public or private application stores). Server 202 may be configured to run one or more server software applications or services, for example, web-based or cloud-based services, to support content distribution and interaction with client devices 206. Users operating client devices 206 may in turn utilize one or more client applications (e.g., virtual client applications) to interact with server 202 to utilize the services provided by these components.

Various different subsystems and/or components 204 may be implemented on server 202. Users operating the client devices 206 may initiate one or more client applications to use services provided by these subsystems and components. The subsystems and components within the server 202 and client devices 206 may be implemented in hardware, firmware, software, or combinations thereof. Various different system configurations are possible in different distributed computing systems 200 and content distribution networks 100. The embodiment shown in FIG. 2 is thus one example of a distributed computing system and is not intended to be limiting.

Although exemplary computing environment 200 is shown with four client computing devices 206, any number of client computing devices may be supported. Other devices, such as specialized sensor devices, etc., may interact with client devices 206 and/or server 202.

As shown in FIG. 2, various security and integration components 208 may be used to transmit, receive, and manage communications between the server 202 and user devices 206 over one or more communication networks 220. The security and integration components 208 may include separate servers, such as web servers and/or authentication servers, and/or specialized networking components, such as firewalls, routers, gateways, load balancers, and the like. In some cases, the security and integration components 208 may correspond to a set of dedicated hardware and/or software operating at the same physical location and under the control of same entities as server 202. For example, components 208 may include one or more dedicated web servers and network hardware in a datacenter or a cloud infrastructure. In other examples, the security and integration components 208 may correspond to separate hardware and software components which may be operated at a separate physical location and/or by a separate entity.

Security and integration components 208 may implement various security features for data transmission and storage, such as authenticating users and restricting access to unknown or unauthorized users. In various implementations, security and integration components 208 may provide, for example, a file-based integration scheme or a service-based integration scheme for transmitting data between the various devices in the content distribution network 100. Security and integration components 208 also may use secure data transmission protocols and/or encryption for data transfers, for example, File Transfer Protocol (FTP), Secure File Transfer Protocol (SFTP), and/or Pretty Good Privacy (PGP) encryption.

In some embodiments, one or more web services may be implemented within the security and integration components 208 and/or elsewhere within the content distribution network 100. Such web services, including cross-domain and/or cross-platform web services, may be developed for enterprise use in accordance with various web service standards, such as RESTful web services (i.e., services based on the Representation State Transfer (REST) architectural style and constraints), and/or web services designed in accordance with the Web Service Interoperability (WS-I) guidelines. Some web services may use the Secure Sockets Layer (SSL) or Transport Layer Security (TLS) protocol to provide secure connections between the server 202 and user devices 206. SSL or TLS may use HTTP or HTTPS to provide authentication and confidentiality. In other examples, web services may be implemented using REST over HTTPS with the OAuth open standard for authentication, or using the WS-Security standard which provides for secure SOAP messages using XML, encryption. In other examples, the security and integration components 208 may include specialized hardware for providing secure web services. For example, security and integration components 208 may include secure network appliances having built-in features such as hardware-accelerated SSL and HTTPS, WS-Security, and firewalls. Such specialized hardware may be installed and configured in front of any web servers, so that any external devices may communicate directly with the specialized hardware.

Communication network(s) 220 may be any type of network familiar to those skilled in the art that can support data communications using any of a variety of commercially-available protocols, including without limitation, TCP/IP (transmission control protocol/Internet protocol), SNA (systems network architecture), IPX (Internet packet exchange), Secure Sockets Layer (SSL) or Transport Layer Security (TLS) protocols, Hyper Text Transfer Protocol (HTTP) and Secure Hyper Text Transfer Protocol (HTTPS), Bluetooth®, Near Field Communication (NFC), and the like. Merely by way of example, network(s) 220 may be local area networks (LAN), such as one based on Ethernet, Token-Ring and/or the like. Network(s) 220 also may be wide-area networks, such as the Internet. Networks 220 may include telecommunication networks such as a public switched telephone networks (PSTNs), or virtual networks such as an intranet or an extranet. Infrared and wireless networks (e.g., using the Institute of Electrical and Electronics (IEEE) 802.11 protocol suite or other wireless protocols) also may be included in networks 220.

Computing environment 200 also may include one or more data stores 210 and/or back-end servers 212. In certain examples, the data stores 210 may correspond to data store server(s) 104 discussed above in FIG. 1, and back-end servers 212 may correspond to the various back-end servers 112-116. Data stores 210 and servers 212 may reside in the same datacenter or may operate at a remote location from server 202. In some cases, one or more data stores 210 may reside on a non-transitory storage medium within the server 202. Other data stores 210 and back-end servers 212 may be remote from server 202 and configured to communicate with server 202 via one or more networks 220. In certain embodiments, data stores 210 and back-end servers 212 may reside in a storage-area network (SAN), or may use storage-as-a-service (STaaS) architectural model.

Figure 3:
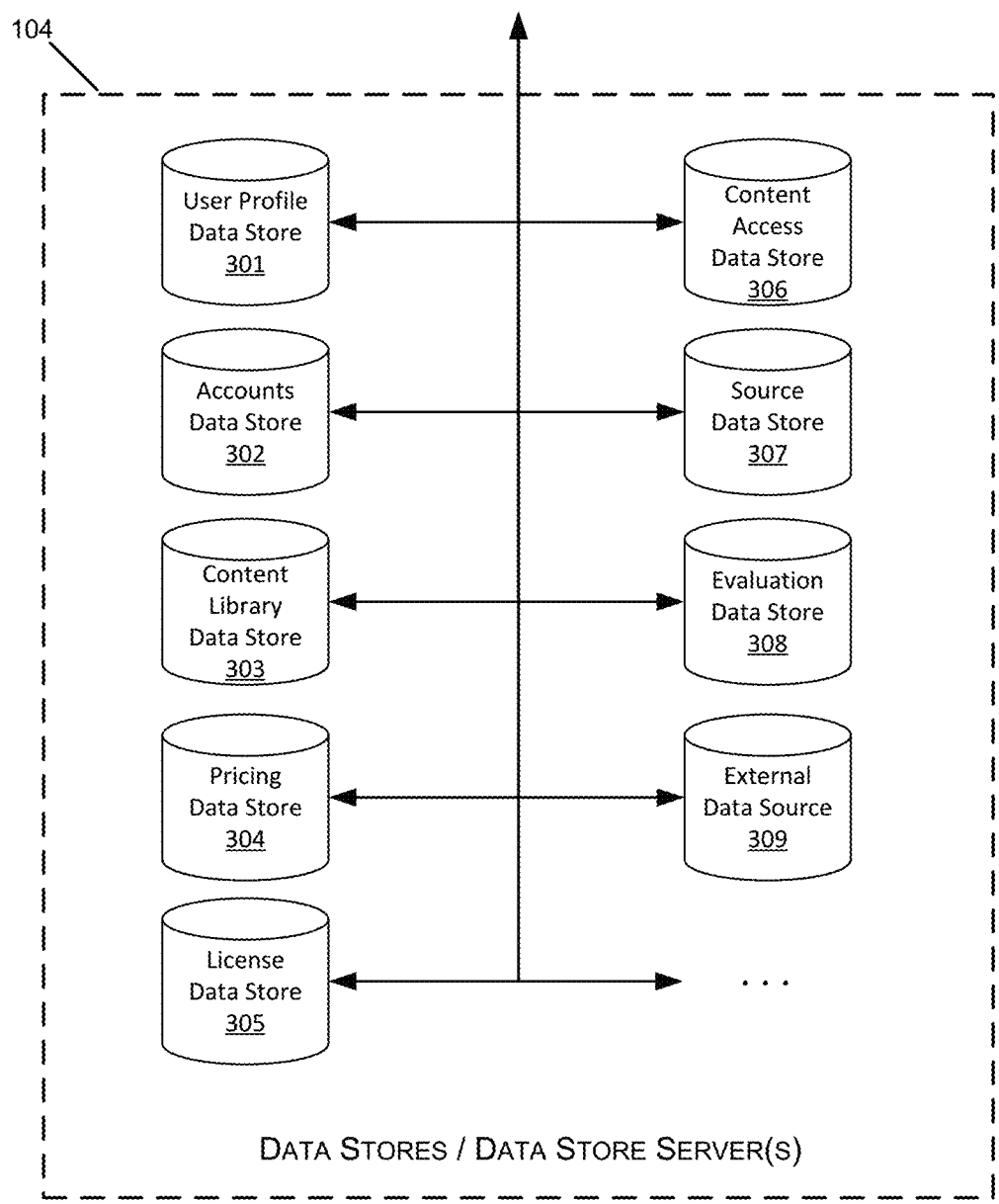
FIG. 3 is a block diagram illustrating an embodiment of one or more data store servers within a content distribution network.

With reference to FIG. 3, an illustrative set of data stores and/or data store servers is shown, corresponding to the data store servers 104 of the content distribution network 100 discussed above in FIG. 1. One or more individual data stores 301-309 may reside in storage on a single computer server 104 (or a single server farm or cluster) under the control of a single entity, or may reside on separate servers operated by different entities and/or at remote locations. In some embodiments, data stores 301-309 may be accessed by the content management server 102 and/or other devices and servers within the network 100 (e.g., user devices 106, supervisor devices 110, administrator servers 116, etc.). Access to one or more of the data stores 301-309 may be limited or denied based on the processes, user credentials, and/or devices attempting to interact with the data store.

The paragraphs below describe examples of specific data stores that may be implemented within some embodiments of a content distribution network 100. It should be understood that the below descriptions of data stores 301-309, including their functionality and types of data stored therein, are illustrative and non-limiting. Data stores server architecture, design, and the execution of specific data stores 301-309 may depend on the context, size, and functional requirements of a content distribution network 100. For example, in content distribution systems 100 used for professional training and educational purposes, separate databases or file-based storage systems may be implemented in data store server(s) 104 to store trainee and/or student data, trainer and/or professor data, training module data and content descriptions, training results, evaluation data, and the like. In contrast, in content distribution systems 100 used for media distribution from content providers to subscribers, separate data stores may be implemented in data stores server(s) 104 to store listings of available content titles and descriptions, content title usage statistics, subscriber profiles, account data, payment data, network usage statistics, etc.

A user profile data store 301 may include information relating to the end users within the content distribution network 100. This information may include user characteristics such as the user names, access credentials (e.g., login and passwords), user preferences, and information relating to any previous user interactions within the content distribution network 100 (e.g., requested content, posted content, content modules completed, training scores or evaluations, other associated users, etc.).

An accounts data store 302 may generate and store account data for different users in various roles within the content distribution network 100. For example, accounts may be created in an accounts data store 302 for individual end users, supervisors, administrator users, and entities such as companies or educational institutions. Account data may include account types, current account status, account characteristics, and any parameters, limits, restrictions associated with the accounts.

A content library data store 303 may include information describing the individual content items (or content resources) available via the content distribution network 100. In some embodiments, the library data store 303 may include metadata, properties, and other characteristics associated with the content resources stored in the content server 112. Such data may identify one or more aspects or content attributes of the associated content resources, for example, subject matter, access level, or skill level of the content resources, license attributes of the content resources (e.g., any limitations and/or restrictions on the licensable use and/or distribution of the content resource), price attributes of the content resources (e.g., a price and/or price structure for determining a payment amount for use or distribution of the content resource), rating attributes for the content resources (e.g., data indicating the evaluation or effectiveness of the content resource), and the like. In some embodiments, the library data store 303 may be configured to allow updating of content metadata or properties, and to allow the addition and/or removal of information relating to the content resources. For example, content relationships may be implemented as graph structures, which may be stored in the library data store 303 or in an additional store for use by selection algorithms along with the other metadata.

A pricing data store 304 may include pricing information and/or pricing structures for determining payment amounts for providing access to the content distribution network 100 and/or the individual content resources within the network 100. In some cases, pricing may be determined based on a user's access to the content distribution network 100, for example, a time-based subscription fee, or pricing based on network usage and. In other cases, pricing may be tied to specific content resources. Certain content resources may have associated pricing information, whereas other pricing determinations may be based on the resources accessed, the profiles and/or accounts of the user, and the desired level of access (e.g., duration of access, network speed, etc.). Additionally, the pricing data store 304 may include information relating to compilation pricing for groups of content resources, such as group prices and/or price structures for groupings of resources.

A license data store 305 may include information relating to licenses and/or licensing of the content resources within the content distribution network 100. For example, the license data store 305 may identify licenses and licensing terms for individual content resources and/or compilations of content resources in the content server 112, the rights holders for the content resources, and/or common or large-scale right holder information such as contact information for rights holders of content not included in the content server 112.

A content access data store 306 may include access rights and security information for the content distribution network 100 and specific content resources. For example, the content access data store 306 may include login information (e.g., user identifiers, logins, passwords, etc.) that can be verified during user login attempts to the network 100. The content access data store 306 also may be used to store assigned user roles and/or user levels of access. For example, a user's access level may correspond to the sets of content resources and/or the client or server applications that the user is permitted to access. Certain users may be permitted or denied access to certain applications and resources based on their subscription level, training program, course/grade level, etc. Certain users may have supervisory access over one or more end users, allowing the supervisor to access all or portions of the end user's content, activities, evaluations, etc. Additionally, certain users may have administrative access over some users and/or some applications in the content management network 100, allowing such users to add and remove user accounts, modify user access permissions, perform maintenance updates on software and servers, etc.

A source data store 307 may include information relating to the source of the content resources available via the content distribution network. For example, a source data store 307 may identify the authors and originating devices of content resources, previous pieces of data and/or groups of data originating from the same authors or originating devices, and the like.

An evaluation data store 308 may include information used to direct the evaluation of users and content resources in the content management network 100. In some embodiments, the evaluation data store 308 may contain, for example, the analysis criteria and the analysis guidelines for evaluating users (e.g., trainees/students, gaming users, media content consumers, etc.) and/or for evaluating the content resources in the network 100. The evaluation data store 308 also may include information relating to evaluation processing tasks, for example, the identification of users and user devices 106 that have received certain content resources or accessed certain applications, the status of evaluations or evaluation histories for content resources, users, or applications, and the like. Evaluation criteria may be stored in the evaluation data store 308 including data and/or instructions in the form of one or several electronic rubrics or scoring guides for use in the evaluation of the content, users, or applications. The evaluation data store 308 also may include past evaluations and/or evaluation analyses for users, content, and applications, including relative rankings, characterizations, explanations, and the like.

In addition to the illustrative data stores described above, data store server(s) 104 (e.g., database servers, file-based storage servers, etc.) may include one or more external data aggregators 309. External data aggregators 309 may include third-party data sources accessible to the content management network 100, but not maintained by the content management network 100. External data aggregators 309 may include any electronic information source relating to the users, content resources, or applications of the content distribution network 100. For example, external data aggregators 309 may be third-party data stores containing demographic data, education related data, consumer sales data, health related data, and the like. Illustrative external data aggregators 309 may include, for example, social networking web servers, public records data stores, learning management systems, educational institution servers, business servers, consumer sales data stores, medical record data stores, etc. Data retrieved from various external data aggregators 309 may be used to verify and update user account information, suggest user content, and perform user and content evaluations.

Figure 4:
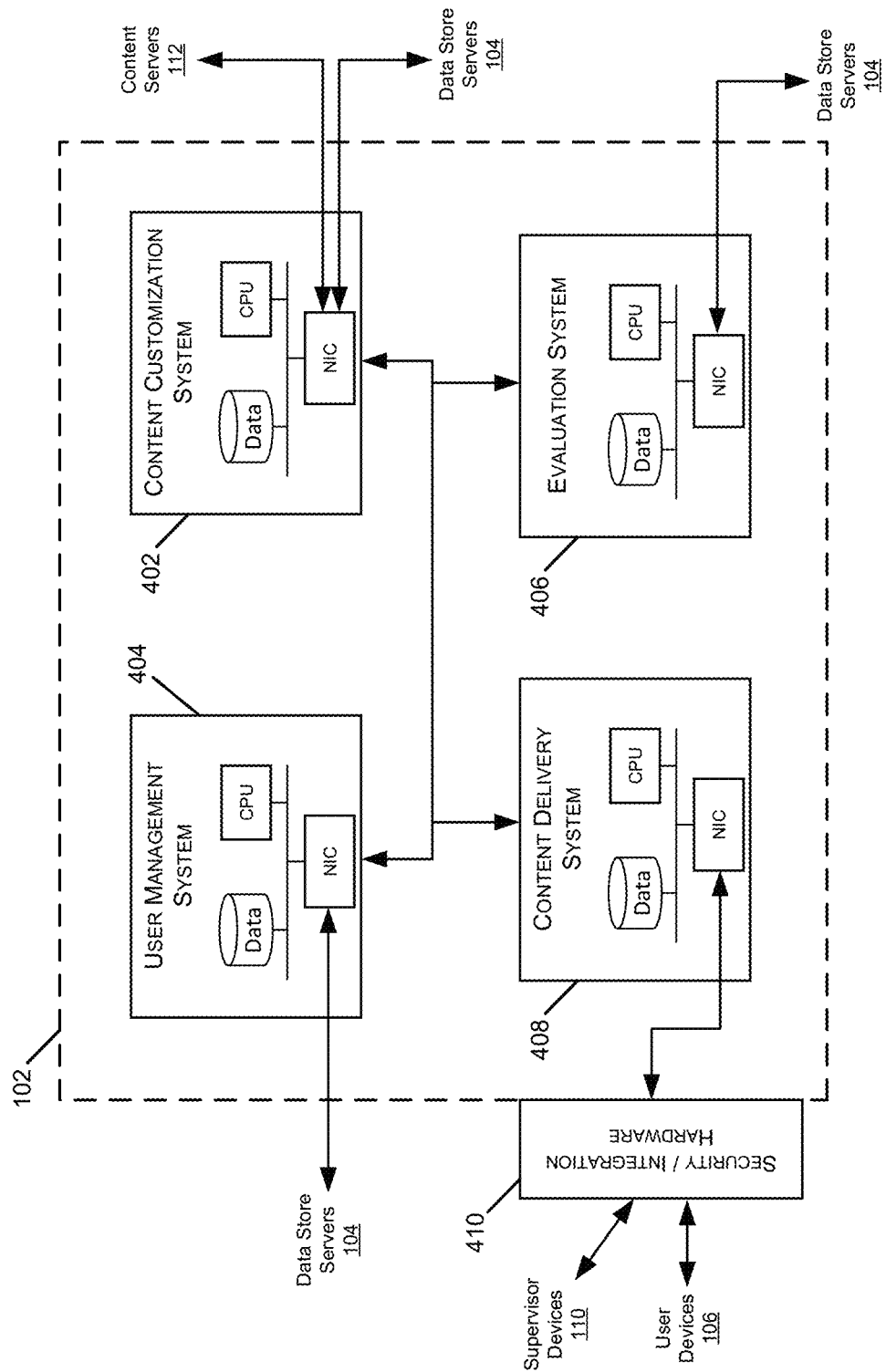
FIG. 4 is a block diagram illustrating an embodiment of one or more content management servers within a content distribution network.

With reference now to FIG. 4, a block diagram is shown illustrating an embodiment of one or more content management servers 102 within a content distribution network 100. As discussed above, content management server(s) 102 may include various server hardware and software components that manage the content resources within the content distribution network 100 and provide interactive and adaptive content to users on various user devices 106. For example, content management server(s) 102 may provide instructions to and receive information from the other devices within the content distribution network 100, in order to manage and transmit content resources, user data, and server or client applications executing within the network 100.

A content management server 102 may include a content customization system 402. The content customization system 402 may be implemented using dedicated hardware within the content distribution network 100 (e.g., a content customization server 402), or using designated hardware and software resources within a shared content management server 102. In some embodiments, the content customization system 402 may adjust the selection and adaptive capabilities of content resources to match the needs and desires of the users receiving the content. For example, the content customization system 402 may query various data stores and servers 104 to retrieve user information, such as user preferences and characteristics (e.g., from a user profile data store 301), user access restrictions to content recourses (e.g., from a content access data store 306), previous user results and content evaluations (e.g., from an evaluation data store 308), and the like. Based on the retrieved information from data stores 104 and other data sources, the content customization system 402 may modify content resources for individual users.

A content management server 102 also may include a user management system 404. The user management system 404 may be implemented using dedicated hardware within the content distribution network 100 (e.g., a user management server 404), or using designated hardware and software resources within a shared content management server 102. In some embodiments, the user management system 404 may monitor the progress of users through various types of content resources and groups, such as media compilations, courses or curriculums in training or educational contexts, interactive gaming environments, and the like. For example, the user management system 404 may query one or more databases and/or data store servers 104 to retrieve user data such as associated content compilations or programs, content completion status, user goals, results, and the like.

A content management server 102 also may include an evaluation system 406. The evaluation system 406 may be implemented using dedicated hardware within the content distribution network 100 (e.g., an evaluation server 406), or using designated hardware and software resources within a shared content management server 102. The evaluation system 406 may be configured to receive and analyze information from user devices 106. For example, various ratings of content resources submitted by users may be compiled and analyzed, and then stored in a data store (e.g., a content library data store 303 and/or evaluation data store 308) associated with the content. In some embodiments, the evaluation server 406 may analyze the information to determine the effectiveness or appropriateness of content resources with, for example, a subject matter, an age group, a skill level, or the like. In some embodiments, the evaluation system 406 may provide updates to the content customization system 402 or the user management system 404, with the attributes of one or more content resources or groups of resources within the network 100. The evaluation system 406 also may receive and analyze user evaluation data from user devices 106, supervisor devices 110, and administrator servers 116, etc. For instance, evaluation system 406 may receive, aggregate, and analyze user evaluation data for different types of users (e.g., end users, supervisors, administrators, etc.) in different contexts (e.g., media consumer ratings, trainee or student comprehension levels, teacher effectiveness levels, gamer skill levels, etc.).

A content management server 102 also may include a content delivery system 408. The content delivery system 408 may be implemented using dedicated hardware within the content distribution network 100 (e.g., a content delivery server 408), or using designated hardware and software resources within a shared content management server 102. The content delivery system 408 may receive content resources from the content customization system 402 and/or from the user management system 404, and provide the resources to user devices 106. The content delivery system 408 may determine the appropriate presentation format for the content resources based on the user characteristics and preferences, and/or the device capabilities of user devices 106. If needed, the content delivery system 408 may convert the content resources to the appropriate presentation format and/or compress the content before transmission. In some embodiments, the content delivery system 408 may also determine the appropriate transmission media and communication protocols for transmission of the content resources.

In some embodiments, the content delivery system 408 may include specialized security and integration hardware 410, along with corresponding software components to implement the appropriate security features content transmission and storage, to provide the supported network and client access models, and to support the performance and scalability requirements of the network 100. The security and integration layer 410 may include some or all of the security and integration components 208 discussed above in FIG. 2, and may control the transmission of content resources and other data, as well as the receipt of requests and content interactions, to and from the user devices 106, supervisor devices 110, administrative servers 116, and other devices in the network 100.

Figure 5:
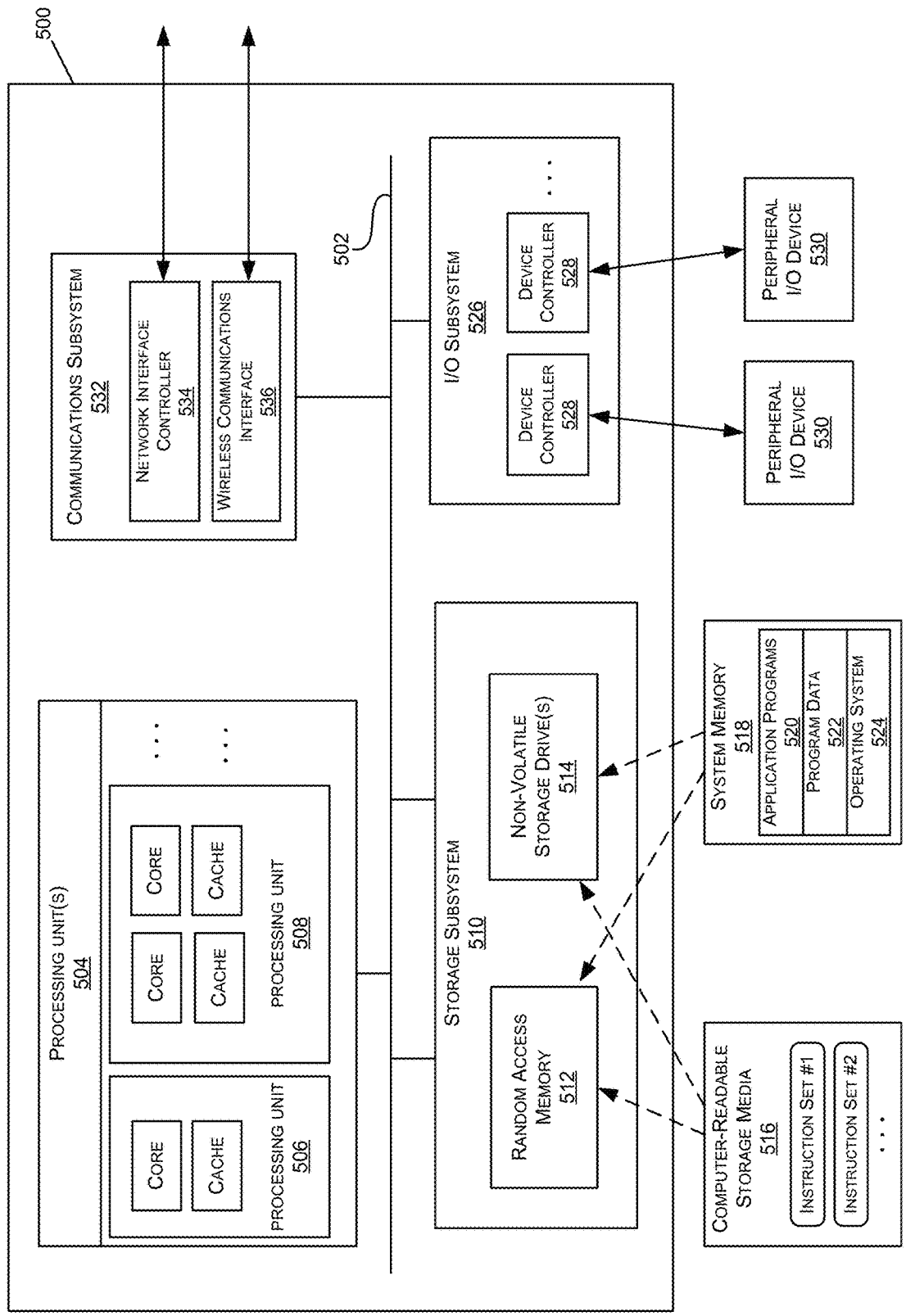
FIG. 5 is a block diagram illustrating the physical and logical components of a special-purpose computer device within a content distribution network.

With reference now to FIG. 5, a block diagram of an illustrative computer system is shown. The system 500 may correspond to any of the computing devices or servers of the content distribution network 100 described above, or any other computing devices described herein. In this example, computer system 500 includes processing units 504 that communicate with a number of peripheral subsystems via a bus subsystem 502. These peripheral subsystems include, for example, a storage subsystem 510, an I/O subsystem 526, and a communications subsystem 532.

Bus subsystem 502 provides a mechanism for letting the various components and subsystems of computer system 500 communicate with each other as intended. Although bus subsystem 502 is shown schematically as a single bus, alternative embodiments of the bus subsystem may utilize multiple buses. Bus subsystem 502 may be any of several types of bus structures including a memory bus or memory controller, a peripheral bus, and a local bus using any of a variety of bus architectures. Such architectures may include, for example, an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 504, which may be implemented as one or more integrated circuits (e.g., a conventional microprocessor or microcontroller), controls the operation of computer system 500. One or more processors, including single core and/or multicore processors, may be included in processing unit 504. As shown in the figure, processing unit 504 may be implemented as one or more independent processing units 506 and/or 508 with single or multicore processors and processor caches included in each processing unit. In other embodiments, processing unit 504 may also be implemented as a quad-core processing unit or larger multicore designs (e.g., hexa-core processors, octo-core processors, ten-core processors, or greater.

Processing unit 504 may execute a variety of software processes embodied in program code, and may maintain multiple concurrently executing programs or processes. At any given time, some or all of the program code to be executed can be resident in processor(s) 504 and/or in storage subsystem 510. In some embodiments, computer system 500 may include one or more specialized processors, such as digital signal processors (DSPs), outboard processors, graphics processors, application-specific processors, and/or the like.

I/O subsystem 526 may include device controllers 528 for one or more user interface input devices and/or user interface output devices 530. User interface input and output devices 530 may be integral with the computer system 500 (e.g., integrated audio/video systems, and/or touchscreen displays), or may be separate peripheral devices which are attachable/detachable from the computer system 500.

Input devices 530 may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. Input devices 530 may also include three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additional input devices 530 may include, for example, motion sensing and/or gesture recognition devices that enable users to control and interact with an input device through a natural user interface using gestures and spoken commands, eye gesture recognition devices that detect eye activity from users and transform the eye gestures as input into an input device, voice recognition sensing devices that enable users to interact with voice recognition systems through voice commands, medical imaging input devices, MIDI keyboards, digital musical instruments, and the like.

Output devices 530 may include one or more display subsystems, indicator lights, or non-visual displays such as audio output devices, etc. Display subsystems may include, for example, cathode ray tube (CRT) displays, flat-panel devices, such as those using a liquid crystal display (LCD) or plasma display, light-emitting diode (LED) displays, projection devices, touch screens, and the like. In general, use of the term "output device" is intended to include all possible types of devices and mechanisms for outputting information from computer system 500 to a user or other computer. For example, output devices 530 may include, without limitation, a variety of display devices that visually convey text, graphics and audio/video information such as monitors, printers, speakers, headphones, automotive navigation systems, plotters, voice output devices, and modems.

Computer system 500 may comprise one or more storage subsystems 510, comprising hardware and software components used for storing data and program instructions, such as system memory 518 and computer-readable storage media 516. The system memory 518 and/or computer-readable storage media 516 may store program instructions that are loadable and executable on processing units 504, as well as data generated during the execution of these programs.

Depending on the configuration and type of computer system 500, system memory 318 may be stored in volatile memory (such as random access memory (RAM) 512) and/or in non-volatile storage drives 514 (such as read-only memory (ROM), flash memory, etc.) The RAM 512 may contain data and/or program modules that are immediately accessible to and/or presently being operated and executed by processing units 504. In some implementations, system memory 518 may include multiple different types of memory, such as static random access memory (SRAM) or dynamic random access memory (DRAM). In some implementations, a basic input/output system (BIOS), containing the basic routines that help to transfer information between elements within computer system 500, such as during start-up, may typically be stored in the non-volatile storage drives 514. By way of example, and not limitation, system memory 518 may include application programs 520, such as client applications, Web browsers, mid-tier applications, server applications, etc., program data 522, and an operating system 524.

Storage subsystem 510 also may provide one or more tangible computer-readable storage media 516 for storing the basic programming and data constructs that provide the functionality of some embodiments. Software (programs, code modules, instructions) that when executed by a processor provide the functionality described herein may be stored in storage subsystem 510. These software modules or instructions may be executed by processing units 504. Storage subsystem 510 may also provide a repository for storing data used in accordance with the present invention.

Storage subsystem 300 may also include a computer-readable storage media reader that can further be connected to computer-readable storage media 516. Together and, optionally, in combination with system memory 518, computer-readable storage media 516 may comprehensively represent remote, local, fixed, and/or removable storage devices plus storage media for temporarily and/or more permanently containing, storing, transmitting, and retrieving computer-readable information.

Computer-readable storage media 516 containing program code, or portions of program code, may include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computer system 500.

By way of example, computer-readable storage media 516 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 516 may include, but is not limited to, Zip® drives, flash memory cards, universal serial bus (USB) flash drives, secure digital (SD) cards, DVD disks, digital video tape, and the like. Computer-readable storage media 516 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 500.

Communications subsystem 532 may provide a communication interface from computer system 500 and external computing devices via one or more communication networks, including local area networks (LANs), wide area networks (WANs) (e.g., the Internet), and various wireless telecommunications networks. As illustrated in FIG. 5, the communications subsystem 532 may include, for example, one or more network interface controllers (NICs) 534, such as Ethernet cards, Asynchronous Transfer Mode NICs, Token Ring NICs, and the like, as well as one or more wireless communications interfaces 536, such as wireless network interface controllers (WNICs), wireless network adapters, and the like. Additionally and/or alternatively, the communications subsystem 532 may include one or more modems (telephone, satellite, cable, ISDN), synchronous or asynchronous digital subscriber line (DSL) units, FireWire® interfaces, USB® interfaces, and the like. Communications subsystem 536 also may include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components.

The various physical components of the communications subsystem 532 may be detachable components coupled to the computer system 500 via a computer network, a Fire-Wire® bus, or the like, and/or may be physically integrated onto a motherboard of the computer system 500. Communications subsystem 532 also may be implemented in whole or in part by software.

In some embodiments, communications subsystem 532 may also receive input communication in the form of structured and/or unstructured data feeds, event streams, event updates, and the like, on behalf of one or more users who may use or access computer system 500. For example, communications subsystem 532 may be configured to receive data feeds in real-time from users of social networks and/or other communication services, web feeds such as Rich Site Summary (RSS) feeds, and/or real-time updates from one or more third party information sources (e.g., data aggregators 309). Additionally, communications subsystem 532 may be configured to receive data in the form of continuous data streams, which may include event streams of real-time events and/or event updates (e.g., sensor data applications, financial tickers, network performance measuring tools, clickstream analysis tools, automobile traffic monitoring, etc.). Communications subsystem 532 may output such structured and/or unstructured data feeds, event streams, event updates, and the like to one or more data stores 104 that may be in communication with one or more streaming data source computers coupled to computer system 500.

Due to the ever-changing nature of computers and networks, the description of computer system 500 depicted in the figure is intended only as a specific example. Many other configurations having more or fewer components than the system depicted in the figure are possible. For example, customized hardware might also be used and/or particular elements might be implemented in hardware, firmware, software, or a combination. Further, connection to other computing devices, such as network input/output devices, may be employed. Based on the disclosure and teachings provided herein, a person of ordinary skill in the art will appreciate other ways and/or methods to implement the various embodiments.

Figure 6:
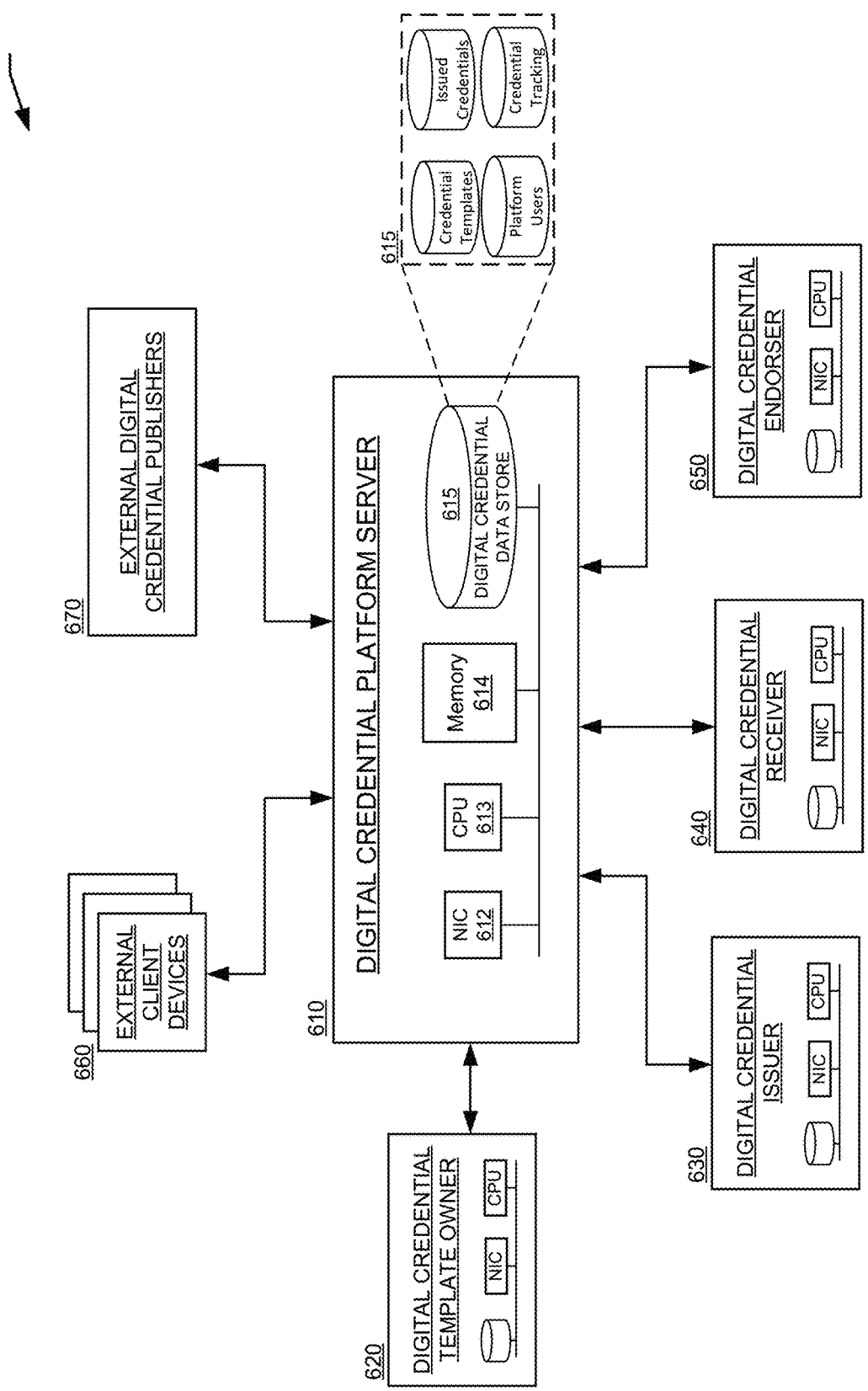
FIG. 6 is a block diagram illustrating an example computing environment for generating, managing, and tracking digital credential templates and digital credentials, according to one or more embodiments of the disclosure.

With reference now to FIG. 6, a block diagram is shown illustrating an example of a digital credential management system 600 for generating, managing, and tracking digital credential templates and digital credentials. As shown in this example, a digital credential management system 600 may include a digital credential platform server 610 configured to communicate with various other digital credential systems 620-680. As discussed below, the digital credential platform server 610 may receive and store digital credential templates from various digital credential template owner systems 620. Systems 620 may correspond to the computer servers and/or devices of educational institutions or professional training organizations, which may have the primary responsibility for defining a digital credential template and controlling the content and requirements for users to receive a digital credential from the organization. The digital credential management system 600 may include one or more digital credential issuer systems 630. As discussed below, each issuer system 630 may communicate with the platform server to request and receive access to issue digital credentials based on specific digital credential templates. The platform server 610 may process template access requests from the credential issuer systems 630, permitting or denying a specific system 630 to generate (or issue) a digital credential based on a specific digital credential template.

As used herein, a digital credential template (or digital badge template) may refer to an electronic document or data structure storing a general (e.g., non-user specific) template or description of a specific type of digital credential that may be issued to an individual. Digital credential templates may include, for example, a description of the skills, proficiencies, and/or achievements that the digital credential represents. This description may take the form of diploma data, certification data, and/or license data, including the parent organization (i.e., the digital credential template owner) responsible for creating and defining the digital credential template. Examples of digital credential templates may include templates for various technology certifications, licensure exams, professional tests, training course completion certificates, and the like. In contrast to a digital credential template, a digital credential (or digital badge) may refer to an instance of an electronic document or data structure, generated for a specific individual (i.e., the credential receiver), and based on a digital credential template. Thus, a digital credential document or data structure may be based on a corresponding digital credential template, but may be customized and populated with user-specific information such as individual identification data (e.g., name, email address, and other user identifiers), credential issuance data (e.g., issue date, geographic location of issuance, authorized issuer of the credential, etc.), and links or embedded data that contain the specific user's supporting documentation or evidence relating to the credential.

As shown in this example, the system 600 also may include a digital credential receiver system 640 and a digital credential endorser system 650. The digital credential receiver system 640 may be a computing device associated with a credential receiver (or credential earner), for example, an individual user of an electronic learning system, professional training system, online certification course, etc. In some embodiments, credential receivers may access the platform server 610 via systems 640 to accept or reject newly issued digital credentials, review and update their own set of previously earned digital credentials, as well as to publish (or share) their digital credentials via communication applications or publishing platforms such as social media systems. Digital credential endorser system 650 may be a computing system associated with an endorsing entity, such as an educational institution, business, or technical organization that has chosen to review and endorse a specific digital credential template. The platform server 610 may receive and track the endorsements received from systems 650, and may associate the endorsements with the user-specific digital credentials issued based on the endorsed templates.

Additionally, the digital credential management system 600 in this example includes a number of external client devices 660 and external digital credential publishers 670. External client devices 660 may correspond to computing systems of third-party users that may interact with the platform server 610 to initiate various functionality or retrieve data relating to templates and/or digital credentials managed by the platform 610. For example, a client device 660 may query the platform server 610 for data metrics and/or analyses relating to a subset of digital credentials stored in the digital credential data store 615. The third-party systems 660 also may provide data to the platform server 610 that may initiate updates to the templates and/or digital credentials stored in the data store 615. External digital credential publishers 670 may correspond to third-party systems configured to receive digital credential data from the platform 610 and publish (or present) the digital credential data to users. Examples of publishers 670 may include social media web site and systems, digital badge wallets, and/or other specialized servers or applications configured to store and present views of digital badges to users.

In various embodiments described herein, the generation and management of digital credentials, as well as the tracking and reporting of digital credential data, may be performed within CDNs 100, such as eLearning, professional training, and certification systems 100. For example, within the context of an eLearning CDN 100, a content management server 102 or other CDN server (e.g., 104, 112, 114, or 116) may create and store digital credential templates to describe and define various proficiencies, achievements, or certifications supported by the eLearning CDN 100. Additionally or alternatively, the content management server 102 or other servers of an eLearning CDN 100 may issue digital credentials to users, based on its own digital certificate templates and/or templates received from other systems or CDNs. Further, in some implementations, an eLearning CDN 100 may be configured to include a digital credential platform server 610 to store and manage templates and digital credentials between separate systems within the CDN 100. Thus, in various different implementations, the content management server(s) 102 of a CDN 100 may incorporate one or more digital certificate template owner system(s) 620, digital certificate issuer system(s) 630, and/or digital certificate platform server(s) 610. In such embodiments, the various components and functionalities described herein for the platform server 610, owner system 620, and/or issuer system 630 all may be implemented within one or more content management servers 102 (and/or other servers) of an eLearning or professional training CDN 100. In other examples, a digital credential platform server 610 may be implemented using one or more computer servers, and other specialized hardware and software components, separately from any other CDN components such as content servers 112, content management servers 102, data store servers 104, and the like. In these examples, the digital credential platform server 610 may be configured to communicate directly with related systems 620-670, or indirectly through content management servers 102 and/or other components and communications networks of the CDN 100.

In order to perform these features and other functionality described herein, each of the components and sub-components discussed in the example digital credential management system 600 may correspond to a single computer server or a complex computing system including a combination of computing devices, storage devices, network components, etc. Each of these components and their respective subcomponents may be implemented in hardware, software, or a combination thereof. Certain systems 620-670 may communicate directly with the platform server 610, while other systems 620-670 may communicate with the platform server 610 indirectly via one or more intermediary network components (e.g., routers, gateways, firewalls, etc.) or other devices (e.g., content management servers 102, content servers 112, etc.). Although the different communication networks and physical network components have not been shown in this example so as not to obscure the other elements depicted in the figure, it should be understood that any of the network hardware components and network architecture designs may be implemented in various embodiments to support communication between the systems, servers, and devices in the digital credential management system 600. Additionally, different systems 620-670 may use different networks and networks types to communicate with the platform server 610, including one or more telecommunications networks, cable networks, satellite networks, cellular networks and other wireless networks, and computer-based IP networks, and the like. Further, certain components within the digital credential management system 600 may include special purpose hardware devices and/or special purpose software, such as those included in I/O subsystem 611 and memory 614 of the platform server 610, as well as those within the memory of the other systems 620-670, and the digital credential data store 615 maintained by the platform server 610, discussed below.

Although the various interactions between the platform server 610 and other systems 620-670 may be described below in terms of a client-server model, it should be understood that other computing environments and various combinations of servers and devices may be used to perform the functionality described herein in other embodiments. For instance, although the requests/responses to determine the authorized issuers 630 for specific digital credential templates, the generation of digital credentials, and the retrieval and presentation of digital credential tracking and reporting data, may be performed by a centralized web-based platform server 610 in collaboration with various client applications at the other systems 620-670 (e.g., web browser applications or standalone client software), in other cases these techniques may be performed entirely by a specialized digital credential platform server 610, or entirely by one or more digital credential tools (e.g., software services) executing on any one of the systems 620-670. In other examples, a client-server model may be used as shown in system 600, but different functional components and processing tasks may be allocated to the client-side or the sever-side in different embodiments. Additionally, the digital credential data store 615 may be implemented as separate servers or storage systems in some cases, and may use independent hardware and software service components. However, in other implementations, some or all of the digital credential data store 615 may be incorporated into the platform server 610 (as shown in this example) and/or may be incorporated into various other systems 620-670.

In some embodiments, each of the systems 620-670 that collaborate and communicate with the platform server 610 may be implemented as client computing systems, such desktop or laptop computers, smartphones, tablet computers, and other various types of computing devices, each of which may include some or all of the hardware, software, and networking components discussed above. Specifically, any of client systems 620-670 may be implemented using any computing device with sufficient processing components, memory and software components, and I/O system components for interacting with users and supporting the desired set of communications with the platform server 610, as described herein. Accordingly, client systems 620-670 may include the necessary hardware and software components to establish the network interfaces, security and authentication capabilities, and capabilities for transmitting/receiving digital credential templates and digital credentials, digital credential data requests/responses to the platform server 610, etc. Each client system 620-670 may include an I/O subsystem, network interface controller, a processing unit, and memory configured to operate client software applications. The digital credential platform server 610 may be configured to receive and execute various programmatic and graphical interfaces for generating, managing, and tracking issued digital credentials, in collaboration with the various client systems 620-670. Accordingly, each client system 620-670 may include an I/O subsystem 611 having hardware and software components to support a specific set of output capabilities (e.g., LCD display screen characteristics, screen size, color display, video driver, speakers, audio driver, graphics processor and drivers, etc.), and a specific set of input capabilities (e.g., keyboard, mouse, touchscreen, voice control, cameras, facial recognition, gesture recognition, etc.). Different client systems 620-670 may support different input and output capabilities within their I/O subsystems, and thus different types of user interactions, and platform server 610 functionality may be compatible or incompatible with certain client systems 620-670. For example, certain types of digital credential generation and search functionality may require specific types of processors, graphics components, network components, or I/O components in order to be optimally designed and constructed using a client system 620-670.

In some embodiments, the digital credential platform server 610 may generate and provide software interfaces (e.g., via a web-based application, or using other programmatic or graphical interface techniques) used by the various client systems 620-670 to perform the various digital credential management functionality described herein. In response to receiving inputs from a client system 620-670 corresponding to digital credentials, templates, credential search requests and criteria, etc., the platform server 610 may access the underlying digital credential data store 615 perform the various functionality described herein. In other to perform the tasks described herein, platform server 610 may include components such as network interface controllers 612, processing units 613, and memory 614 configured to store server software, handle authentication and security, and to store, analyze, and manage the digital credentials, templates, and credential tracking data stored within the digital credential data store 615. As shown in this example, the digital credential data store 615 may be implemented as separate dedicated data stores (e.g., databases, file-based storage, etc.) used for storing digital credential template objects, issued digital credentials, credential tracking data, and authorized user/role data. The platform server 610 and data store 615 may be implemented as separate software (and/or storage) components within a single computer server 610 in some examples, while in other examples may be implemented as separate computer servers/systems having separate dedicated processing units, storage devices, and/or network components.

Certain aspects described herein related to the testing and certification processes used to verify the skills or qualifications that a user (or earner) has obtained in order to be awarded with a digital credential (or badge) or any other skill certification from an institution or credentialing body. In some embodiments, physical testing environments including "simulation laboratories" may use implemented to allow users to perform physical tasks (including mental and/or computer-based tasks) in a monitored environment. Such physical testing environments may use virtual reality and/or augmented reality in various cases. The simulation lab and/or the user may be monitored by various sensors during testing or certification processes, and the results may be analyzed to determine (at least in part) whether or not the user should be awarded a particular digital credential or certification. As discussed below in more detail, simulation labs may be implemented as testing environments for manual tasks, computer-based tasks, scenario training, etc., and various monitoring of the simulation lab environment during test may provide data metrics relating to successful completion of tasks, efficiency of task completion, user response times, user decision making behaviors, user biometrics and risk factors, etc. Further, as discussed below, certain simulation labs may provide the ability to change testing scenarios as well as environmental conditions (lighting, noise, temperature, etc.) during testing.

Figure 7:
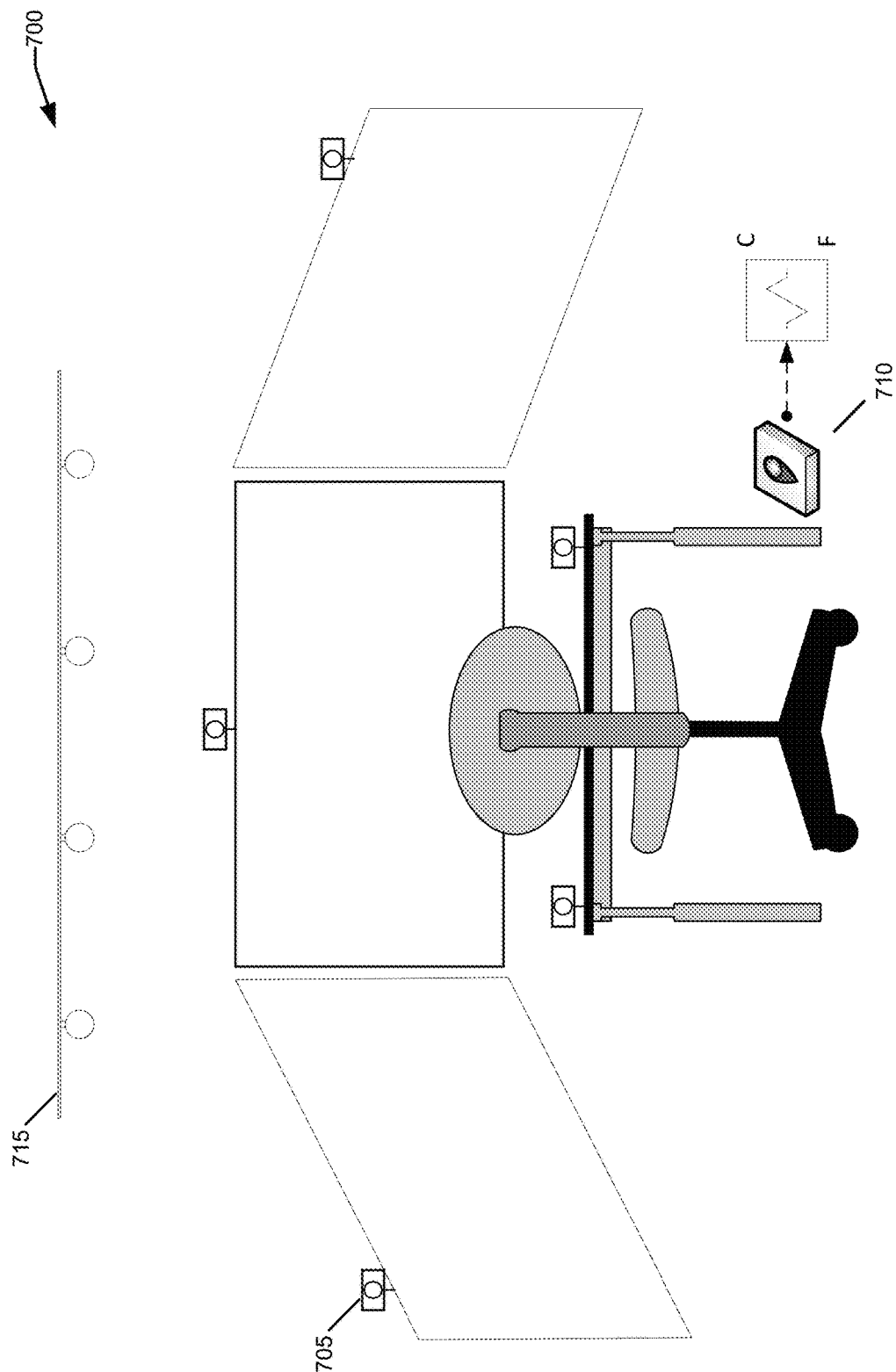
FIG. 7 is an diagram illustrating an example computing environment for executing and monitoring physical simulations within a digital credential system, according to one or more embodiments of the disclosure.

Referring now to FIG. 7, an example is shown of a physical testing environment that may be used for badge testing, skills certification, and other behavior monitoring and digital credential generation, in accordance with certain aspects described herein. In this example, a basic testing environment 700 is shown to illustrate certain features and concepts that may be included in various embodiments. Depending on the particular digital credential, activity, skill or ability to be verified, different devices and components may be included in the simulation environments 700. For example, simulation environments 700 for standardized testing and completion of computer-based tasks may be setup to simulate an office environment, for instance, with a computer, keyboard, monitor, desk and chair, etc. Other testing environments 700 designed for other badges and/or skills certifications may be configured differently. For instance, testing environments 700 may be configured as a driving simulator (e.g., having front and side display screens, an installed automobile seat with steering wheel, pedals, vehicle controls and gauges, simulated mirror displays, etc.), or a flight simulator (e.g., having front and side display screens, up and down fields of vision, a pilot seat with a center stick and/or other airplane controls and gauges, etc.). Other testing environments 700 might not require or have any display screens, for example testing environments 700 for CPR certification may include one or more CPR manikins and other accessories to test CPR scenarios. Additional testing environments 700 may be implemented for law enforcement use of force or defensive tactics scenarios (with or with display screens, with or without live firearms capabilities, etc.). Still other testing environments 700 may be implemented for skills testing and verification on machine assembly tasks, and/or on machine use tasks. The machines in testing environments 700 in such scenarios may range from simple to complex, to allow users to any testable task on any machine, from bicycle assembly, to automobile maintenance, to semiconductor design, to electrical work, to laser fabrication, to welding. Other testing environments 700 may be implemented for skills testing and verification in performance of medical or dental procedures, and the like, and thus may resemble a hospital operating room or dentist office with a full complement of medical tools and devices necessary to perform the tasks to be verified. Still other testing environments 700 may be configured to test/verify skills with respect to sports or other physical activities, and thus the testing environments 700 may comprise a dance studio, gymnastics apparatus, golf driving range, or other sports equipment. For each of these examples, and many others, it should be understood that the different configuration of testing environments 700 may require different sets of testing equipment, as well as different monitoring and environmental control features. Further, although many examples and implementations described herein refer to human users as the subjects of testing and simulation scenarios, in some cases the test subjects may include mechanical devices (e.g., machines configured to assemble parts), artificial intelligences and/or other software programs configured to perform certain tasks, etc.

In addition to the testing equipment and apparatuses in the physical testing environment 700, the environment may have cameras 705 and sensors configured to monitor the performance and behavior of the user during the testing. As shown in this example, a number of cameras 705 may be installed throughout the testing environment 700 to capture image/video data of the user from different angles during the testing/skills verification process. In addition to cameras, in various embodiments (depending on the type of test or skill being evaluated), additional sensors may be deployed within the testing environment 700, including microphones, light sensors, heat sensors, vibration sensors, and any other sensor type, depending on the type of testing/evaluation being performed. For instance, for testing of computer-based tasks, additional sensors such as mouse movement trackers, keystroke loggers, and user eye-tracking software may be used. For machine usage tasks, scenario training, and the like, movement sensors may be placed on the user and/or on any objects with which the user may interact during the testing scenario. Additionally, for any testing or skills evaluation scenario, certain embodiments may include biometric sensors and devices 710 configured to detect and track the user's biometric data during the testing process. Such biometric sensors and devices may measure the user's temperature, heartrate, blood pressure, respiration, skin conductivity, body movements, brainwave activities, etc.

In some embodiments, the physical testing environment 700 also may include various environmental controls that allow a test administrator to control the physical environmental conditions during a test or skills evaluation. Such environmental controls may include lights 715 that allow the test administrator to control the light levels, angles, and/or colors during a test. By way of example, lighting control within the environment 700 may allow the test administrator to evaluate the user's ability to perform a driving maneuver or roadside maintenance task at night, etc. Additional environmental controls may include may include temperature controls, weather simulation (e.g., wind, rain, snow, sunshine, fog etc.), speakers to provide background noise or distraction, olfactory control that provides scents/odors to simulate the smells that be present during a comparable real-life scenario, vibration control to simulate the activity, and so on.

Figure 8:
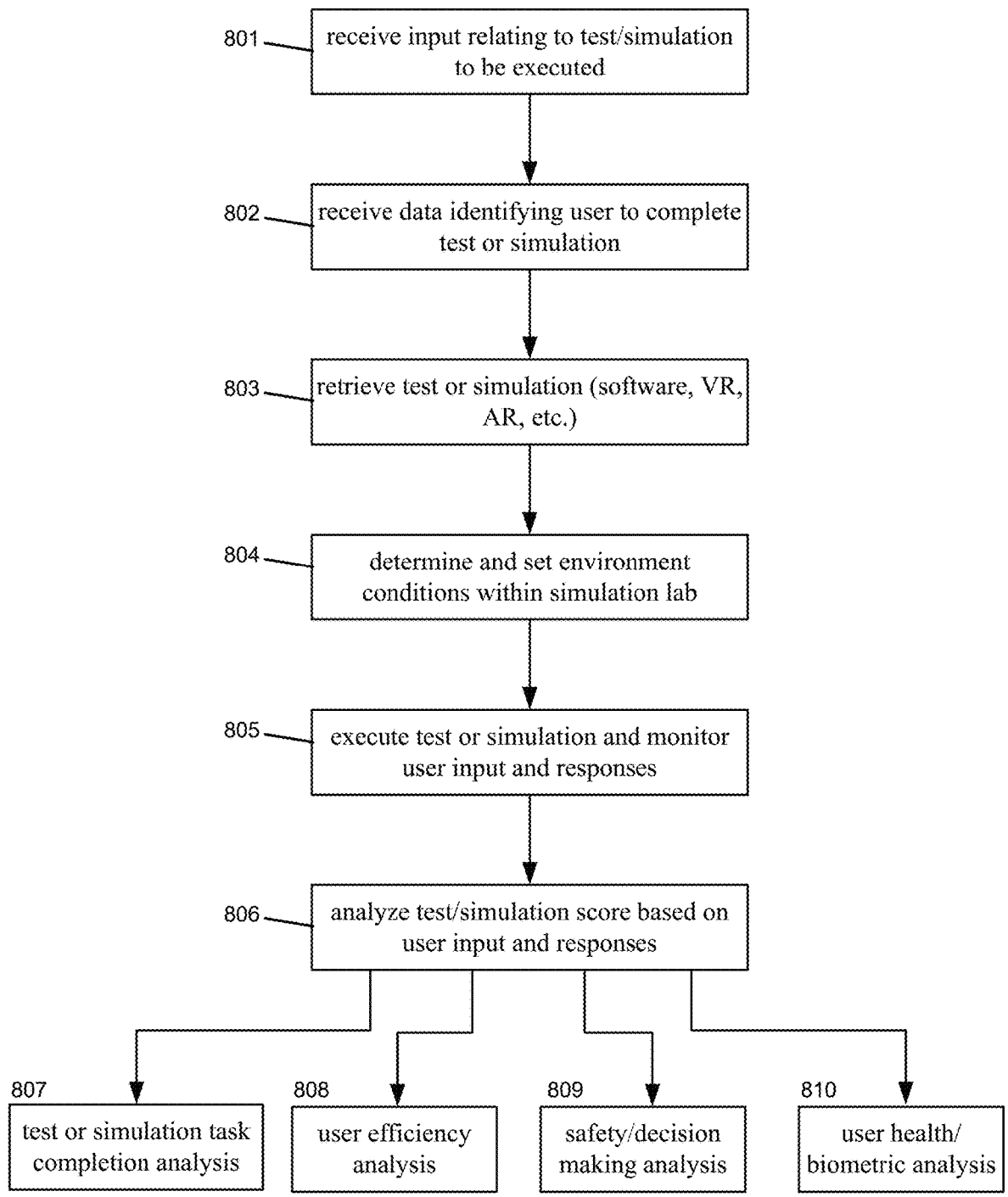
FIG. 8 is a flow diagram illustrating an example process of executing and monitoring physical simulations for generation of digital credentials, according to one or more embodiments of the disclosure.

Referring now to FIG. 8, a flow diagram is shown illustrating an example process of executing tests or simulations, as well as monitoring and analyzing the results of the tests or simulations. As described below, the steps in this process may be performed using various components of a simulation lab and/or other physical test (or simulation) environment 700, described above. For example, each of steps 801-810 may be performed by a computer server of a test administrator associated with a physical simulation environment 700. In other examples, physical simulation environments 700 might be configured to receive test content and configuration parameters, to execute the tests and monitor the execution, and then to transmit the test results and related observation data to a separate server (e.g., a digital credential platform server 610) for scoring and analysis.

In step 801, a computer server controlling the physical testing environment 700 may receive input relating to the test or skills evaluation scenario to be executed within the physical testing environment 700. In step 802, the server may receive data identifying the particular user designated to complete the test or skills evaluation scenario.

In step 803, the server may retrieve the test or scenario to be loaded/executed within the physical testing environment 700. As noted above, the test or scenario may include interactive user software (e.g., driving or flight simulator programs, law enforcement scenarios, etc.) and/or may include testing software or other software programs loaded onto a desktop, laptop, or tablet computer. For instance, the test or scenario may require the user to work with computer-aided design software, spreadsheet software, database development software, etc. In other cases, the test or scenario may include audio and/or video files to be played via speakers and/or display screens within the physical testing environment 700, such as instructional videos or audio/visual test questions.

The test or scenario retrieved in step 803 also may be retrieved based on the identity of the particular user who will be completing the test or skills evaluation scenario. In some embodiments, the server of the physical testing environment 700 may be configured to select the appropriate test, scenario, and/or simulation (e.g., a particular software scenario, skill level, etc.) based on the user's current set of badges or digital credentials, the user's skill level, and/or the user's performance history on previous tests or scenarios within the testing environment 700. Additionally, in some cases, the server may vary scenarios/test questions so that a particular user does not receive the same test questions, scenarios, or other testing content that they have already completed (or completed within a particular recent time window).

In step 804, the server may determine and apply a set of environmental conditions within the physical testing environment 700 for the execution of the test or scenario. As noted above, the physical testing environment 700 in some embodiments may be capable of setting various environment conditions such as lighting (e.g., to simulate different day or night, and/or different real-world working environments), temperature and weather conditions (e.g., to simulate outdoor scenarios, different seasons and locations), noise (e.g., to provide background noise, traffic noise, distractions, etc.) and other various environment conditions. The server may select and apply environmental conditions as part of the test or scenario selected in step 803, or as a separate determination which is performed based on random chance or selected by a test administrator, etc. For instance, for certain types of badges and other certifications, separate day and night testing of certain tasks may be required. In other cases, the environmental conditions may be selected randomly and changed for each testing session. In still other cases, user may select and/or save their preferred environmental conditions for different types of testing. Further, in some embodiments, the physical testing environment 700 may track and analyze the user's various testing or scenario performance metrics (e.g., accuracy, efficiency, safety, compliance, biometrics, etc.) under different environmental conditions, in order to determine the optimal environmental conditions for the particular user. In such cases, user's may receive different badges or certifications (or may have different badge assigned characteristics or endorsements) based on their test or scenario performance in different environmental conditions.

In step 805, the computer server(s) associated with the physical testing environment 700 may execute the test or simulation scenario, during which the user's performance and any/all user reactions or responses may be monitored. As noted above, even for certain tests that are entirely manual in nature, the physical testing environment 700 may use cameras and any other sensors to monitor the user's actions. Such monitoring may include various aspects of the user's performance, such as answers to test questions selected via a testing computer terminal, or the user's interactions with physical objects (and/or other people) within the physical testing environment 700. The user's answers and actions may be recorded by cameras and computer input devices, and additional user data may be collected using various other sensors such as microphones, biometric sensors, etc.

In step 806, the results for the test and/or simulation scenario completed by the user may be analyzed. In some embodiments, the such analyses may be performed based not only on the user's responses to particular test questions or scenarios. Additionally or alternatively, the analysis in step 806 may include an evaluation of the user's other reactions or responses, such as speed and confidence of action (e.g., as determined by user comments, speed of response, facial expression analysis, body movement analysis, biometric data, etc.), efficiency, safety, decision making, and user biometrics. One or more of these separate analyses may be performed in steps 807-810, and each may be performed independently of the others, or may be combined into a single analysis. For instance, in some cases the goal of the simulation might be only to measure the user's biometric data, and the user's actual responses to the questions/scenarios may be irrelevant and need not be evaluated in step 807. In other tests or simulation scenarios, the opposite analysis may be applied, where only the accuracy of the user's responses or behaviors are measured and analyzed in step 807, and the user's biometric data is irrelevant and thus the analysis in step 810 is not performed. As another example, in a certain simulation of driving, machine operation, use of force training, etc., the only relevant analysis to be performed may be a safety/decision making analysis in step 809, while the efficiency analysis in step 808 need not be performed. In other similar tests/situations, the server may apply both a safety/decision making analysis in step 809 and an efficiency analysis in step 808 (e.g., to confirm that a driving maneuver or route was completed both safely and efficiently, to confirm that a suspect was subdued safely and quickly, to assure that a manufacturing assembly task was performed safely and efficiently, etc.).

For example, in certain embodiments and implementations of the concepts discussed above in reference to FIGS. 8-9, various techniques (e.g., systems, methods, computer-program products tangibly embodied in a non-transitory machine-readable storage medium, etc.) may include evaluating a physical simulation by a digital credential generator system (e.g., 630 and/or 610). Such techniques may include monitoring, by a digital credential generator system, a physical simulation area using a plurality of sensors, during a physical simulation. During the monitoring the digital credential generator system may detect, using the plurality of sensors, various physical actions performed by a user during the physical simulation. The digital credential generator system may analyze data corresponding to the plurality of physical actions performed by the user during the physical simulation, and determine that the user corresponds to a particular credential receiver. The digital credential generator system then may determine whether the first credential receiver is eligible to receive a digital credential, by comparing the data corresponding to the analysis of the physical actions performed by the user during the physical simulation, to one or more digital credential requirements. Finally, the digital credential generator system may generate a first digital credential associated with the first credential receiver and with the digital credential requirements, in response to determining that the first credential receiver is eligible to receive the first digital credential.

In some embodiments, outputting a physical simulation may include outputting audio and/or video simulation components within the physical simulation area, manipulating physical objects (e.g., motorized objects) during a live-action simulation within the physical simulation area, and/or outputting virtual reality simulations via a virtual reality headset. Additionally, certain embodiments may include generating physical simulation environments within a physical simulation area, including, for example, simulating ambient light conditions within the physical simulation area, outputting one or more background noise conditions within the physical simulation area, monitoring and controlling the physical temperature using a heating and cooling system installed at the physical simulation area, outputting smells to the physical simulation area using a smell output device, and/or outputting vibratory effect within the physical simulation area, using a vibration system.

As noted above, the monitoring of a test/simulation may include monitoring physical actions/activities performed by the user using video recording devices and/or motions. Additionally or alternatively, the monitoring may be of computer-based tasks, using additional software-based sensors such as mouse movement trackers, keystroke loggers, and user eye-tracking software, etc.

In accordance with certain aspects described herein, the processes used for testing/evaluating a user and determining that a user is eligible for a particular digital credential (or badge) need not include a specific test, designated evaluation, or scored scenario training. Rather, the testing and badging determinations may be performed automatically during the user's normal course of on-the-job performance of tasks. In such embodiments, the testing and credentialing of users may be based on observation of workers during their normal work activities. Cameras and other sensors may be installed and used to detect the completion of tasks and/or certain competencies of the users, and the data from these sensors may be evaluated to automatically determine when the user is eligible for a digital credential. Thus, on the job testing and badging may be performed entirely transparently to the worker performance of their job duties, and need not require any delay or distraction from job performance, or any designated time or location needed to perform formal testing.

Figure 9A:
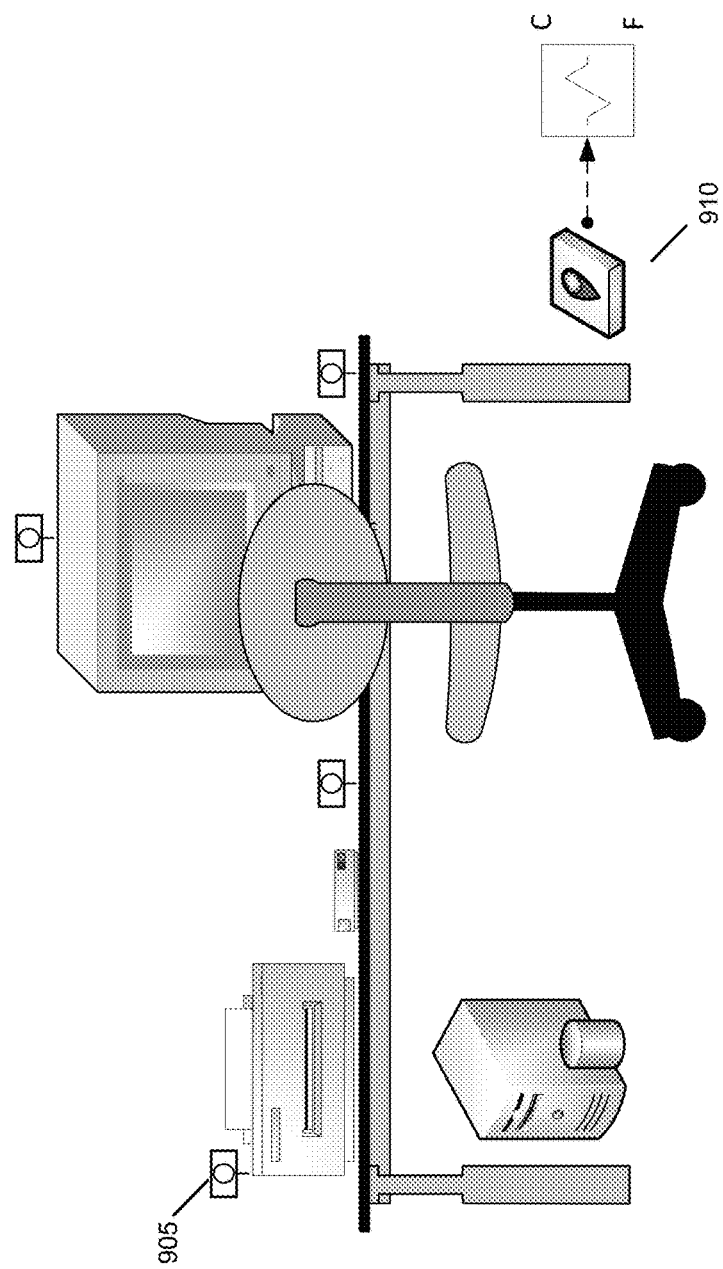
FIG. 9A is an diagram illustrating a computer terminal-based system for sensor-based monitoring, and generation of digital credentials, according to one or more embodiments of the disclosure.

In order to perform automatic and on-the-job testing and credentialing of workers or other users (e.g., students, athletes, etc.), the "work" environment of the user may be monitored with cameras and/or sensors capable of tracking the user's activities and performance. As discussed above with respect to the implementation of physical testing environments (e.g., 700), different types of digital credentials relate to different activities that may be performed in a variety of different work environments. Referring briefly to FIG. 9A, an example work environment 900*a* is shown for a user completing computer-based tasks. In this example, the work environment 900*a* may include a basic workstation, server, modem, printer, monitor, keyboard, etc., as well as desk and chair to allow the user to complete normal computer-based work activities. In this example, the user may be data entry specialist, computer programmer or design engineer, call center customer support operator, or may be performing any other computer-based job. In such examples, sensors 905 and 910 may include cameras, network monitoring devices, keystroke loggers, mouse movement monitors, biometric devices and sensors, etc. Such software tools may operate as background processes on a computer terminal being monitored. Additional monitoring devices may be built into specific software programs with which the user is interacting, and may be able to determine the correctness, quality, and efficiency of the user's interaction with the particular software. For example, if a user is interacting with a spreadsheet software application or computer-aided design application to perform a work task, then monitoring features within the software application may be used to determine how quickly the user performed the task, how many attempts it took the user, how correct/accurate was the finished product, etc. In other examples, the monitoring of the user's interaction with a particular software program need not involve any monitoring features within the software itself, but instead may include monitoring at the operating system or hardware layers, or monitoring that is entirely external to the workstation. For example, external cameras 905 and other sensors may capture and analyze the user's interactions with the software application, and thus need not affect the operation of the software at all.

Figure 9B:
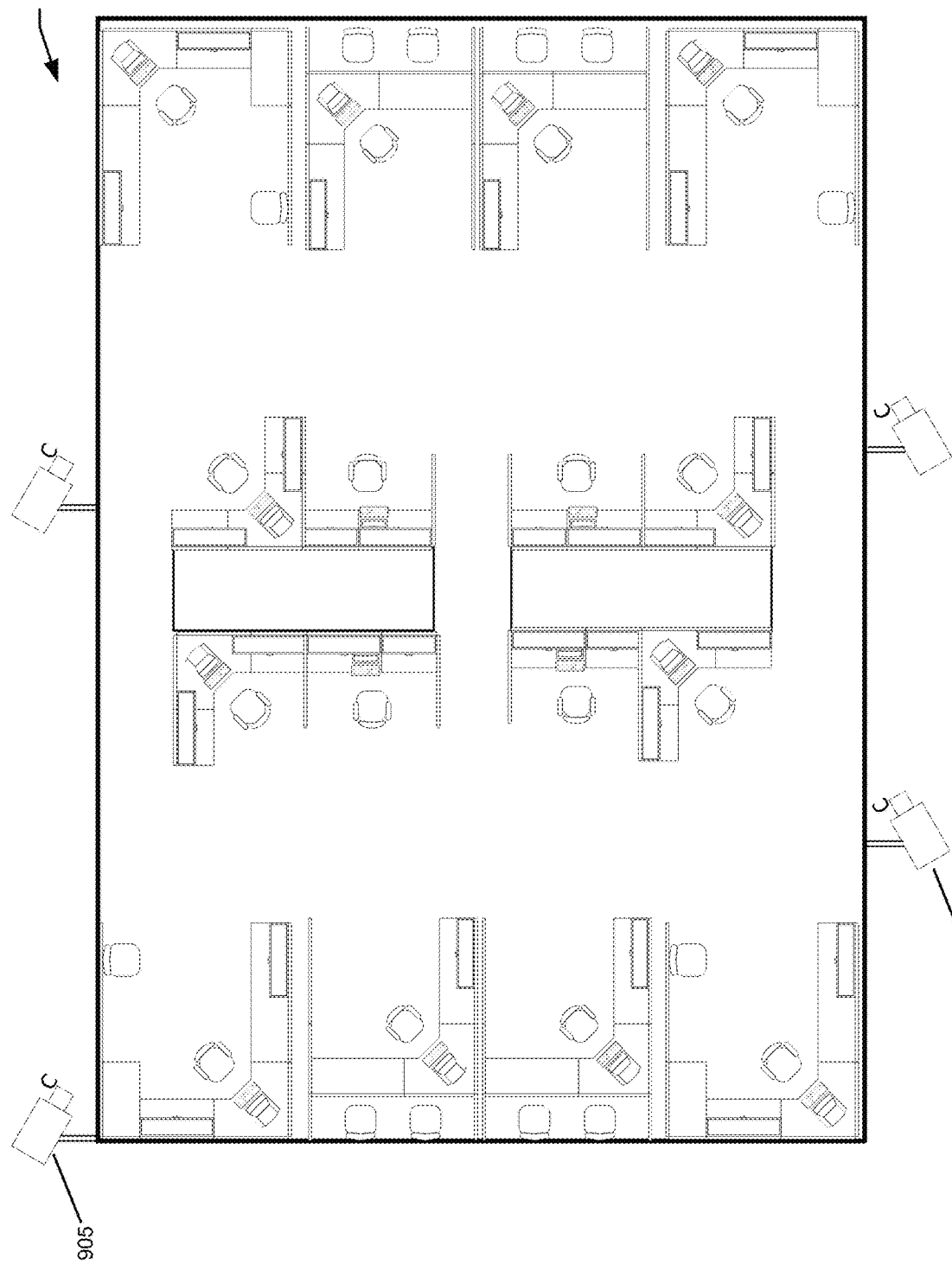
FIG. 9B is an diagram illustrating a physical environment-based system for sensor-based monitoring and generation of digital credentials, according to one or more embodiments of the disclosure.

Another example work environment is shown in FIG. 9B. In this example work environment 900b, the entire layout of workplace floor is shown and monitored by a series of cameras 905 and/or other sensors. The monitoring in this example may apply to works who do not perform only computer-based tasks, but whose work requires them to interact with physical objects within their workspace, and/or to move around the work environment 900b to other workspaces. For instance, maintenance works, office mail delivery works, construction workers, electricians, plumbers, machine assembly or manufacturing works, etc., may be monitored with such systems. When monitoring a larger area for the performance of non-computer-based work tasks, in addition to cameras 905, the work environment 900b may include motion sensors, microphones and noise sensors, as wells as movement sensors and/or tracking devices that may be placed on specific physical objects within the environment. By way of example, work environment 900b may correspond to a shop floor, mechanic's garage, or manufacturing assembly plant, and the cameras 905 and other sensors may be used to confirm that workers are complying with safety requirements and/or health codes with respect with their work with machinery or hazardous materials, etc. As another example, work environment 900b may be an office environment, and the cameras 905 and other sensors may be used to confirm that individual workers are working efficiently, in their assigned areas, etc., and that workers without assigned areas (e.g., cleaning, mail delivery, maintenance workers, etc.) are working efficiently and not skipping any portion of the floor 900b.

Figure 10:
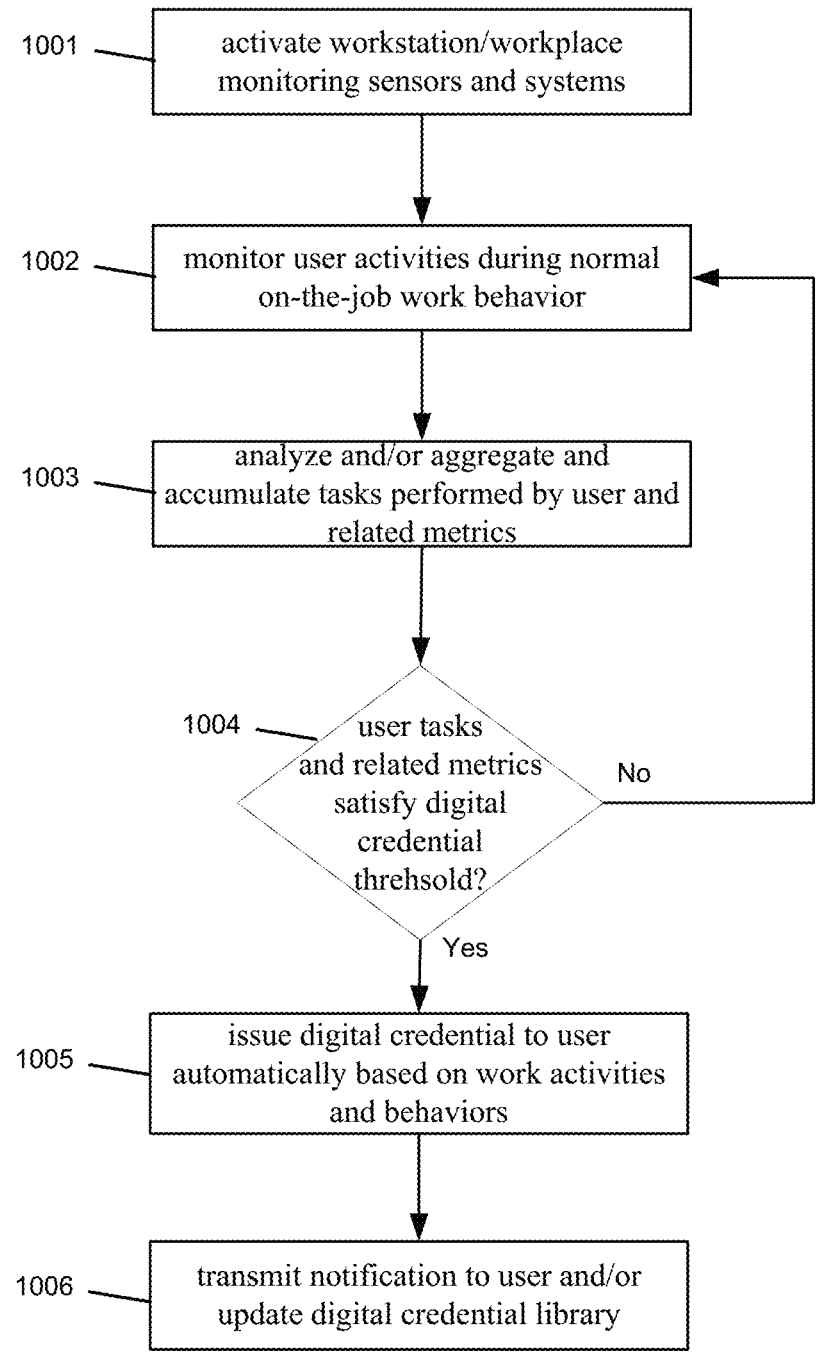
FIG. 10 is a flow diagram illustrating an example process of generating and issuing digital credentials in a sensor-monitored environment, according to one or more embodiments of the disclosure.

Referring now to FIG. 10, a flow diagram is shown illustrating an example process of automatically monitoring work activities and issuing digital credentials via "on-the-job" testing. As described below, the steps in this process may be performed by monitoring and credentialing computing devices operating within various types of work environments 900, such as those described above. For example, each of steps 1001-1006 may be performed by a computer server operating automatically and unassisted (or at the direction of an administrator) within a work environment 900. In other examples, work environments 900 might be configured only to monitor work activities and performance, and then to transmit the results and related observation data regarding various worker to a separate server (e.g., a digital credential platform server 610) for scoring, analysis, and the issuance of digital credentials.

In step 1001, a computer server controlling the on-the-job badging system may activate the cameras, sensors, monitoring software, etc., within the workstation and/or work environment. As discussed above, this activation may include specific monitoring software to detect computer-based tasks, and/or location monitoring devices such as cameras, sensors, biometrics, etc., depending on the type of workers and work environments 900 being monitored. In some cases, an on-the-job testing and credentialing system may be implemented as an "always on" system, in which the workstation/workplace monitoring is constantly recording and analyzing worker activities. Thus, step 1001 may be optional in such embodiments. However, in other cases, workstation/workplace monitoring might only be activated at certain times and not others, for example, only during normal work hours, only on certain specific work days designated for work evaluation, etc. In some embodiments, a system administrator and/or individual workers may activate or de-activate the workstation/workplace monitoring systems within their work environment at any time. Thus, such systems need not be an invasion of privacy for any worker that does not choose for their work to be monitored and evaluated, but workers may choose to turn the monitoring systems on in order to be eligible for evaluation and earning of additional work related digital credentials and credentials.

In step 1002, the workstation/workplace monitoring systems may capture the user's work-related activities and behaviors, including performing various computer-based tasks and non-computer-based tasks as discussed above. In step 1003, the user's working data as collected by the workstation/workplace monitoring systems and sensors may be analyzed by the server, in order to determine in step 1004 whether or not the user is eligible for one or more digital credentials or other credentials (e.g., professional certifications, etc.) based on their on-the job work activities. Certain digital credentials or credentials may be made available to users in response to detecting that the user has successful completed one or more specialized work tasks, thus demonstrating that the user has obtained the particular skill associated with the digital credential. In some cases, the server and/or the monitoring systems and sensors may also be configured to detect a certain level of efficiency by the user in performing the tasks, and/or may require that the user perform a certain task N number of times before the user is eligible for the digital credential or credential.

In step 1004, if the system determines that the user is eligible for one or more particular digital credentials (1004: Yes), then in step 1005 the system may either issue the digital credential directly (e.g., if the workplace server is permitted to be digital credential issuer), and/or may initiate a communication session with a badging platform 610 and/or digital credential issuer 630 to request that a new digital credential is issued for the worker. In such examples, the workplace server may provide the information identifying the worker (e.g., name, employee ID, digital credential system profile ID, etc.) to a digital credential platform 610 or issuer 630, along with verification that the worker has completed the requirements to earn a particular digital credential. In some embodiments, the servers operating at the workplace may be configured to capture evidence (e.g., video evidence, screen captures, facial/identity verification, etc.) and transmit the evidence to the digital credential-issuing authority, before the digital credential may be issued.

In step 1006, the worker may be notified that they have received a digital credential based on their normal on-the-job activities. In some embodiments, the worker may indicate interest in obtaining one or more particular digital credentials, and the workstation/workplace monitoring system may be configured to evaluate the worker with respect to the particular digital credentials or credentials that the worker has expressed interest in. However, in other examples, it may be possible for a worker to receive an issued digital credential without expressing any interest in the digital credential (or even being aware of such a digital credential), but solely based on the determination that the worker has achieved the level of skills mastery required for the digital credential/credential, based on the automated monitoring of the worker within the workplace. In certain cases, a user may be informed that they are eligible for receiving a digital credential prior to the issuance of the digital credential in step 1005, and the user may be allowed to accept or reject the digital credential. Additionally, in some cases, the user may receive status reports (e.g., daily, weekly, etc.) identifying which digital credentials the user is being monitored for, and the user's progress with respect to earning those digital credentials. This data may include indications to the worker that he/she may earn a particular digital credential after performing a task another N times, or performing the task N amount faster, or performing the task without making any errors or backtracking, etc.

For example, in certain embodiments and implementations of the concepts discussed above in reference to FIGS. 10-11, various techniques (e.g., systems, methods, computer-program products tangibly embodied in a non-transitory machine-readable storage medium, etc.) may include generating digital credentials for particular credential receivers, based on monitoring of a physical environment using a plurality of sensors. A digital credential issuer (or generator) 630 and/or 610 may detect or receiver sensor data from a number of sensors corresponding to the user actions performed by a user within the physical environment. The digital credential generator may determine the operations that were/were not performed within the physical environment, based on the user actions detected. The digital credential issuer then may retrieve data from a credential receiver data store associated with the user/credential receiver, and determine one or more digital credential templates, based on the retrieved data associated with the first credential receiver. For each of the digital credential templates, the digital credential issuer/generator may retrieve criteria associated with the digital credential template, compare the operations performed by the user within the physical environment to the criteria associated with the digital credential template, and then determine whether or not a credential receiver is eligible to receive a digital credential based on the digital credential template. If the first credential receiver is eligible to receive a digital credential based on the digital credential template, the digital credential generator may generate a digital credential based on the digital credential template and user data associated with the first credential receiver.

In such cases, the generated (or issued digital credential) may be embedded with additional data such as the evaluation/simulation time, location, or the sensor system/physical environment within which the evaluation/simulation was performed. Additionally, in some cases, facial recognition data and/or biometric data may be collected from the user (credential receiver), and may be used to validate or authenticate the digital credential by verifying the user's identity. As in the above examples, the monitoring may be done using physical movement tracking sensors such as video recorders and/or motion detectors, or may use software-based sensors such as network monitoring devices, keystroke loggers, mouse movement monitors, touch screen monitors. Such software-based tools may operate as background processes on a computer terminal being monitored, and/or may be built into specific software programs with which the user is interacting.

Additional aspects related to the automated tracking of user or worker activities, after the user/worker has been issued a badge (or digital credential), in order to determine how often the user/worker is "using" their digital credential. Depending on type of digital credential or credential, post-credentialing monitoring of the user may involve analysis of user's physical work product (e.g., documents produced, parts/items created, etc.), or may be involve observations of the user (e.g., via a workstation/workplace monitoring system). In order to evaluate how often a user is using a particular digital credential, a data store of digital credentials may be linked to particular skills, work-related, or activities. The user/worker may then be tracked to determine the number of such tasks performed, and/or the quality, efficiency, and/or competence of the user's performing those tasks, in order to determine to what extend the user/worker is "using" the digital credential.

Figure 11:
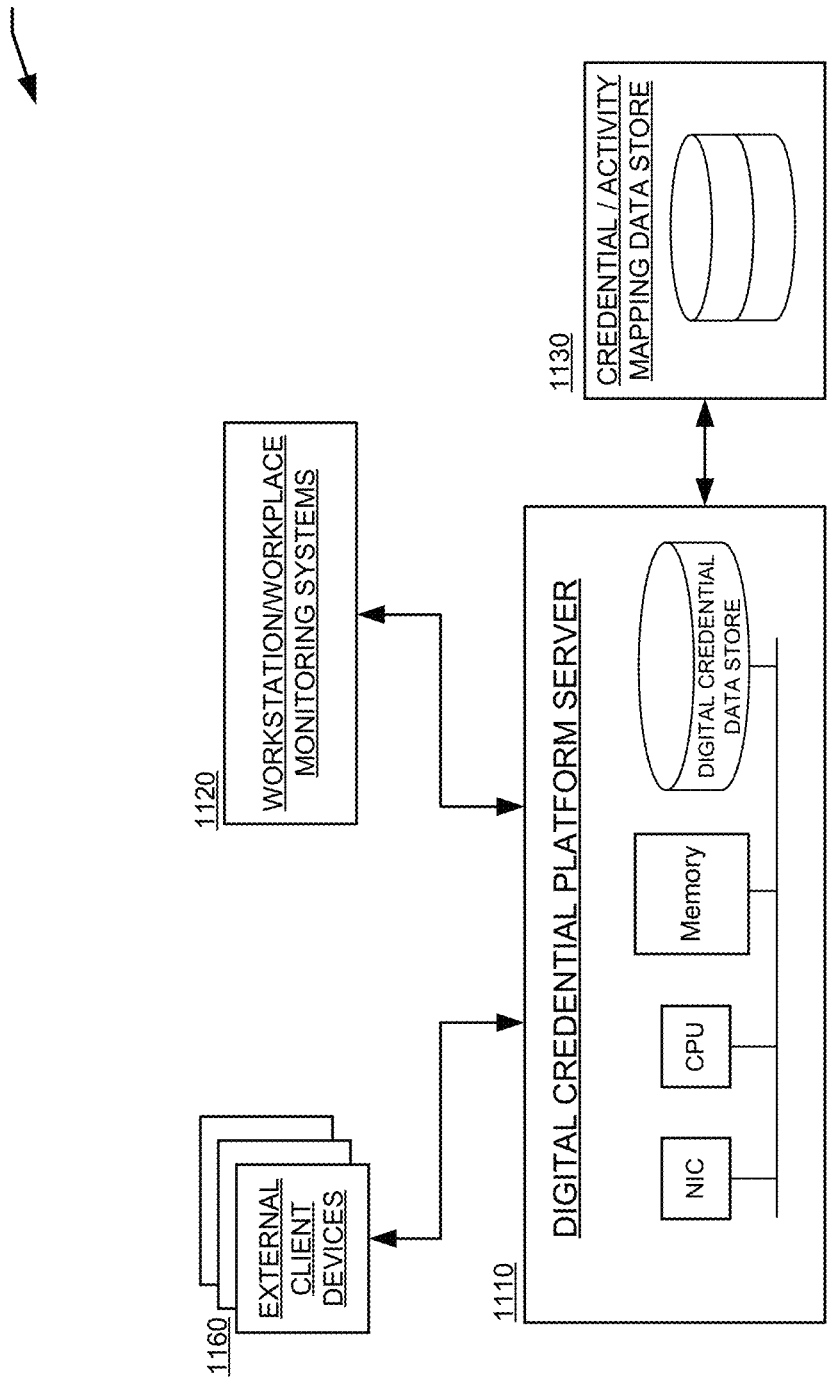
FIG. 11 is an diagram illustrating an example computing environment for analyzing sensor-based activity monitoring within a digital credential system, according to one or more embodiments of the disclosure.

Referring now to FIG. 11, an example computing environment 1100 is shown, including a digital credential platform server 1110, one or more workstation/workplace monitoring systems 1120, and a credential-to-activity mapping data store 1130. In some examples, the digital credential platform server 1110 may be a badging server similar or identical to the server 610 discussed above. Thus, server 1110 may be configured as a digital credential repository and credentialing system, acting as a clearinghouse for digital credential owners, issuers, earners, endorsers, etc. Server 1110 may include a digital credential (or digital credential) data store configured to store badging information such as the details of the particular digital credentials earned by particular users. As noted above, such details may include the date on which a digital credential was issued to a user, and for certain digital credentials, an expiration date associated with the digital credential.

In this example, system 1100 also includes a credential-to-activity mapping data store 1120, which may be implemented as a separate external data store and/or may be integrated into the digital credential data store of server 1100. The credential-to-activity mapping data store 1130 may include mappings of one or more tasks or activities associated with each digital credential type that a user may potentially earn. For example, a digital credential relating to automotive maintenance for a particular make of car may have associated activities and tasks that include particular maintenance tasks (e.g., tune-ups, part replacements, etc.) for different model cars having the make. As another example, an operating system administrator-related digital credential may list, within data store 1130, various system administrator tasks and that a user may perform on the particular operating system. In some cases, the activities or tasks associated with a particular digital credential may correspond to the same set of activities or tasks that a user is required to perform to earn the particular digital credential, and as discussed below, these activities or tasks may serve as a metric to evaluate how much the user is "using" the digital credential.

One or more workstation and/or workplace monitoring systems 1120 may provide user monitoring data to the server 1110, to allow the sever 1110 to analyze the user's activities and determine to what extent the user is using the activities and abilities associated with their digital credentials. In some embodiments, the workstation and/or workplace monitoring systems 1120 may be similar or identical to any of the workstation/workplace monitoring systems and sensors discussed above. For example, workplace monitoring systems 1120 may collect records detailing the user's physical work product (e.g., documents produced, modified or accessed by the user, inventory or work order records indicating tasks performed by the user, etc.). Additionally, workplace monitoring systems 1120 may include observation systems (e.g., workplace monitoring systems) including cameras and other sensors to track the user's activities and determine which specific tasks have been performed by the user.

Figure 12:
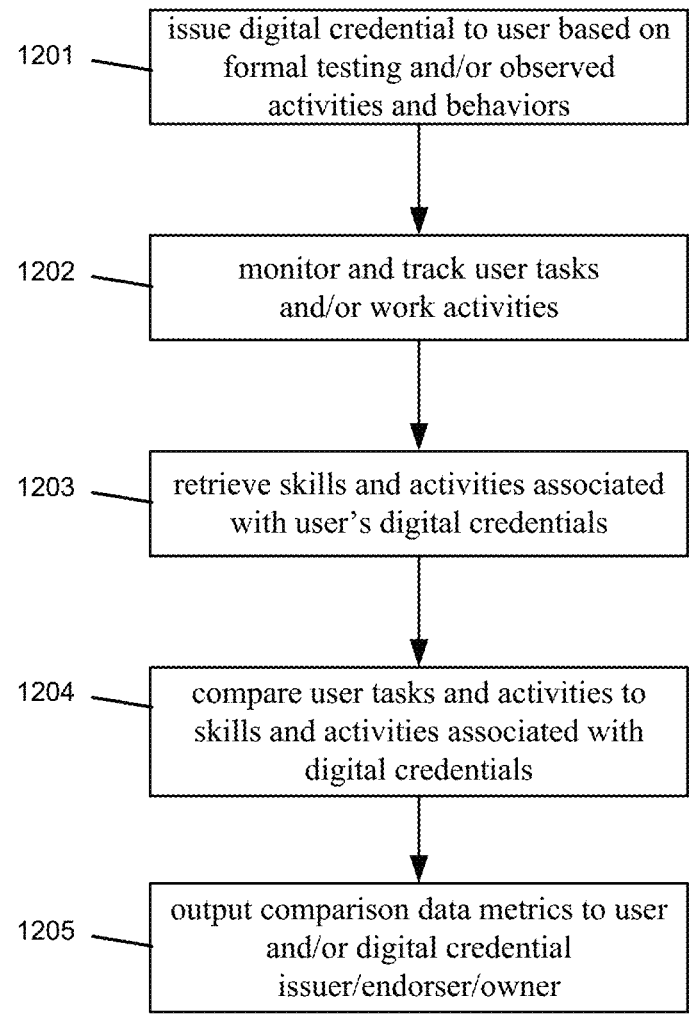
FIG. 12 is a flow diagram illustrating an example process of generating digital credentials and tracking the corresponding activities in a sensor-monitored environment, according to one or more embodiments of the disclosure.

In some embodiments, the monitoring and tracking of post-credentialing activities by the user may be used to analyze and provide digital credential or credential feedback data to various entities. For example, referring now to FIG. 12, a flow diagram is shown illustrating an example process that may be used to determine whether a user has or has not used the activities associated with a particular digital credential that they have obtained, and then to aggregate and report that digital credential usage data to the relevant parties. In step 1201, a particular digital credential is issued to a user based on the user's successful completion of the badging requirements. As in the various examples discussed above, the digital credential may be associated with a computer-based activity, non-computer-based activity, or any other set of digital credential requirements determined by a digital credential owner or issuer. Additionally, the digital credential issuance in step 1201 may be the result of formal testing and/or certification processes, or may be based on on-the-job or other observational data collected for the user.

In step 1202, the digital credential server 1110 and/or monitoring systems 1120 may monitor and track the activities of the credentialed user, including, for example, the workplace tasks performed by the user based on analyses of the various monitoring systems/sensor data installed at the user's workstation and/or workplace environment. As described above, determining what activities and tasks the credentialed user has performed, and when, may be performed using a variety of techniques. In some cases, determining what work-related tasks a user has performed, and what other activities they have been engaged in, may be done by analyses of written and electronic documents associated with the user or workplace. For instance, documents such as maintenance requests, work orders, customer tickets, purchase receipts, and the like may be analyzed to determine what activities or tasks the user has completed and when. For instance, a maintenance record listing the user as the assigned technician may be used in determination that the user has performed the specified task/activity at the time listed on the record. In other examples, the user's electronic mail and other electronic documents may be searched and analyzed (e.g., using a keyword analysis and/or trained artificial intelligence) to determine what tasks the user has performed and/or what activities the user has demonstrated during the relevant time periods. In some embodiments, there may be particular advantages in implementing a post-credentialing usage analysis and/or digital credential valuation process for certain digital credentials/tasks that are more discrete and detectable, for instance, a number of transmissions changed after earning a vehicle transmission certification, a number of particular medical procedures done following a digital credential for the procedure, a number of IT tickets resolved successfully following receiving an advanced IT computer services and computer repair digital credential, etc. In contrast, for other tasks and activities for which a user may receive a digital credential, such as leadership, communication skills, advanced C software programming, jujitsu skill levels, and the like, it may be more difficult to quantify if when, and how often a user is using the particular skill or task associated with the digital credential.

In step 1203, a set of tasks and/or activities associated with the digital credentials obtained by the specific user may be retrieved using the credential-activity mapping data store 1130, and in step 1204 the retrieved tasks and/or activities may be compared to the tasks and activities that have been performed by the user subsequent to the digital credentials being earned (as determined in step 1202). As an example, the comparison in step 1204 may determine that in the six month since the user was issued a professional certification to perform a particular technical task, the user has performed that task on a weekly basis. Alternatively, for a different digital credential issued to the user directed to expertise in a particular software program, the comparison in step 1204 may determine that the user has used that software program only once since receiving the digital credential two years ago. In this case, the system may conclude that the professional certification issued six months ago to the user has been of greater usefulness than the software digital credential issued two years ago (allowing for the possibility of career changes, prestige-driven digital credentials rather than functional digital credentials, etc.).

In step 1205, data from the comparison of step 1204, i.e., data indicating the post-credentialing usage by the user of the digital credential-associated activities or tasks, may be aggregated and analyzed, and then transmitted to one or more of the relevant system components. In various embodiments, any of several different components and roles associated with the credentialing platform 1110 may request and receive this information for their associated digital credentials and/or associated users. For instance, digital credential owners and/or digital credential issuers may request and receive from the platform server 1110 data regarding the post-issuance usage of the digital credentials they own or have issued. In other cases, digital credential endorsers may request and receive from the platform server 1110 data regarding the post-issuance usage of the digital credentials they have endorsed. Digital credential earners, the users themselves also may request reports from the platform server 1110 quantifying the post-credentialing usage (which may be expressed in terms of time, value, and/or dollar amounts) associated with their previously earned digital credentials. Employers and other organizations also may request such reports for their employees or organization members, in order to determine which digital credentials have been the most used and most useful to the organization.

Figure 13:
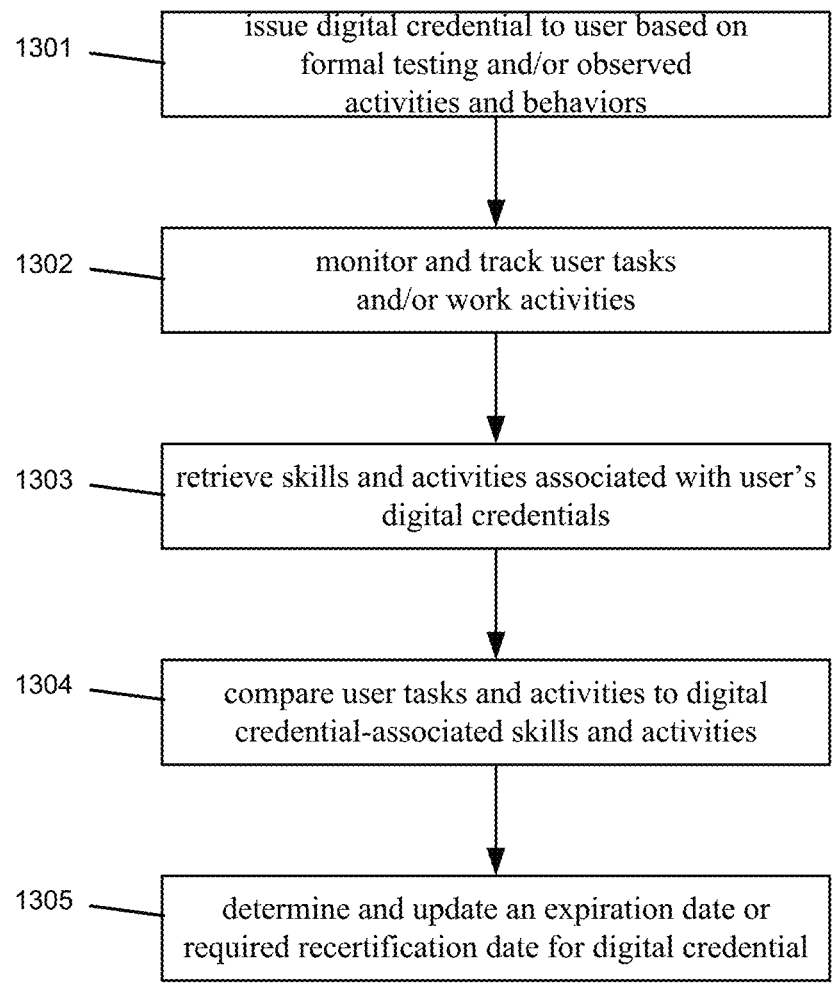
FIG. 13 is a flow diagram illustrating an example process of analyzing activities in a sensor-monitored environment to determine digital credential expiration and/or recertification times, according to one or more embodiments of the disclosure.

Referring now to FIG. 13, another flow diagram is shown illustrating an related process involving determining whether a user has or has not used the activities associated with a particular digital credential that they have obtained, and then adjusting an expiration or re-certification date associated with the digital credential based on the user's usage of the digital credential skills. The steps in this example may be similar or identical to the corresponding steps in FIG. 12, and in some embodiments, the analyses and transmission of the post-credentialing usage described in step 1205 may be performed in conjunction with the setting of an expiration or re-certification date for the digital credential as discussed below.

Steps 1301-1304 may correspond to steps 1201-1204 in some cases, and may be performed using similar or identical techniques to those discussed above. For example, in step 1301 a platform server 1110 and/or digital credential issuer may issue a digital credential associated with one or more activities or tasks to a particular user, recording the digital credential issuance data within the digital credential data store. In step 1302, the post-issuance activities of the particular user may be monitored, including monitoring of the user's work-related activities and tasks performed/completed, in order to determine the particular tasks and activities with which the user has been engaged following issuance of the digital credential. In step 1303, the skills, activities, and tasks associated with the user's digital credential(s) are retrieved, and in step 1304 are compared to the post-issuance user tasks and activities determined for the user in step 1302. Finally, in step 1305, based on the comparison in step 1304, the platform server 1110 may determine that an expiration date and/or recertification date associated with the user's digital credential should be adjusted based on the user's post-issuance activities. As an example, if the system determines in step 1305 that a user who received a digital credential corresponding to a forklift operator's license or commercial truck driving license three years ago, but has infrequently (or not at all) driven a forklift or a commercial truck since receiving their digital credential, then the system may determine that the user's license should expire at the earliest possible time (e.g., the expiration time as of when the digital credential was first issued). In contrast, if the system determines in step 1305 that the same user has frequently and consistently driven a forklift or a commercial truck ever since receiving their digital credential, and also that the user has a high-safety rating and/or high safety compliance scores, then the system may determine that the user's license may be extended. In such cases, the platform server 1110 may determine a new extended expiration or recertification time for the digital credential, update the user's digital credential record within the digital credential data store, and transmit notifications to the affected entities (e.g., the user, employer, digital credential issuer, digital credential owner, etc.) providing the new expiration date. In other examples, rather than changing the expiration date or recertification date of a digital credential (or eliminating the expiration altogether), the platform server 1110 may in other examples determine a new recertification course or procedure for the user, such as simple refresher course to allow the user to recertify quick than the longer complete recertification course used by other users with less post-credentialing digital credential usage.

Additional aspects described herein relate to capturing and using "evidence" data in connection with user testing and credentialing systems, on-the-job evaluation and badging systems, and/or post-credential monitoring systems. For example, within any automated badging/certification/verification system, evidence of the user's performance may be extracted and saved, for example, in a digital credential server along with an associated issued digital credential, or as part of a separate user portfolio of evidence. Evidence data may include, for example, audio and video of the user during a live simulation, or during a virtual reality or augment reality simulation, audio and keystroke data from the user during the testing processing, the user's reaction time and/or decision-making data during a split-second simulated scenario or relevant real-life event (e.g., a workplace accident, etc.), and/or any other sensor or biometric data collected during testing, credentialing, and/or monitoring. As discussed below, evidence data associated with a user may be saved with the user's digital credential and/or into a separate portfolio of evidence, which may be available to the user for review, and also may be provided upon request to potential employers for review during a review or hiring process. Such evidence data also may be applied to updated digital credential credentialing requirements, so that in some cases a user may simply resubmit their evidence portfolio instead of being required to recertify their digital credential when the test or credentialing standards are updated.

Figure 14:
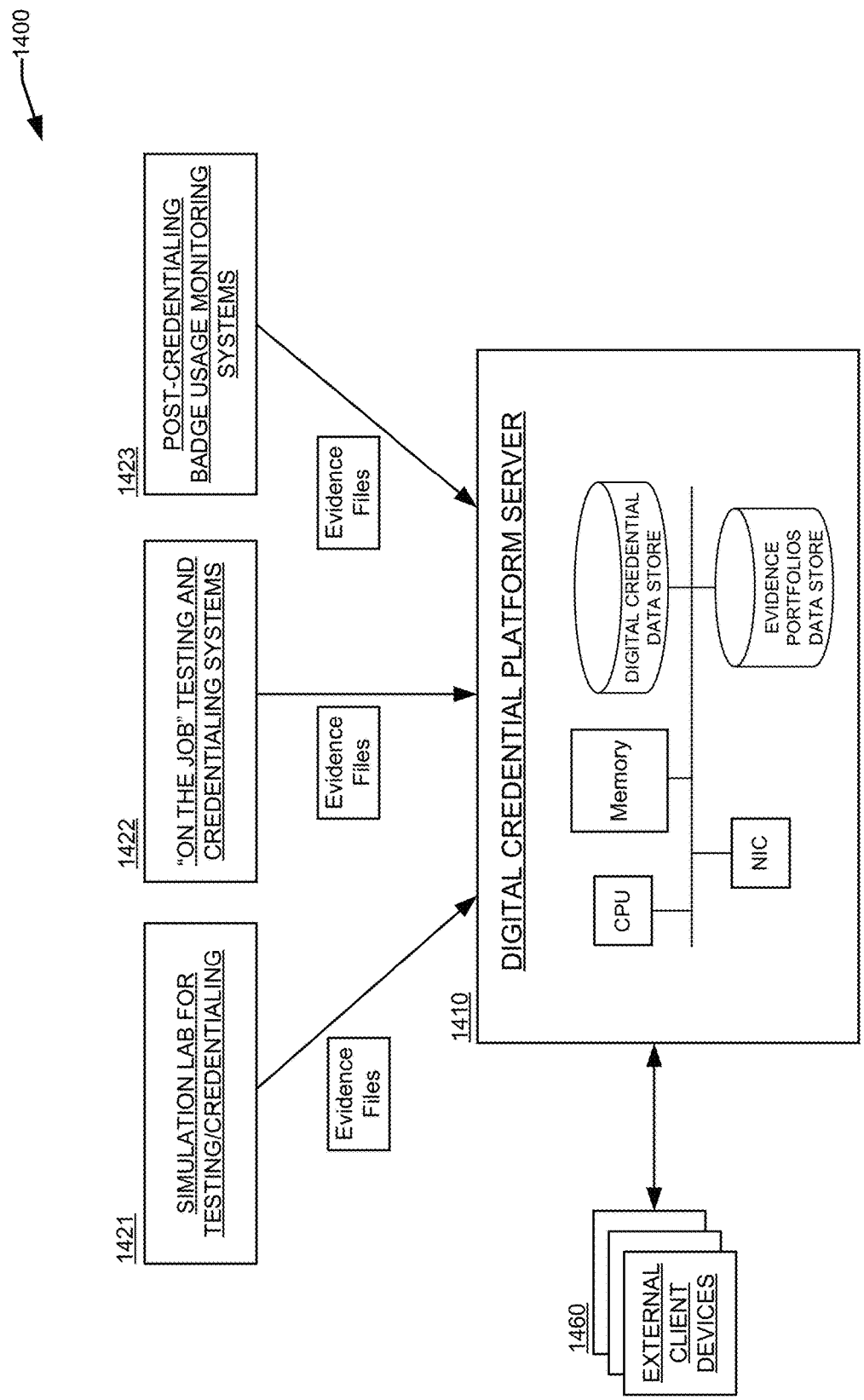
FIG. 14 is an diagram illustrating an example computing environment for generating and analyzing digital credentials using received sensor monitoring data, according to one or more embodiments of the disclosure.

Referring now to FIG. 14, an example computing environment is shown including a digital credential platform server 1410 in communication with a plurality of testing, credentialing, and/or monitoring systems 1421-1423, and one or more external client devices 1460. In some examples, the digital credential platform server 1410 may be a digital credentialing server similar or identical to the server 610 discussed above. Thus, server 1410 may be configured as a digital credential repository and credentialing system, acting as a clearinghouse for digital credential owners, issuers, earners, endorsers, etc. Server 1410 may include a digital credential (or digital credential) data store configured to store digital credential information such as the details of the particular digital credentials earned by particular users. As noted above, such details may identify the digital credential issuer and/or other testing/credential authorities responsible for administering testing or simulation scenarios as part of the digital credentialing process, and/or for pre-digital credential or post-digital credential monitoring of workstations/workplaces to detect and analyze user tasks performance and user skills/abilities In this example, the platform server 1410 may receive data from three testing/credentialing systems 1421-1423. Similar to the above examples, the simulation lab system 1421 may correspond to a simulation lab or other physical testing environment, an on-the-job credentialing systems 1422 may include workstation/workplace monitoring systems and sensors to record and analyze the user's on-the-job performance, and may issue digital credentials in some cases without the need for any separate formal testing procedure; and post-credential monitoring systems 1423 may be configured to monitor users following the issuance of a digital credential, including tracking task performance data, skills usage, and the like, and comparing the data to the skills/tasks associated with the user's digital credentials.

In some embodiments, one or more systems 1421-1423 which perform user testing, credentialing, and/or monitoring, such as those systems discussed above, may capture and transmit "evidence data" of the user during a test, simulation, or during an on-the-job monitoring process. Evidence data may include, for example, video and/or audio of the user during a test, simulation (e.g., live, VR, or AR), collected by the sensors of a physical testing environment 700. Additional evidence data may include user reaction time data, decision-making data, facial expression and body language data, keystroke and mouse movement data, and/or user biometric data. The evidence data may correspond to a time period just before, during, and just after a test, simulation, or a task or activity performed during on-the-job monitoring.

As shown in this example, the various evidence data collected by systems 1421-1423 may be transmitted to the platform server 1410 and stored in an evidence portfolio data store. The evidence data collected by the testing, credentialing and/or user monitoring systems may be associated with a particular user (or users) and with a particular digital credential (or digital credentials) that the user is in the process of earning or using (e.g., for post-credentialing monitoring). Thus, the evidence data may provide documented proof that the user actually completed the digital credential requirements, along with additional contextual evidence showing how the user performed during the testing, simulation, or monitoring.

Figure 15:
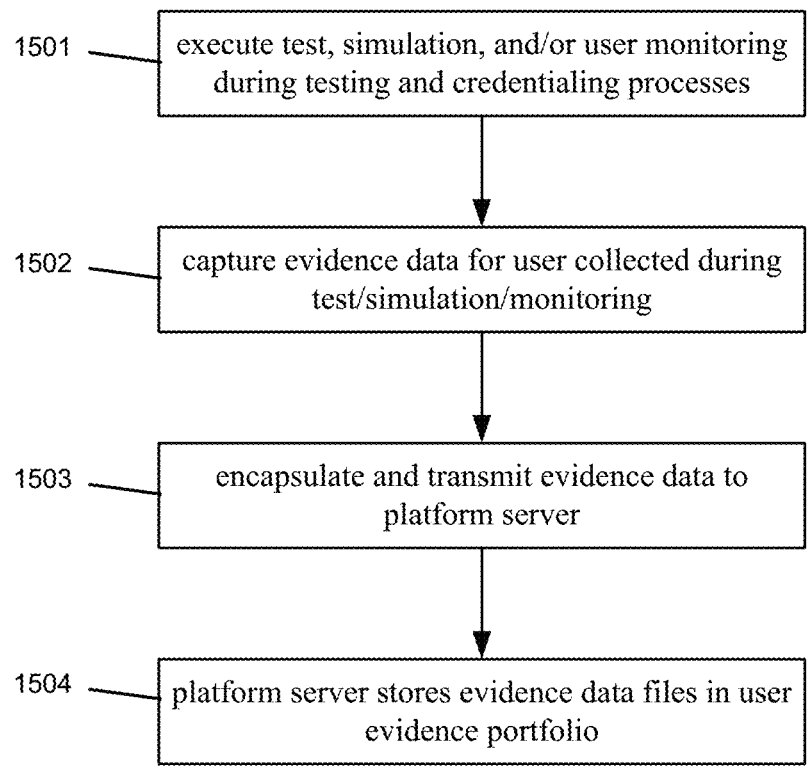
FIG. 15 is a flow diagram illustrating an example process of generating and storing digital credentials with associated data from sensor-monitored environments, according to one or more embodiments of the disclosure.

Referring now to FIG. 15, a flow diagram is shown illustrating an example process by which a testing system, simulator, credentialing systems, workstation/workplace monitoring system, and the like, may collect and preserve evidence data related to a user and a digital credential. In step 1501, a testing, credentialing, and/or monitoring system such as those described above may execute a test, simulation, or user monitoring process for a particular user in connection with a digital credential that the user is seeking or has already obtained. The particular types of tests may include, for example, live simulations and/or virtual or augmented reality simulations executed within a physical testing environment 700. In other examples, the testing in step 1501 may correspond to an on-the-job credentialing system that monitors and evaluates a user's workplace tasks and activities, or to a post-credentialing user monitoring system configured to determine whether the user is using their previously issued digital credentials. In step 1502, during any of these testing, simulation, or monitoring processes, the system 1421-1423 may capture evidence data relating to the user. As noted above, evidence data may include audio or video of the user, user reaction time data, decision-making data, facial expression data, body language data, the user's keystrokes and mouse movement data, particular software interaction data, and/or the user's biometric data. In step 1503, the evidence data may be encapsulated and transmitted to the platform server 1410 for storage within the user's evidence portfolio, and in step 1504 the platform server 1410 may store the evidence data files with data records associated with the user and the particular digital credential(s) to which the evidence applies. In other embodiments, certain systems 1421-1423 may retain and store user evidence data locally, rather than the evidence data being stored in a central repository. Additionally, when the evidence data is transmitted, it may be compressed and edited as needed, and/or encrypted in order to assure data security and user privacy.

In some cases, the platform server 1410 may determine a subset of the user activities matching digital credential requirements associated with the digital credential, wherein other user activities might bare no relevance to the requirements of the digital credential. In such cases, the platform server may store only the corresponding subset of the evidence/sensor data for the user activities matching digital credential requirements, and might not store other evidence/sensor data corresponding to irrelevant user activities upon which digital credentials do not depend.

Figure 16A:
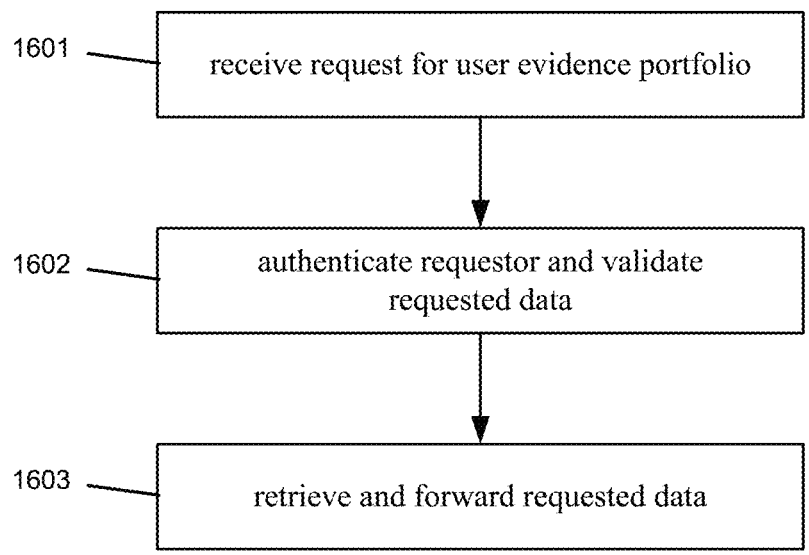
FIGS. 16A-16B are flow diagrams illustrating example processes of retrieving sensor data associated with issued digital credentials, and generating additional and/or updated digital credentials based on the retrieved sensor data, according to one or more embodiments of the disclosure.
Figure 16B:
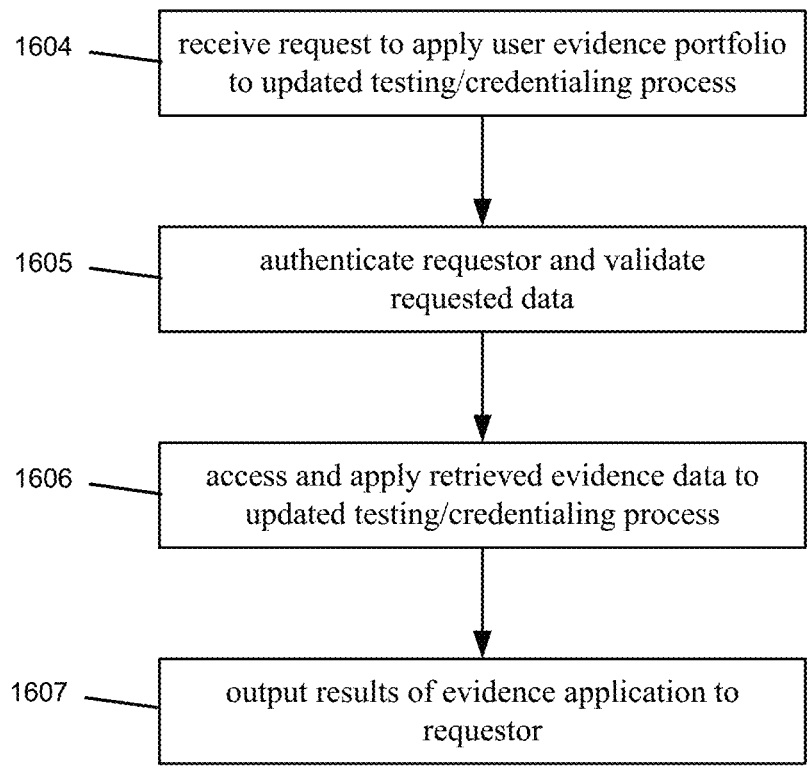

Referring now to FIGS. 16A and 16B, two additional flow diagrams are shown illustrating example processes by which evidence data may be retrieved and/or accessed from a platform server 1410 or other data repository. As noted above, individual evidence data files stored by the platform server 1410 may be associated with a particular user and/or with a particular digital credential or credential earned (or in process of earning) by the user. Thus, in some embodiments, evidence data may be stored and made available to certain authorized entities. For instance, in step 1601 of FIG. 16A, the platform server 1410 may receive a request for some or all of the user's evidence portfolio. In step 1602, the platform server 1410 may perform authorization/authentication on the request to determine (1) whether the requestor is authorized to access the user's evidence data, and/or (2) whether the requested evidence is current and valid. One or both of these determinations may require explicit authorization from the user himself or herself, in order to (1) prevent any unwanted parties from accessing the user's evidence data, and (2) to prevent any old and obsolete from being accessed, even by authorized parties. Thus, step 1602 may include verifying the requestor's identity or role and comparing to an access control list or other permissions data associated with the evidence. In some cases, step 1602 may include a real-time request sent by the platform server 1410 to a client device associated with the user, to allow the user the option to allow or reject the request. Additionally, the request in step 1601 may specify one or more particular users and/or one or more particular digital credentials for which the associated evidence is to be retrieved, and thus authorization in step 1602 may be granted or denied for evidence relating to each possible combination of users and digital credentials. In step 1603, assuming that the requestor has been granted access to the requested evidence data, the corresponding evidence data files may be retrieved and forwarded to the requestor.

In some examples, the request in step 1601 may be from the user himself/herself, who wants to review and study the evidence from his/her previous tests, simulations, and monitoring data. In other examples, the request in step 1601 may be from a current or potential employer, who has been authorized by the user to retrieve and view the user's evidence data associated with all work-relevant digital credentials, as part of a hiring process or review process. The user's evidence data may verify to the employer or potential employer that the user actually completed the digital credential requirements, and also may allow the employer or potential employer to observe the user's behaviors, responses, reactions first-hand, thus allowing them to evaluate the user's reaction time, efficiency, mental state, decision-making, etc., and other difficult to quantify characteristics. In still other examples, the user may authorize a digital credential issuer or digital credential owner to view the user's evidence files related to the digital credentials issued and owned by those entities. Finally, users may make some or all of their evidence data publicly available (e.g., on a file-by-file basis) and/or may actively post their evidence data as a multimedia file or data records within a digital credential profile page of the user that is maintained and published by the platform server 1410.

In some embodiments, in addition to (or instead of) providing evidence data in response to requests, the platform server 1410 may provide the functionality to receive updated tests, digital credential requirements, credentialing data, etc., and to apply a user's previously stored evidence to the new testing or credentialing requirements. For instance, in step 1604 of FIG. 16B, the platform server 1410 may receive a request to apply previously stored evidence data within a user's portfolio to an updated testing/credentialing process. For example, testing or credentialing authorities (e.g., a digital credential owners or issuers, employers, etc.) may periodically update digital credentialing requirements in order to improve the quality of the digital credential testing, to comply with new best industry practices, to make a digital credential more restrictive by increasing the required scores or efficiency, etc. Additionally, certain testing or credentialing authorities may implement multiple different levels of the same digital credential, in which users are subjected to the same test, same simulation, same monitoring processes, etc., but different scoring ranges may equate to different levels of the digital credential that may be earned by the user. In these scenarios, whenever digital credential requirements are updated, or if a new digital credential level is made available, it may be possible to apply the user's previously collected evidence data to the new digital credential requirements or digital credential level, rather than requiring the user to retake the test, simulation, or monitoring process. As an example, a set of new requirements for particular digital credential may be similar to the previous set of requirement, with the addition of a newly imposed time limit by which the test or simulated scenario must be completed. In other example, new digital credential requirements or digital credential levels may raise the minimum performance level during a test or simulation to a higher level, and/or may require additional steps or procedures during the test or simulation that were not required in the previous version of the digital credential requirements. In these cases, rather than require the user to retest/recertify to earn the updated digital credential, the platform server 1410 may provide the service of receiving the updated digital credential requirements or new digital credential levels, and automatically evaluating the new digital credential requirements/levels using the user's evidence data that was collected with earning the previous version of the digital credential. Thus, in step 1605, the requestor may be authenticated and the requested data may be validated, and in step 1605 the user's evidence data may be applied the updated testing/credentialing process. Referring to these same digital credential requirements changes discussed above, the evaluation in step 1606 may include automated analysis of the user's evidence data to determine whether the user complied with the newly imposed time limit, the new minimum performance level, and/or performed the additional new steps or procedures during the user's previous digital credential testing. If so, the digital credential authority may allow the user to upgrade their digital credential automatically without having to retake the test or simulation, etc. If not, the user may be informed that they are required to retake the test or simulation (or in some cases they may receive a lower digital credential level). Either way, in step 1607, the results of the evidence analysis and application to the new credentialing requirements may be output to the requestor. Another potential advantage in certain embodiments may include the protection of the user's evidence data itself. For instance, in the above example, the platform server 1410 might perform the analysis and application of the user's previously stored evidence data to the new testing requirement, without ever allowing any other entity access to the evidence data. In other examples, the platform server 1410 may perform the analysis and/or may provide the actual evidence data files to the requestor device, with the sufficient authorization from the user.

In various embodiments, the updated testing/credentialing process in step 1604 may correspond to a re-issuance of a digital credential, with the same or updated requirements, or may corresponding to a different digital credential having similar and/or overlapping issuance requirements. For instance, the platform server 1410 may receive an updated set of requirements for a digital credential previously issued to a credential receiver, may retrieve the stored set of sensor data corresponding to the relevant activities performed by the credential receiver in connection with the issuance, may compare the retrieved set of sensor data/activities to the updated set of digital credential requirements, and then may generate/issue an updated digital credential to the credential receiver, based on the comparison of the retrieved set of sensor/activity data to the updated set of digital credential requirements. Similar techniques may be performed to generate and issue digital credentials to receivers for entirely different digital credentials, rather than updated credentials, such as similar credentials and/or credentials having overlapping eligibility requirements.

Additional aspects described herein relate to capturing and using user biometric data, physical user cues, and the like, in connection with user testing and credentialing systems, on-the-job evaluation and badging systems, and/or post-credential monitoring systems. For example, within any automated badging/certification/verification system, data identifying particular physical user cues and/or user biometric data may be collected during testing/simulation/monitoring processes and saved, for example, in a digital credential platform server along with an associated issued digital credential and/or the associated user. Physical user cues may include, for example, facial expressions, user reactions and/or noises made by the user during testing/simulations, user body language, eye movement, and any other user behavior or reaction detectable via cameras and external sensors. Additionally or alternatively, various types of user biometric data also may be collected during the testing, simulation, and/or monitoring processes performed on the user. Such biometric data may include, for instance, the user's temperature, heartrate, blood pressure, respiration, skin conductivity, and brainwave activity, and/or any known types of biometric data that may collected during testing, credentialing, and/or monitoring processes.

As discussed in more detail below, the user's physical cues and/or biometric data may be collected and saved within a digital credential platform server, and associated with the user, one or more particular digital credentials, and/or with the particular testing/simulation/monitoring processes during which the data was originally detected. Once collected, the data may be used to authenticate the testing, simulation, and/or monitoring processes, to confirm the user's identity and to prevent errors or fraudulent activities by users. The data may be saved with the user's digital credential and/or into a separate portfolio of evidence, which may be available to the user for review, and also may be provided upon request to potential employers for review during a review or hiring process. Such evidence data also may be applied to updated credentialing requirements, so that in some cases a user may simply resubmit their evidence portfolio instead of being required to recertify their digital credential when the test or credentialing standards are updated. In certain embodiments, the user's physical cues and/or biometric data also may be analyzed to determine the user's emotional states and reactions during the testing, simulation, and/or monitoring. Additionally or alternatively, the physical cues and biometric data may be detected for several users and analyzed collectively to provide feedback regarding the digital credential testing processes, simulations, monitoring, physical testing environments, etc.

Figure 17A:
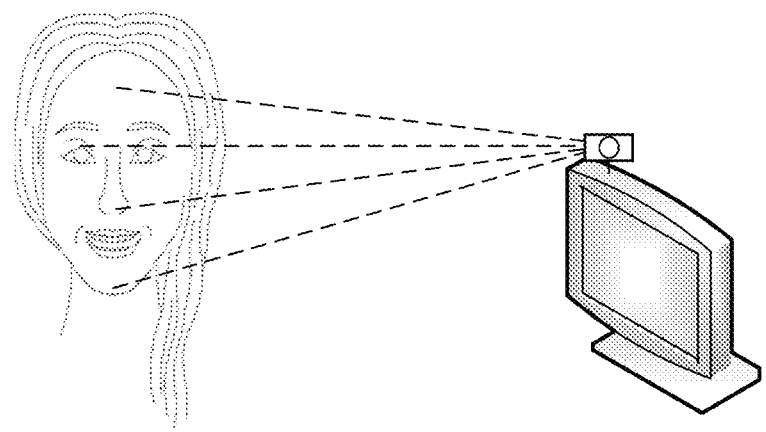
FIGS. 17A-17B are diagrams illustrating facial recognition and analysis functionality performed during digital credential generation and analyses processes within sensor-monitored environments, according to one or more embodiments of the disclosure.
Figure 17B:
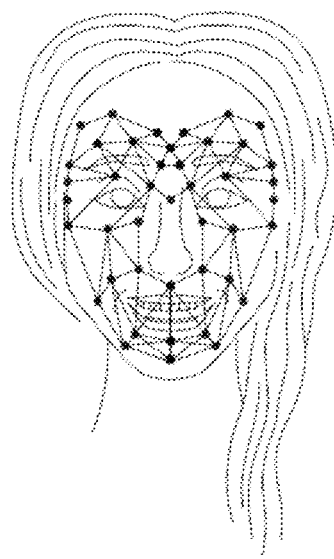

Referring now to FIGS. 17A-17B, examples are shown illustrating facial recognition and analysis functionality that may be performed in connection with a user testing/credentialing process (live or simulation), or with user on-the-job credentialing or monitoring processes. In this example, one or more cameras may be configured to capture the user's facial features and expressions at different points during the testing/credentialing/monitoring processes. For tests performed within a simulation lab-type physical testing environment, a number of designated cameras may capture not only the user's face but also the user's body from several different angles. Thus, certain physical testing environments may be capable not only of capturing facial images of the user, but also detecting detailed facial expressions at different times during the test/simulation, and potentially eye movement patterns, gestures, body language, and any other non-verbal and non-written user expression data.

In other embodiments, such as for certain on-the-job credentialing or monitoring systems, or for formal testing/credentialing when sophisticated high-tech physical testing environments are not used, the physical cue data and/or biometrics data collected may be limited by the cameras and sensors available. In some cases, a laptop camera or webcam installed at the user's workstation may be use to capture facial images and/or to recognize facial expressions at different times during the testing/monitoring. However, such cameras may or may not have the resolution and image capture capabilities to perform advanced facial expression monitoring, eye movement, and/or body language detection. In other examples, such as on-the-job credentialing and monitoring scenarios, facial images might only be detectable using lower-quality security cameras or the like that are configured to monitor an entire floor or workspace. In such examples, the facial images may be still be useful for certain purposes (e.g., confirmation of user identification), but potential may be unsuitable for facial expression analysis, eye movement analysis, and the like.

Additionally or alternatively, physical testing environments (e.g., simulation labs) and/or workstation or workplace monitoring systems may include various biometric sensors configured to detect biometric data of the user at different times during the test/simulation. As noted above, such biometric data may include the user's temperature, heartrate, blood pressure, respiration, skin conductivity, and brainwave activity, and/or any known types of biometric data. Thus, the biometric metric may be detected and captured via a combination of external sensors, wearable sensors, and/or implanted sensors in some cases. For on-the-job credentialing and monitoring mobile wearable sensors such as heartrate monitors, step trackers, and the like, may be used when more advanced wearable sensors (e.g., blood pressure, respiration, skin conductivity, brainwave activity, etc.) are not practical.

Figure 18:
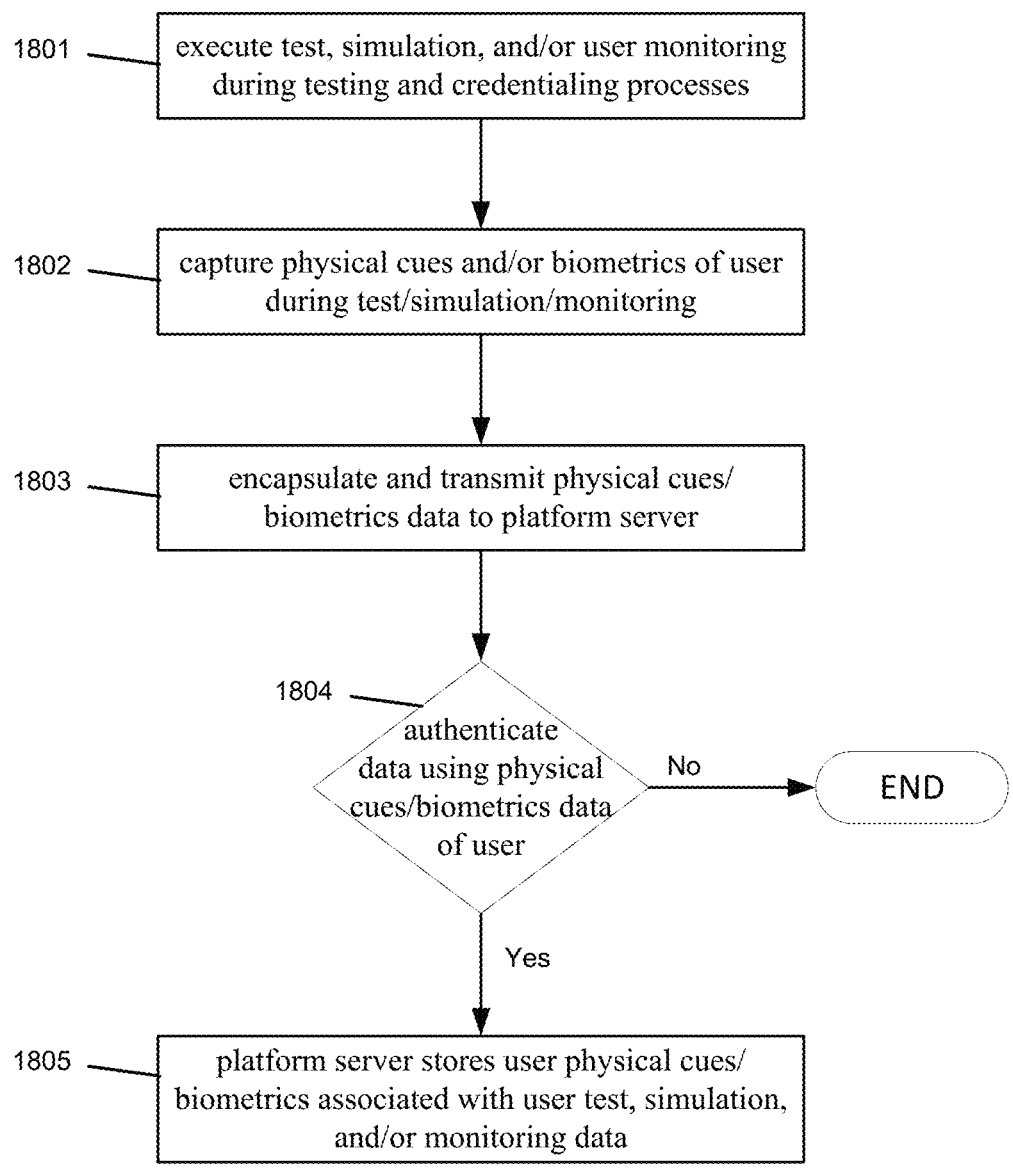
FIG. 18 is a flow diagram illustrating an example process of generating and storing digital credentials with associated user feedback data from sensor-monitored environments, according to one or more embodiments of the disclosure.

Referring now to FIG. 18, a flow diagram is shown illustrating an express process of collecting physical cue data and/or biometric data for a user during a user testing, credentialing, or monitoring processes, and using the physical cue and biometrics to authenticate the user's identity and the associated data. The process shown in this example may be implemented within any of the testing/credentialing systems, simulators, workstation or workplace monitoring systems, and the like described herein. In step 1801, a testing, credentialing and/or monitoring system such as those described above may execute a test, simulation, or user monitoring process for a particular user in connection with a digital credential that the user is seeking or has already obtained. The particular types of tests may include, for example, live simulations and/or virtual or augmented reality simulations executed within a physical testing environment 700. In other examples, the testing in step 1801 may correspond to an on-the-job credentialing system that monitors and evaluates a user's workplace tasks and activities, or to a post-credentialing user monitoring system configured to determine whether the user is using their previously issued digital credentials. In step 1802, during any of these testing, simulation, or monitoring processes, one or more of the user monitoring devices described above, including cameras, microphones, motion sensors, tracking devices, and/or user biometrics sensors, may capture physical cues from the user and/or biometric data of the user during the testing, simulation, or monitoring processes. Such physical cues may include particular facial expressions, user reactions and/or noises made by the user during testing/simulations/monitoring, as well as user body language and eye movements. In step 1803, the physical cue and user biometric data may be encapsulated and transmitted to the transmitted to the platform server 1410. In other embodiments, certain systems (e.g., 1421-1423) may retain and store user's physical cues and biometrics data locally, rather than the evidence data being stored in a central repository. Regardless of storage location, the physical cues and biometrics data of the user may be associated with particular test questions and/or particular time stamps during a testing or simulation. Additionally, when the data is transmitted, it may be compressed and edited as needed, and/or encrypted in order to assure data security and user privacy.

In some embodiments, the platform server 1410 may use the physical cues and/or biometrics data collected for the user as part of an authentication process in step 1804. For example, during any testing/credentialing process (e.g., written testing, computer-based testing, simulation lab testing, etc.) the user's facial images, physical cues, and/or biometrics may be compared against previously stored corresponding data (e.g., user images, physical cue patterns, biometrics, etc.) in order to verify that the correct user is taking the test/simulation. Additionally, the user's physical cues and biometrics may provide an additional level of authentication, by comparing the observed physical cues and biometrics at particular times during the test or simulation to expected physical cues and biometrics, based on what is happening during the test or simulation at that particular time. For instance, a simulation may be designed to present a challenging and stressful situation to the user at a particular timestamp or within a sequence of tasks the user is performed. In step 1804, the server may compare the user's observed physical cues and biometrics to the physical cues and biometrics that would be expected for the challenging and stressful situation, in order to confirm that the data is valid and/or that the user did not expect this situation in advance (e.g., indicating cheating). In step 1805, the platform serving 1410 having validated the user's identity and the authenticity of the user's physical cues and biometrics, may store the testing, credentialing, monitoring data in the digital credential data store as valid data. In some embodiments, the image data, facial cues, and/or biometrics data also may be retained and stored by the platform server for future analysis.

In some embodiments, the data relating to the user's physical cues and biometrics collected during a test, simulation, or during on-the-job monitoring, may be further evaluated to identify the user's emotional states at different times. For instance, certain simulations may be specifically designed to invoke certain emotional states (e.g., anger, boredom, frustration, surprise, etc.), and the user's level of performance while experiencing those emotional states may be particularly important for certain testing/credentialing processes. In these examples and other cases, either exhibiting or not exhibiting particular emotion states may be an eligibility requirement for a credential receiver to obtain certain types of digital credentials. Thus, the data collected during the test, simulation, or monitoring in step 1801 may be used not only for user identification/authentication, but also may be analyzed to (1) determine the user's emotional state at different times during the test, simulation, or monitoring, (2) compare that emotional state to an expected emotional state based on what the user is experiencing, and (3) evaluate the user's reactions, levels of skills performance during different emotional states.

Additionally, in some embodiments, the physical cues, biometrics data, and/or emotional states detected for multiple users may be aggregated for the same tests, simulations, monitoring environments, etc. The aggregated data for tests may be used to revise current tests and simulations, design new tests and simulations, and for training users how to respond to particular scenarios and situations (e.g., workplace accidents).

A number of variations and modifications of the disclosed embodiments can also be used. Specific details are given in the above description to provide a thorough understanding of the embodiments. However, it is understood that the embodiments may be practiced without these specific details. For example, well-known circuits, processes, algorithms, structures, and techniques may be shown without unnecessary detail in order to avoid obscuring the embodiments.

Implementation of the techniques, blocks, steps and means described above may be done in various ways. For example, these techniques, blocks, steps and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

Also, it is noted that the embodiments may be described as a process which is depicted as a flowchart, a flow diagram, a swim diagram, a data flow diagram, a structure diagram, or a block diagram. Although a depiction may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks may be stored in a machine readable medium such as a storage medium. A code segment or machine-executable instruction may represent a procedure, a function, a subprogram, a program, a routine, a subroutine, a module, a software package, a script, a class, or any combination of instructions, data structures, and/or program statements. A code segment may be coupled to another code segment or a hardware circuit by passing and/or receiving information, data, arguments, parameters, and/or memory contents. Information, arguments, parameters, data, etc. may be passed, forwarded, or transmitted via any suitable means including memory sharing, message passing, token passing, network transmission, etc.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more memories for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, and/or various other storage mediums capable of storing that contain or carry instruction(s) and/or data.

While the principles of the disclosure have been described above in connection with specific apparatuses and methods, it is to be clearly understood that this description is made only by way of example and not as limitation on the scope of the disclosure.

The invention claimed is:

1. A digital credential generation system comprising:
 a simulation output system comprising one or more digital display screens comprising at least one first graphical user interface (GUI) configured to output video simulation components within a physical simulation area;
 a physical simulation evaluation system, comprising:
  a plurality of sensors directed to detect physical activity within the physical simulation area;
  a first processing unit comprising one or more processors;
  a computer network connecting the plurality of sensors to the first processing unit and a storage device of the physical simulation evaluation system;
  one or more network interfaces configured to transmit secure data to a digital credential generator device; and
  a first memory coupled with and readable by the first processing unit and storing therein a set of instructions which, when executed by the first processing unit, causes the physical simulation evaluation system to:
   monitor the physical simulation area, using the plurality of sensors, during a physical simulation within an interactive training or eLearning course for an educational institution;
   detect and store, using the plurality of sensors, a plurality of physical actions of a user responding to the video simulation components in the simulation output system, during the physical simulation;
   analyze data corresponding to the plurality of physical actions performed by the user during the physical simulation, wherein, to analyze the data corresponding to the plurality of physical actions performed by the user during the physical simulation, the physical simulation evaluation system:
    analyzes user biometric data detected by one or more biometric sensors, of the plurality of sensors, that are attached to the user during the physical simulation,
    determines, based on the user biometric data, an emotional state of the user during the physical simulation,
    compares the emotional state to a corresponding expected emotional state based on a physical action of the plurality of physical actions performed by the user at a time associated with the emotional state,
    determines a confidence of action associated with one or more physical actions of the plurality of physical actions performed by the user based on further biometric data associated with the one or more physical actions and detected user movement data, and compares the determined confidence of action to previously stored model confidence of action data; and transmit the data corresponding to the analysis of the plurality of physical actions performed by the user during the physical simulation, to one or more digital credential generator devices; and a digital credential generator device, comprising:
a second processing unit comprising one or more processors; and
a second memory coupled with and readable by the second processing unit and storing therein a second set of instructions which, when executed by the second processing unit, causes the digital credential generator device to:
receive, from the physical simulation evaluation system, the data corresponding to the analysis of the physical actions performed by the user during the physical simulation;
determine that the user corresponds to a first credential receiver;
determine whether the first credential receiver is eligible to receive a digital credential associated with the educational institution based on:
(i) comparing the data corresponding to the analysis of the physical actions performed by the user during the physical simulation to one or more digital credential requirements, wherein the one or more digital credential requirements are defined by the educational institution,
(ii) the comparison of the emotional state to the corresponding expected emotional state, and
(iii) the comparison of the determined confidence of action to previously stored model confidence of action data;
generate a first digital credential as an achievement certification in the interactive training or eLearning course, the first digital credential being associated with the first credential receiver and with the digital credential requirements, in response to determining that the first credential receiver is eligible to receive the first digital credential; and
store the first digital credential associated with the first credential receiver, in a secure digital credential storage repository.

2. The digital credential generation system of claim 1, wherein the physical simulation evaluation system further comprises the simulation output system comprising one or more of:
an audio output subsystem configured to output audio simulation components to the physical simulation area; or
a motorized moving object subsystem configured to manipulate physical objects during a simulation within the physical simulation area.

3. The digital credential generation system of claim 1, wherein the physical simulation evaluation system further comprises a simulation environment control system comprising one or more of:
an ambient light simulator configured to simulate a plurality of ambient light conditions within the physical simulation area;
an audio output subsystem configured to output a plurality of background noise conditions within the physical simulation area;
a heating and cooling system configured to control the physical temperature within the physical simulation area;
a smell output device configured to output a plurality of smells to the physical simulation area; or
a vibration system configured to simulate a plurality of vibratory outputs within the physical simulation area.

4. The digital credential generation system of claim 1, wherein monitoring the physical simulation area during the physical simulation comprises:
initiating detection by the plurality of sensors, and configuring each of the plurality of sensors to detect physical actions of the user.

5. The digital credential generation system of claim 1, wherein analyzing the data corresponding to the plurality of physical actions performed by the user during the physical simulation comprises:
identifying each of the plurality of physical actions performed by the user, based on analysis of user movement data detected using the plurality of sensors; and
for each of the plurality of physical actions performed by the user:
(a) determining a type of the physical action performed by the user, by comparing the user movement data associated with the physical action;
(b) determining an accuracy of the physical action performed by the user, by comparing the user movement data associated with the physical action, to previously stored model user movement data; and
(c) determining a speed of the physical action performed by the user, by determining a starting timestamp and an ending timestamp associated with the user movement data corresponding to the physical action performed by the user.

6. The digital credential generation system of claim 1, wherein detecting the plurality of physical actions performed by the user during the physical simulation comprises detecting a plurality of keystrokes performed on a keyboard by the user, a plurality of mouse events by the user using a mouse, and a plurality of touch events performed by the user on a touchscreen.

7. The digital credential generation system of claim 1, wherein analyzing the data corresponding to the plurality of physical actions performed by the user during the physical simulation comprises:
determining a user reaction time of one or more physical actions performed by the user, based on timing data associated with simulation output data and detected user movement data; and
comparing the determined user reaction time to previously stored model user reaction time data.

8. A method of evaluating a physical simulation by a digital credential generator system comprising:
monitoring, by a digital credential generator system, a physical simulation area using a plurality of sensors, during a physical simulation within an interactive training or eLearning course for an educational institution;
detecting, by the digital credential generator system, using the plurality of sensors, a plurality of physical actions performed by a user during the physical simulation;
analyzing, by the digital credential generator system, data corresponding to the plurality of physical actions performed by the user, responding to the video simulation components in the simulation output system comprising one or more digital display screens comprising at least one first graphical user interface (GUI) configured to output video simulation components within a physical simulation area, during the physical simulation, wherein analyzing the data corresponding to the plurality of physical actions performed by the user comprises:
    analyzing user biometric data detected by one or more biometric sensors, of the plurality of sensors, that are attached to the user during the physical simulation,
    determining, based on the user biometric data, an emotional state of the user during the physical simulation,
    comparing the emotional state to a corresponding expected emotional state based on a physical action of the plurality of physical actions performed by the user at a time associated with the emotional state,
    determining a confidence of action associated with one or more physical actions of the plurality of physical actions performed by the user based on further biometric data associated with the one or more physical actions and detected user movement data, and
    comparing the determined confidence of action to previously stored model confidence of action data;
determining, by the digital credential generator system, that the user corresponds to a first credential receiver;
determining, by the digital credential generator system, whether the first credential receiver is eligible to receive a digital credential associated with the educational institution based on:
    (i) comparing the data corresponding to the analysis of the physical actions performed by the user during the physical simulation to one or more digital credential requirements, wherein the one or more digital credential requirements are defined by the educational institution,
    (ii) the comparison of the emotional state to the corresponding expected emotional state, and
    (iii) the comparison of the determined confidence of action to previously stored model confidence of action data;
generating, by the digital credential generator system, a first digital credential as an achievement certification in the interactive training or eLearning course, the first digital credential being associated with the first credential receiver and with the digital credential requirements, in response to determining that the first credential receiver is eligible to receive the first digital credential; and
storing, by the digital credential generator system, the first digital credential associated with the first credential receiver, in a secure digital credential storage repository.

9. The method of evaluating a physical simulation of claim 8, further comprising outputting the physical simulation within the physical simulation area, wherein the outputting comprises one or more of:
    outputting audio simulation components to the physical simulation area, using an audio output subsystem;
    manipulating physical objects during a live-action simulation within the physical simulation area, using a motorized moving object subsystem; or
    outputting a virtual reality simulation to a virtual reality headset.

10. The method of evaluating a physical simulation of claim 8, further comprising generating a physical simulation environment within the physical simulation area, wherein generating the physical simulation environment comprises one or more of:
    simulating one or more ambient light conditions within the physical simulation area, using an ambient light simulator;
    outputting one or more background noise conditions within the physical simulation area, using an audio output subsystem;
    controlling a physical temperature using a heating and cooling system installed at the physical simulation area;
    outputting one or more smells to the physical simulation area, using a smell output device; or
    simulating one or more vibratory outputs within the physical simulation area, using a vibration system.

11. The method of evaluating a physical simulation of claim 8, wherein monitoring the physical simulation area during the physical simulation comprises:
    initiating detection by the plurality of sensors, and configuring each of the plurality of sensors to detect physical actions of a user.

12. The method of evaluating a physical simulation of claim 8, wherein analyzing the data corresponding to the plurality of physical actions performed by the user during the physical simulation comprises:
    identifying each of the plurality of physical actions performed by the user, based on analysis of user movement data detected using the plurality of sensors; and
    for each of the plurality of physical actions performed by the user:
        (a) determining a type of the physical action performed by the user, by comparing the user movement data associated with the physical action;
        (b) determining an accuracy of the physical action performed by the user, by comparing the user movement data associated with the physical action, to previously stored model user movement data; and
        (c) determining a speed of the physical action performed by the user, by determining a starting timestamp and an ending timestamp associated with the user movement data corresponding to the physical action performed by the user.

13. The method of evaluating a physical simulation of claim 8, wherein detecting the plurality of physical actions performed by the user during the physical simulation comprises detecting a plurality of keystrokes performed on a keyboard by the user, a plurality of mouse events by the user using a mouse, and a plurality of touch events performed by the user on a touchscreen.

14. The method of evaluating a physical simulation of claim 8, wherein analyzing the data corresponding to the plurality of physical actions performed by the user during the physical simulation further comprises:
    comparing the user biometric data to previously stored model user biometric data.

15. A non-transitory computer-readable medium, having instructions stored therein, which when executed by a computing device cause the computing device to perform a set of operations comprising:
    monitoring a physical simulation area using a plurality of sensors, during a physical simulation within an interactive training or eLearning course for an educational institution;
    detecting using the plurality of sensors, a plurality of physical actions performed by a user during the physical simulation;

analyzing data corresponding to the plurality of physical actions performed by the user, responding to the video simulation components in the simulation output system comprising one or more digital display screens comprising at least one first graphical user interface (GUI) configured to output video simulation components within a physical simulation area, during the physical simulation, wherein analyzing the data corresponding to the plurality of physical actions performed by the user comprises:
  analyzing user biometric data detected by one or more biometric sensors, of the plurality of sensors, that are attached to the user during the physical simulation,
  determining, based on the user biometric data, an emotional state of the user during the physical simulation,
  comparing the emotional state to a corresponding expected emotional state based on a physical action of the plurality of physical actions performed by the user at a time associated with the emotional state,
  determining a confidence of action associated with one or more physical actions of the plurality of physical actions performed by the user based on further biometric data associated with the one or more physical actions and detected user movement data, and
  comparing the determined confidence of action to previously stored model confidence of action data;
determining that the user corresponds to a first credential receiver;
determining whether the first credential receiver is eligible to receive a digital credential associated with the educational institution based on:
  (i) comparing the data corresponding to the analysis of the physical actions performed by the user during the physical simulation to one or more digital credential requirements, wherein the one or more digital credential requirements are defined by the educational institution,
  (ii) the comparison of the emotional state to the corresponding expected emotional state, and
  (iii) the comparison of the determined confidence of action to previously stored model confidence of action data;
generating a first digital credential as an achievement certification in the interactive training or eLearning course, the first digital credential being associated with the first credential receiver and with the digital credential requirements, in response to determining that the first credential receiver is eligible to receive the first digital credential; and
storing the first digital credential associated with the first credential receiver, in a secure digital credential storage repository.

16. The non-transitory computer-readable medium of claim 15, the instructions causing the computing device to perform further operations comprising outputting the physical simulation within the physical simulation area, wherein the outputting comprises one or more of:
  outputting audio simulation components to the physical simulation area, using an audio output subsystem;
  manipulating physical objects during a live-action simulation within the physical simulation area, using a motorized moving object subsystem; or
  outputting a virtual reality simulation to a virtual reality headset.

17. The non-transitory computer-readable medium of claim 15, the instructions causing the computing device to perform further operations comprising generating a physical simulation environment within the physical simulation area, wherein generating the physical simulation environment comprises one or more of:
  simulating one or more ambient light conditions within the physical simulation area, using an ambient light simulator;
  outputting one or more background noise conditions within the physical simulation area, using an audio output subsystem;
  controlling a physical temperature using a heating and cooling system installed at the physical simulation area;
  outputting one or more smells to the physical simulation area, using a smell output device; or
  simulating one or more vibratory outputs within the physical simulation area, using a vibration system.

18. The non-transitory computer-readable medium of claim 15, wherein analyzing the data corresponding to the plurality of physical actions performed by the user during the physical simulation comprises:
  identifying each of the plurality of physical actions performed by the user, based on analysis of user movement data detected using the plurality of sensors; and
  for each of the plurality of physical actions performed by the user:
  (a) determining a type of the physical action performed by the user, by comparing the user movement data associated with the physical action;
  (b) determining an accuracy of the physical action performed by the user, by comparing the user movement data associated with the physical action, to previously stored model user movement data; and
  (c) determining a speed of the physical action performed by the user, by determining a starting timestamp and an ending timestamp associated with the user movement data corresponding to the physical action performed by the user.

* * * * *